(12) United States Patent
Winarski

(10) Patent No.: US 10,896,171 B2
(45) Date of Patent: Jan. 19, 2021

(54) BIG DATA BLOCKCHAINS WITH MERKLE TREES

(71) Applicant: Tyson York Winarski, Mountain View, CA (US)

(72) Inventor: Tyson York Winarski, Mountain View, CA (US)

(*) Notice: Subject to any disclaimer, the term of this patent is extended or adjusted under 35 U.S.C. 154(b) by 0 days.

(21) Appl. No.: 16/819,112

(22) Filed: Mar. 15, 2020

(65) Prior Publication Data

US 2020/0394181 A1 Dec. 17, 2020

Related U.S. Application Data

(60) Provisional application No. 62/861,272, filed on Jun. 13, 2019.

(51) Int. Cl.
| G06F 7/02 | (2006.01) |
|---|---|
| G06F 16/00 | (2019.01) |
| G06F 16/23 | (2019.01) |
| G06F 16/22 | (2019.01) |
| G06F 16/901 | (2019.01) |

(52) U.S. Cl.
CPC ...... G06F 16/2379 (2019.01); G06F 16/2246 (2019.01); G06F 16/2255 (2019.01); G06F 16/9027 (2019.01)

(58) Field of Classification Search
CPC .......... G06F 16/2379; G06F 16/2246; G06F 16/2255; G06F 16/9027; G06F 16/137; H04L 9/0637; H04L 9/0643; G06Q 20/401
See application file for complete search history.

(56) References Cited

U.S. PATENT DOCUMENTS

| 10,042,782 | B2 | 8/2018 | Struttmann | |
|---|---|---|---|---|
| 10,541,807 | B1 * | 1/2020 | Morimura | H04L 9/3239 |
| 2018/0285996 | A1 | 10/2018 | Ma | |
| 2019/0288993 | A1 * | 9/2019 | Lin | H04L 63/08 |
| 2020/0136808 | A1 * | 4/2020 | Chasko | H04L 9/3239 |
| 2020/0252216 | A1 * | 8/2020 | Sharma | H04L 9/0637 |
| 2020/0252221 | A1 * | 8/2020 | Zamani | H04L 9/3239 |
| 2020/0265154 | A1 * | 8/2020 | Greven | G06F 16/93 |

* cited by examiner

*Primary Examiner* — Bruce M Moser
(74) *Attorney, Agent, or Firm* — The Winarski Firm, PLLC

(57) ABSTRACT

A non-transitory computer tangible medium is disclosed containing instructions for securing a large data set with a blockchained Merkle B-Tree. These instructions provide for accessing a large data set stored within a digital storage device, assigning each object of the large data set to a node of a Merkle B-Tree, and generating vertical blockchains that begin with a root node of the Merkle B-Tree and extend outward toward leaf nodes of the Merkle B-Tree based on data within each object. As a result, vertically blockchained Merkle B-Tree for containing the large data set as data are formed.

20 Claims, 49 Drawing Sheets

| B-Block ID 20 | B-Block with Blockchain HASH Digest Appended to Object Data-Pointer to Paired-Object 21 |
|---|---|
| 201B | *Blockchain HASH Digest in B-Block 201B is hash of root 201<br>*DATA–pointer to paired-object 201-201B stored on DVD, tape, SSD, or HDD. |
| 211B | *Blockchain HASH Digest in B-Block 211B is the hash of object 211 and B-Block 201B.<br>*DATA–pointer to paired-object 211-211B stored on DVD, tape, SSD, or HDD. |
| 212B | *Blockchain HASH Digest in B-Block 212B is of the hash of object 212 and B-Block-201B.<br>*DATA–pointer to paired-object 212-212B stored on DVD, tape, SSD, or HDD. |
| 221B | *Blockchain HASH Digest in B-Block 221B is the hash of object 221 and B-Block 211B.<br>*DATA–pointer to paired-object 221-221B stored on DVD, tape, SSD, or HDD. |
| 222B | *Blockchain HASH Digest in B-Block 222B is of the hash of object 222 and B-Block 211B.<br>*DATA–pointer to paired-object 222-222B stored on DVD, tape, SSD, or HDD. |
| 223B | *Blockchain HASH Digest in B-Block 223B is the hash of object 223 and B-Block 212B.<br>*DATA–pointer to paired-object 223-223B stored on DVD, tape, SSD, or HDD. |
| 224B | *Blockchain HASH Digest in B-Block 224B is of the hash of object 224 and B-Block 212B.<br>*DATA–pointer to paired-object 224-224B stored on DVD, tape, SSD, or HDD. |

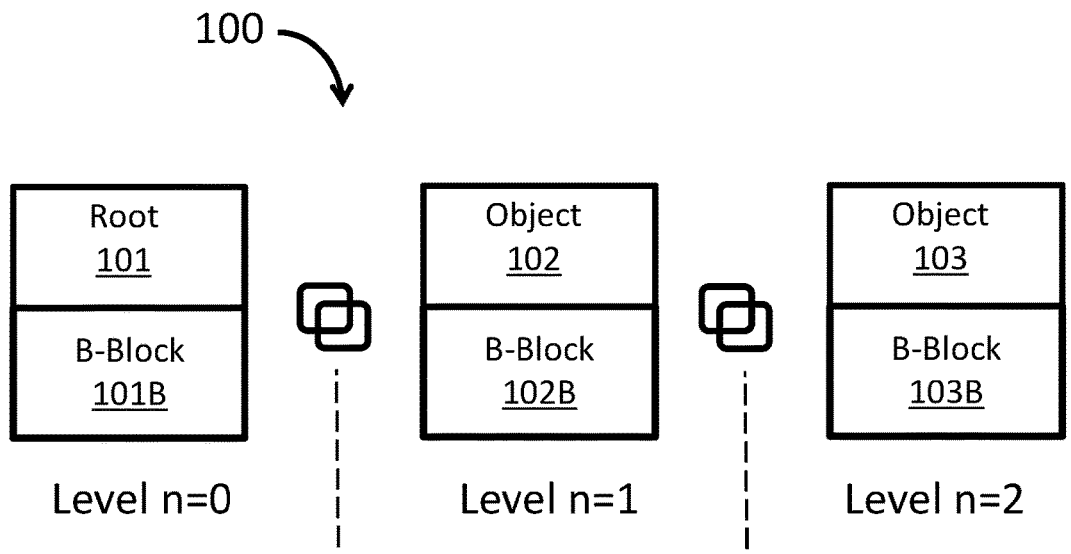

| B-Block ID 10 | B-Block with Blockchain HASH Digest Appended to Object Data–Pointer to Paired-Object 11 |
|---|---|
| 101B | *Blockchain HASH Digest in B-Block 101B is hash of root 101.<br>*DATA–pointer to paired-object 101-101B stored on DVD, tape, SSD, or HDD. |
| 102B | *Blockchain HASH Digest in B-Block 102B is the hash of object 102 and B-Block 101B.<br>*DATA–pointer to paired-object 102-102B stored on DVD, tape, SSD, or HDD. |
| 103B | *Blockchain HASH Digest in B-Block 103B is of the hash of object 103 and B-Block 102B.<br>*DATA–pointer to paired-object 103-103B stored on DVD, tape, SSD, or HDD. |

FIG. 1
(PRIOR ART)

| B-Block ID 20 | B-Block with Blockchain HASH Digest Appended to Object Data-Pointer to Paired-Object 21 |
|---|---|
| 201B | *Blockchain HASH Digest in B-Block 201B is hash of root 201<br>*DATA–pointer to paired-object 201-201B stored on DVD, tape, SSD, or HDD. |
| 211B | *Blockchain HASH Digest in B-Block 211B is the hash of object 211 and B-Block 201B.<br>*DATA–pointer to paired-object 211-211B stored on DVD, tape, SSD, or HDD. |
| 212B | *Blockchain HASH Digest in B-Block 212B is of the hash of object 212 and B-Block-201B.<br>*DATA–pointer to paired-object 212-212B stored on DVD, tape, SSD, or HDD. |
| 221B | *Blockchain HASH Digest in B-Block 221B is the hash of object 221 and B-Block 211B.<br>*DATA–pointer to paired-object 221-221B stored on DVD, tape, SSD, or HDD. |
| 222B | *Blockchain HASH Digest in B-Block 222B is of the hash of object 222 and B-Block 211B.<br>*DATA–pointer to paired-object 222-222B stored on DVD, tape, SSD, or HDD. |
| 223B | *Blockchain HASH Digest in B-Block 223B is the hash of object 223 and B-Block 212B.<br>*DATA–pointer to paired-object 223-223B stored on DVD, tape, SSD, or HDD. |
| 224B | *Blockchain HASH Digest in B-Block 224B is of the hash of object 224 and B-Block 212B.<br>*DATA–pointer to paired-object 224-224B stored on DVD, tape, SSD, or HDD. |

FIG. 2B

| B-Block ID 20 | B-Block with Blockchain HASH Digest Appended to Object Data-Pointer to Paired-Object 21 |
|---|---|
| 231B | *Blockchain HASH Digest in B-Block 231B is the hash of object 231 and B-Block 221B.<br>*DATA–pointer to paired 231-231B on DVD, tape, SSD, or HDD. |
| 232B | *Blockchain HASH Digest in B-Block 232B is the hash of object 232 and B-Block 221B.<br>*DATA–pointer to paired 232-232B on DVD, tape, SSD, or HDD. |
| 233B | *Blockchain HASH Digest in B-Block 233B is the hash of object 233 and B-Block 222B.<br>*DATA–pointer to paired 233-233B on DVD, tape, SSD, or HDD. |
| 234B | *Blockchain HASH Digest in B-Block 234B is the hash of object 234 and B-Block 222B.<br>*DATA–pointer to paired 234-234B on DVD, tape, SSD, or HDD. |
| 235B | *Blockchain HASH Digest in B-Block 235B is the hash of object 235 and B-Block 223B.<br>*DATA–pointer to paired 235-235B on DVD, tape, SSD, or HDD. |
| 236B | *Blockchain HASH Digest in B-Block 236B is the hash of object 236 and B-Block 223B.<br>*DATA–pointer to paired 236-236B on DVD, tape, SSD, or HDD. |
| 237B | *Blockchain HASH Digest in B-Block 237B is the hash of object 237 and B-Block 224B.<br>*DATA–pointer to paired 237-237B on DVD, tape, SSD, or HDD. |
| 238B | *Blockchain HASH Digest in B-Block 238B is the hash of object 238 and B-Block 224B.<br>*DATA–pointer to paired 238-238B on DVD, tape, SSD, or HDD. |

FIG. 2C

| B-Block ID 30 | B-Block with Blockchain HASH Digest Appended to Object Data-Pointer to Paired-Object 31 |
|---|---|
| 301B | *Blockchain HASH Digest in B-Block 301B is hash of root 301.<br>*DATA–pointer to paired-object 301-301B stored on DVD, tape, SSD, or HDD. |
| 311B | *Blockchain HASH Digest in B-Block 311B is the hash of object 311 and B-Block 301B.<br>*DATA–pointer to paired-object 311-311B stored on DVD, tape, SSD, or HDD. |
| 312B | *Blockchain HASH Digest in B-Block 312B is of the hash of object 312 and B-Block-301B.<br>*DATA–pointer to paired-object 312-312B stored on DVD, tape, SSD, or HDD. |
| 312C | *Blockchain HASH Digest in B-Block 313B is of the hash of object 313 and B-Block-301B.<br>*DATA–pointer to paired-object 313-313B stored on DVD, tape, SSD, or HDD. |

FIG. 3B

| B-Block ID 30 | B-Block with Blockchain HASH Digest Appended to Object Data-Pointer to Paired-Object 31 |
|---|---|
| 321B | *Blockchain HASH Digest in B-Block 321B is the hash of object 321 and B-Block 311B.<br>*DATA–pointer to paired 321-321B on DVD, tape, SSD, or HDD. |
| 322B | *Blockchain HASH Digest in B-Block 322B is of the hash of object 322 and B-Block 311B.<br>*DATA–pointer to paired 322-322B on DVD, tape, SSD, or HDD. |
| 323B | *Blockchain HASH Digest in B-Block 323B is the hash of object 323 and B-Block 311B.<br>*DATA–pointer to paired 323-323B on DVD, tape, SSD, or HDD. |
| 324B | *Blockchain HASH Digest in B-Block 324B is of the hash of object 324 and B-Block 312B.<br>*DATA–pointer to paired 324-324B on DVD, tape, SSD, or HDD. |
| 325B | *Blockchain HASH Digest in B-Block 325B is of the hash of object 325 and B-Block 312B.<br>*DATA–pointer to paired 325-325B on DVD, tape, SSD, or HDD. |
| 326B | *Blockchain HASH Digest in B-Block 326B is of the hash of object 326 and B-Block 312B.<br>*DATA–pointer to paired 326-326B on DVD, tape, SSD, or HDD. |
| 327B | *Blockchain HASH Digest in B-Block 327B is of the hash of object 327 and B-Block 313B.<br>*DATA–pointer to paired 327-327B on DVD, tape, SSD, or HDD. |
| 328B | *Blockchain HASH Digest in B-Block 328B is of the hash of object 328 and B-Block 313B.<br>*DATA–pointer to paired 328-328B on DVD, tape, SSD, or HDD. |
| 329B | *Blockchain HASH Digest in B-Block 329B is of the hash of object 329 and B-Block 313B.<br>*DATA–pointer to paired 329-329B on DVD, tape, SSD, or HDD. |

| Level "n" 501 | Cumulative Total: Merkle B-Tree Order O=1 502 | Cumulative Total: Merkle B-Tree Order O=2 503 | Cumulative Total: Merkle B-Tree Order O=3 504 | Cumulative Total: Merkle B-Tree Order O=4 505 |
|---|---|---|---|---|
| 0 | 1 | 1 | 1 | 1 |
| 1 | 2 | 3 | 4 | 5 |
| 2 | 3 | 7 | 13 | 21 |
| 3 | 4 | 15 | 40 | 85 |
| 4 | 5 | 31 | 121 | 341 |
| 5 | 6 | 63 | 364 | 1,365 |
| 6 | 7 | 127 | 1,093 | 5,461 |
| 7 | 8 | 255 | 3,280 | 21,845 |
| 8 | 9 | 511 | 9,841 | 87,381 |
| 9 | 10 | 1,023 | 29,524 | 349,525 |
| 10 | 11 | 2,047 | 88,573 | 1,398,101 |
| 11 | 12 | 4,095 | 265,720 | 5,592,405 |
| 12 | 13 | 8,191 | 797,161 | 22,369,621 |
| 13 | 14 | 16,383 | 2,391,484 | 89,478,485 |
| 14 | 15 | 32,767 | 7,174,453 | 357,913,941 |
| 15 | 16 | 65,535 | 21,523,360 | 1,431,655,765 |

| B-Block ID 50 | B-Block with Blockchain HASH Digest Appended to Object Data–Pointer to Paired-Object 51 |
|---|---|
| 201B | *Blockchain HASH Digest in B-Block 201B is hash of root 201, as calculated by single processor 601. <br> *DATA–pointer to paired-object 201-201B stored on DVD, tape, SSD, or HDD. |
| 211B | *Blockchain HASH Digest in B-Block 211B is the hash of object 211 and B-Block 201B, as calculated by parallel processor 611. <br> *DATA–pointer to paired-object 211-211B stored on DVD, tape, SSD, or HDD. |
| 212B | *Blockchain HASH Digest in B-Block 212B is of the hash of object 212 and B-Block-201B, as calculated by parallel processor 612. <br> *DATA–pointer to paired-object 212-212B stored on DVD, tape, SSD, or HDD. |
| 221B | *Blockchain HASH Digest in B-Block 221B is the hash of object 221 and B-Block 211B, as calculated by parallel processor 621. <br> *DATA–pointer to paired-object 221-221B stored on DVD, tape, SSD, or HDD. |
| 222B | *Blockchain HASH Digest in B-Block 222B is of the hash of object 222 and B-Block 211B, as calculated by parallel processor 622. <br> *DATA–pointer to paired-object 222-222B stored on DVD, tape, SSD, or HDD. |
| 223B | *Blockchain HASH Digest in B-Block 223B is the hash of object 223 and B-Block 212B, as calculated by parallel processor 623. <br> *DATA–pointer to paired-object 223-223B stored on DVD, tape, SSD, or HDD. |
| 224B | *Blockchain HASH Digest in B-Block 224B is of the hash of object 224 and B-Block 212B, as calculated by parallel processor 624. <br> *DATA–pointer to paired-object 224-224B stored on DVD, tape, SSD, or HDD. |

FIG. 6B

| B-Block ID 50 | B-Block with Blockchain HASH Digest Appended to Object Data-Pointer to Paired-Object 51 |
|---|---|
| 231B | *Blockchain HASH Digest in B-Block 231B is the hash of object 231 and B-Block 221B, as calculated by parallel processor 631. *DATA–pointer to paired 231-231B on DVD, tape, SSD, or HDD. |
| 232B | *Blockchain HASH Digest in B-Block 232B is the hash of object 232 and B-Block 221B, as calculated by parallel processor 632 *DATA–pointer to paired 232-232B on DVD, tape, SSD, or HDD. |
| 233B | *Blockchain HASH Digest in B-Block 233B is the hash of object 233 and B-Block 222B as calculated by parallel processor 633. *DATA–pointer to paired 233-233B on DVD, tape, SSD, or HDD. |
| 234B | *Blockchain HASH Digest in B-Block 234B is the hash of object 234 and B-Block 222B, as calculated by parallel processor 634. *DATA–pointer to paired 234-234B on DVD, tape, SSD, or HDD. |
| 235B | *Blockchain HASH Digest in B-Block 235B is the hash of object 235 and B-Block 223B, as calculated by parallel processor 635. *DATA–pointer to paired 235-235B on DVD, tape, SSD, or HDD. |
| 236B | *Blockchain HASH Digest in B-Block 236B is the hash of object 236 and B-Block 223B, as calculated by parallel processor 636. *DATA–pointer to paired 236-236B on DVD, tape, SSD, or HDD. |
| 237B | *Blockchain HASH Digest in B-Block 237B is the hash of object 237 and B-Block 224B, as calculated by parallel processor 637. *DATA–pointer to paired 237-237B on DVD, tape, SSD, or HDD. |
| 238B | *Blockchain HASH Digest in B-Block 238B is the hash of object 238 and B-Block 224B as calculated by parallel processor 638. *DATA–pointer to paired 238-238B on DVD, tape, SSD, or HDD. |

FIG. 6D

| B-Block ID 60 | B-Block with Blockchain HASH Digest Appended to Object Data-Pointer to Paired-Object 61 |
|---|---|
| 301B | *Blockchain HASH Digest in B-Block 301B is hash of root 301, as calculated by single processor 701.<br>*DATA–pointer to paired-object 301-301B stored on DVD, tape, SSD, or HDD. |
| 311B | *Blockchain HASH Digest in B-Block 311B is the hash of object 311 and B-Block 301B, as calculated by parallel processor 711.<br>*DATA–pointer to paired-object 311-311B stored on DVD, tape, SSD, or HDD. |
| 312B | *Blockchain HASH Digest in B-Block 312B is of the hash of object 312 and B-Block-301B, as calculated by parallel processor 712.<br>*DATA–pointer to paired-object 312-312B stored on DVD, tape, SSD, or HDD. |
| 313B | *Blockchain HASH Digest in B-Block 313B is of the hash of object 313 and B-Block-301B, as calculated by parallel processor 713.<br>*DATA–pointer to paired-object 313-313B stored on DVD, tape, SSD, or HDD. |

FIG. 7B

| B-Block ID 60 | B-Block with Blockchain HASH Digest Appended to Object Data-Pointer to Paired-Object 61 |
|---|---|
| 321B | *Blockchain HASH Digest in B-Block 321B is the hash of object 321 and B-Block 311B, as calculated by parallel processor 721. *DATA–pointer to paired 321-321B on DVD, tape, SSD, or HDD. |
| 322B | *Blockchain HASH Digest in B-Block 322B is of the hash of object 322 and B-Block 311B, as calculated by parallel processor 722. *DATA–pointer to paired 322-322B on DVD, tape, SSD, or HDD. |
| 323B | *Blockchain HASH Digest in B-Block 323B is the hash of object 323 and B-Block 311B, as calculated by parallel processor 723. * DATA–pointer to paired 323-323B on DVD, tape, SSD, or HDD. |
| 324B | *Blockchain HASH Digest in B-Block 324B is of the hash of object 324 and B-Block 312B, as calculated by parallel processor 724. *DATA–pointer to paired 324-324B on DVD, tape, SSD, or HDD. |
| 325B | *Blockchain HASH Digest in B-Block 325B is of the hash of object 325 and B-Block 312B, as calculated by parallel processor 725. *DATA–pointer to paired 324-324B on DVD, tape, SSD, or HDD. |
| 326B | *Blockchain HASH Digest in B-Block 326B is of the hash of object 326 and B-Block 312B, as calculated by parallel processor 726. *DATA–pointer to paired 326-326B on DVD, tape, SSD, or HDD. |
| 327B | *Blockchain HASH Digest in B-Block 327B is of the hash of object 327 and B-Block 313B, as calculated by parallel processor 727. *DATA–pointer to paired 327-327B on DVD, tape, SSD, or HDD. |
| 328B | *Blockchain HASH Digest in B-Block 328B is of the hash of object 328 and B-Block 313B, as calculated by parallel processor 728. *DATA–pointer to paired 328-328B on DVD, tape, SSD, or HDD. |
| 329B | *Blockchain HASH Digest in B-Block 329B is of the hash of object 329 and B-Block 313B, as calculated by parallel processor 729. *DATA–pointer to paired 329-329B on DVD, tape, SSD, or HDD. |

FIG. 7D

| B-Block ID 70 | B-Block with Blockchain HASH Digest Appended to Object Data-Pointer to Paired-Object 71 |
|---|---|
| 901B | *Blockchain HASH Digest in B-Block 901B is hash of video root 901.<br>*DATA–pointer to paired-object 901-901B stored on DVD, tape, SSD, or HDD. |
| 911B | *Blockchain HASH Digest in B-Block 911B is the hash of scenes 1-3 (911) and B-Block 901B.<br>*DATA–pointer to paired-object 911-911B stored on DVD, tape, SSD, or HDD. |
| 912B | *Blockchain HASH Digest in B-Block 912B is of the hash of scenes 4-6 (912) and B-Block-901B.<br>*DATA–pointer to paired-object 912-912B stored on DVD, tape, SSD, or HDD. |
| 913B | *Blockchain HASH Digest in B-Block 913B is of the hash of scenes 7-9 (913) and B-Block-901B.<br>*DATA–pointer to paired-object 913-913B stored on DVD, tape, SSD, or HDD. |

FIG. 9D

| B-Block ID 70 | B-Block with Blockchain HASH Digest Appended to Object Data-Pointer to Paired-Object 71 |
|---|---|
| 921B | *Blockchain HASH Digest in B-Block 921B is hash of scene-1 (921) and B-Block 911B.<br>*DATA–pointer to paired-object 921-921B stored on DVD, tape, SSD, or HDD. |
| 931B | *Blockchain HASH Digest in B-Block 931B is the hash of snippets 1-3 (931) and B-Block 921B.<br>*DATA–pointer to paired-object 931-931B stored on DVD, tape, SSD, or HDD. |
| 932B | *Blockchain HASH Digest in B-Block 932B is of the hash of snippets 4-6 (932) and B-Block-921B.<br>*DATA–pointer to paired-object 932-932B stored on DVD, tape, SSD, or HDD. |
| 933B | *Blockchain HASH Digest in B-Block 933B is of the hash of snippets 7-9 (933) and B-Block-921B.<br>*DATA–pointer to paired-object 933-933B stored on DVD, tape, SSD, or HDD. |

FIG. 9F

| B-Block ID 70 | B-Block with Blockchain HASH Digest Appended to Object Data-Pointer to Paired-Object 71 |
|---|---|
| 941B | *Blockchain HASH Digest in B-Block 941B is hash of snippet-1 (941) and B-Block 931B.<br>*DATA–pointer to paired-object 941-941B stored on DVD, tape, SSD, or HDD. |
| 951B | *Blockchain HASH Digest in B-Block 951B is the hash of GOPs 1-3 (951) and B-Block 941B.<br>*DATA–pointer to paired-object 951-951B stored on DVD, tape, SSD, or HDD. |
| 952B | *Blockchain HASH Digest in B-Block 952B is of the hash of GOPs 4-6 (952) and B-Block-941B.<br>*DATA–pointer to paired-object 952-952B stored on DVD, tape, SSD, or HDD. |
| 953B | *Blockchain HASH Digest in B-Block 953B is of the hash of GOPs 7-9 (953) and B-Block-941B.<br>*DATA–pointer to paired-object 953-953B stored on DVD, tape, SSD, or HDD. |
| 961B | *Blockchain HASH Digest in B-Block 961B is the hash of GOP-1 (961) and B-Block 951B.<br>*DATA–pointer to paired-object 961-961B stored on DVD, tape, SSD, or HDD. |

FIG. 9H

| B-Block ID 80 | B-Block with Blockchain HASH Digest Appended to Object Data-Pointer to Paired-Object 81 |
|---|---|
| 1001B | *Blockchain HASH Digest in B-Block 1001B is hash of three-dimensional database root 1001.<br>*DATA–pointer to paired-object 1001-1001B stored on DVD, tape, SSD, or HDD. |
| 1011B | *Blockchain HASH Digest in B-Block 1011B is the hash of sheets 1-3 (1011) and B-Block 1001B.<br>*DATA–pointer to paired-object 1011-1011B stored on DVD, tape, SSD, or HDD. |
| 1012B | *Blockchain HASH Digest in B-Block 1012B is of the hash of sheets 4-6 (1012) and B-Block-1001B.<br>*DATA–pointer to paired-object 1012-1012B stored on DVD, tape, SSD, or HDD. |
| 1013B | *Blockchain HASH Digest in B-Block 1013B is of the hash of sheets 7-9 (1013) and B-Block-1001B.<br>*DATA–pointer to paired-object 1013-1013B stored on DVD, tape, SSD, or HDD. |

FIG. 10C

| B-Block ID 80 | B-Block with Blockchain HASH Digest Appended to Object Data-Pointer to Paired-Object 81 |
|---|---|
| 1021B | *Blockchain HASH Digest in B-Block 1021B is hash of sheet 1 (1021) and B-Block 1011B.<br>*DATA–pointer to paired-object 1021-1021B stored on DVD, tape, SSD, or HDD. |
| 1031B | *Blockchain HASH Digest in B-Block 1031B is the hash of groups-of-columns 1-3 (1031) and B-Block 1021B.<br>*DATA–pointer to paired-object 1031-1031B stored on DVD, tape, SSD, or HDD. |
| 1032B | *Blockchain HASH Digest in B-Block 1032B is of the hash of groups-of-columns 4-6 (1032) and B-Block-1021B.<br>*DATA–pointer to paired-object 1032-1032B stored on DVD, tape, SSD, or HDD. |
| 1033B | *Blockchain HASH Digest in B-Block 1033B is of the hash of groups-of-columns 7-9 (1033) and B-Block-1021B.<br>*DATA–pointer to paired-object 1033-1033B stored on DVD, tape, SSD, or HDD. |

FIG. 10E

| B-Block ID 80 | B-Block with Blockchain HASH Digest Appended to Object Data-Pointer to Paired-Object 81 |
|---|---|
| 1041B | *Blockchain HASH Digest in B-Block 1041B is hash of column-group 1 (1041) and B-Block 1031B.<br>*DATA–pointer to paired-object 1041-1041B stored on DVD, tape, SSD, or HDD. |
| 1051B | *Blockchain HASH Digest in B-Block 1051B is the hash of groups-of-rows 1-3 (1051) and B-Block 1041B.<br>*DATA–pointer to paired-object 1051-1051B stored on DVD, tape, SSD, or HDD. |
| 1052B | *Blockchain HASH Digest in B-Block 1052B is of the hash of groups-of-rows 4-6 (1052) and B-Block 1041B.<br>*DATA–pointer to paired-object 1052-1052B stored on DVD, tape, SSD, or HDD. |
| 1053B | *Blockchain HASH Digest in B-Block 1053B is of the hash of groups-of-rows 7-9 (1053) and B-Block 1041B.<br>*DATA–pointer to paired-object 1053-1053B stored on DVD, tape, SSD, or HDD. |
| 1061B | *Blockchain HASH Digest in B-Block 1061B is the hash of Row-Group 1 (1061) and B-Block 1051B.<br>*DATA–pointer to paired-object 1061-1061B stored on DVD, tape, SSD, or HDD. |

FIG. 10G

BIG DATA BLOCKCHAINS WITH MERKLE TREES

FIELD OF THE INVENTION

The underlying idea behind this specification is to expand blockchain technology to big data. By big data, we envision thousands, millions, and even billions of data objects being blockchained. The enabling invention is the novel implementation of Merkle B-Trees to shorten the number levels between the root of the tree and nodes at the end most-branches from thousands, millions, or billions down to a small number such as a few dozens of levels, or less.

BACKGROUND

Blockchain technology is finding increasing use for insuring the error-free transfer of information. A hash algorithm takes input and converts it to, at a very high probability, a unique series of digits called a blockchain hash digest. The more digits in this blockchain hash digest, the less likely that there would be a collision, where different input had the same blockchain hash digest. The blockchain hash function demonstrates the avalanche effect, where a tiny change in the input, no matter how small, creates a significant change to the output digest. Since this specification improves upon the Merkle tree, we incorporate U.S. Pat. No. 4,309,569 by reference in its entirety.

This blockchain technology may be employed to big data, where there may be thousands, millions, and even billions of data objects to blockchain. Millions and billions of data objects may occur in digital movies, where each data object comprises I, P, and B frames organized in what is called a group of pictures (GOP). Each snippet is a collection of related GOPs, and several snippets are combined into a scene, and several scenes comprise a digital movie. It is by the creation of the Merkle B-Tree that such large numbers of data objects may be blockchained together. This blockchain technology may also apply to cryptocurrency transactions, images such as *.jpg and *.png, to messages sent across networks, and to the tracking of manipulations of large, multi-dimensional spreadsheets.

SUMMARY OF THE INVENTION

The present invention discloses a non-transitory computer tangible medium containing instructions for securing a large data set with a blockchained Merkle B-Tree. These instructions provide for accessing a large data set stored within a digital storage device, assigning each object of the large data set to a node of a Merkle B-Tree, and generating vertical blockchains that begin with a root node of the Merkle B-Tree and extend outward toward leaf nodes of the Merkle B-Tree based on data within each object. As a result, vertically blockchained Merkle B-Tree for containing the large data set as data are formed. These instructions may also provide for interrogating the large data set to determine the number of objects contained within it, and selecting a Merkle B-Tree having an order "O" and levels "n" that has an equal or greater number of nodes than there are objects within the large data set. The instructions may select the Merkle B-Tree having an order "O" and levels "n" based on additional criteria such as a combination of an optimal order "O" and level "n" that produces the closest number of nodes in the Merkle B-Tree to the number of objects that which is actually present in the large data set without going under a total number of objects within the large data set. Alternatively, the instructions may select the Merkle B-Tree to have an order "O" and levels "n" based on a higher order "O" than the optimal order for the Merkle B-Tree to reduce the length of the vertical blockchain between the root node and each leaf node. Alternatively, the instructions may select the Merkle B-Tree to have a lower order "O" than the optimal order for the Merkle B-Tree to reduce a parallel processing burden per level. The order "O" may remain constant for each level of the Merkle B-Tree, or the order "O" may vary for at least one level of the Merkle B-Tree from the remaining levels. The vertical blockchain may be formed of a plurality of object-pairs formed of a data object and a blockchain block, where each object-pair forms a single node of the Merkle B-Tree. The blockchain block may be formed of a blockchain hash digest based on the data object and a hash digest from a node at a lower level of the Merkle B-Tree from which the data object branches and a data pointer to the data object. The blockchain block further comprises a metadata wrapper that includes an identifier of the order "O" of the Merkle B-Tree, an identifier of the current level number "n" of the object on the Merkle B-Tree, and a blockchain hash digest algorithm identifier. The blockchain hash digest for all objects on a given level of the Merkle B-Tree may be computed simultaneously in parallel by an array of hash core processors, where the array of hash core processors has at least as many hash core processors as there are objects in the highest level of the Merkle B-Tree. The blockchain hash digest for all objects on a given level of the Merkle B-Tree may be computed serially individually by a single hash core processor. Alternatively, an array of hash core processors calculates the blockchain hash digest for all objects on a given level of the Merkle B-Tree by groups of objects until all blockchain hash digests for a given level of the Merkle B-Tree are computed. A blockchain distribution module stores copies of the vertically blockchained Merkle B-Tree for the large data set on the digital storage device and other nodes of a distributed network. The present invention is also directed toward a method for digital transmission of a large data set that has been vertically blockchained in a Merkle B-Tree. This method includes accessing a large data set stored within a digital storage device, mapping the large data set on to a Merkle B-Tree, generating a plurality of vertical blockchains that begin with a root node of the Merkle B-Tree and extend outward to each leaf node of the Merkle B-Tree to form a vertically blockchained Merkle B-Tree that contains the large data set, and digitally transmitting the vertically blockchained Merkle B-Tree that contains the large data set to a storage node via a distributed network, a satellite network, or a wireless transmission network. The mapping the large data set on to a Merkle B-Tree may include interrogating the large data set to determine the number of objects contained within it, selecting a Merkle B-Tree having an order "O" and levels "n" that has an equal or greater number of nodes than there are objects within the large data set, and assigning each object of the large data set to a node of a Merkle B-Tree. Mapping the large data set on to a Merkle B-Tree may also include selecting the Merkle B-Tree having an order "O" and levels "n" based on an additional criteria such as: a combination of an optimal order "O" and level "n" that produces the closest number of nodes to the number of objects which are actually present in the large data set without going under a total number of objects within the large data set; a higher order "O" than the optimal order for the Merkle B-Tree to minimize the length of the vertical blockchain between the root node and each leaf node; or a lower order "O" than the optimal order for the Merkle B-Tree to reduce a parallel processing burden per level. The order "O" may remains constant for each level of the Merkle B-Tree, or the order "O" may vary for at least one level of the Merkle B-Tree from the remaining levels. The vertical blockchain may be formed of a plurality of object-pairs formed of a data object and a blockchain block, where each object-pair forms a single node of the Merkle B-Tree. The blockchain block includes a blockchain hash digest based on the object and a hash digest from a node at a lower level of the Merkle B-Tree from which the data object branches and a metadata wrapper. The metadata wrapper includes an identifier of the order "O" of the Merkle B-Tree, an identifier of the current level number "n" of the object on the Merkle B-Tree, and a blockchain hash digest algorithm identifier. The blockchain hash digests for all objects on a given level of the Merkle B-Tree may be computed simultaneously in parallel by an array of hash core processors, where the array of hash core processors has at least as many hash core processors as there are objects in the highest level of the Merkle B-Tree. The blockchain hash digest for all objects on a given level of the Merkle B-Tree may be computed serially individually by a single hash core processor. Alternatively, an array of hash core processors calculates the blockchain hash digest for all objects on a given level of the Merkle B-Tree by groups of objects until all blockchain hash digests for a given level are computed. A blockchain distribution module stores copies of the vertically blockchained Merkle B-Tree for the large data set on the digital storage device and other nodes of a distributed network. Further aspects of the invention will become apparent as the following description proceeds and the features of novelty, which characterize this invention, are pointed out with particularity in the claims annexed to and forming a part of this specification.

BRIEF DESCRIPTION OF THE DRAWINGS

The novel features that are considered characteristic of the invention are set forth with particularity in the appended claims. The invention itself, however, both as to its structure and operation together with the additional objects and advantages thereof are best understood through the following description of the preferred embodiment of the present invention when read in conjunction with the accompanying drawings, wherein:

FIG. 1 illustrates levels n=0 to n=2 of a Merkle B-Tree of order O=1;

FIG. 2B illustrates a table describing the blockchaining of levels n=0 to n=2 of a Merkle B-Tree of order O=2;

FIG. 2C illustrates a table describing the blockchaining of level n=3 of a Merkle B-Tree of order O=2;

FIG. 3B illustrates a table describing the blockchaining of levels n=0 to n=1 of a Merkle B-Tree of order O=3;

FIG. 3C illustrates a table describing the blockchaining of level n=2 of a Merkle B-Tree of order O=3;

FIG. 6B illustrates a table describing the blockchaining of a Merkle B-Tree of order O=2 with single-core processing at level n=0 and multiple-core parallel processing at levels n=1 and n=2;

FIG. 6D illustrates a table describing the blockchaining of a Merkle B-Tree of order O=2 with parallel processing in level n=3;

FIG. 7B illustrates a table describing the blockchaining of a Merkle B-Tree of order O=3 with single-core processing at level n=0 and multiple-core parallel processing at level n=1;

FIG. 7D illustrates a table describing the blockchaining of a Merkle B-Tree of order O=3 with multiple-core parallel processing at level n=2;

FIG. 9D illustrates a table describing the blockchaining of levels n=0 (DVD content) through n=2 (individual scene) of an example Merkle B-Tree of order O=3 for DVD video;

FIG. 9F illustrates a table describing the blockchaining of levels n=2 (individual scene) through n=4 (individual snippet) of an example Merkle B-Tree of order O=3 for DVD video;

FIG. 9H illustrates a table describing the blockchaining of levels n=4 (individual snippet) through n=6 (individual GOP) of an example Merkle B-Tree of order O=3 for DVD video;

FIG. 10C illustrates a table describing the blockchaining of levels n=0 (three-dimensional data array) through n=2 (individual sheets) of an example Merkle B-Tree of order O=3 for multi-dimensional data arrays;

FIG. 10E illustrates a table describing the blockchaining of levels n=2 (sheet-1) through n=4 (individual groups of columns) of an example Merkle B-Tree of order O=3 for multi-dimensional data arrays;

FIG. 10G illustrates a table describing the blockchaining of levels n=4 (row-group 1) through n=6 (individual groups of rows) of an example Merkle B-Tree of order O=3 for multi-dimensional data arrays

DETAILED DESCRIPTION

Figure 2A:
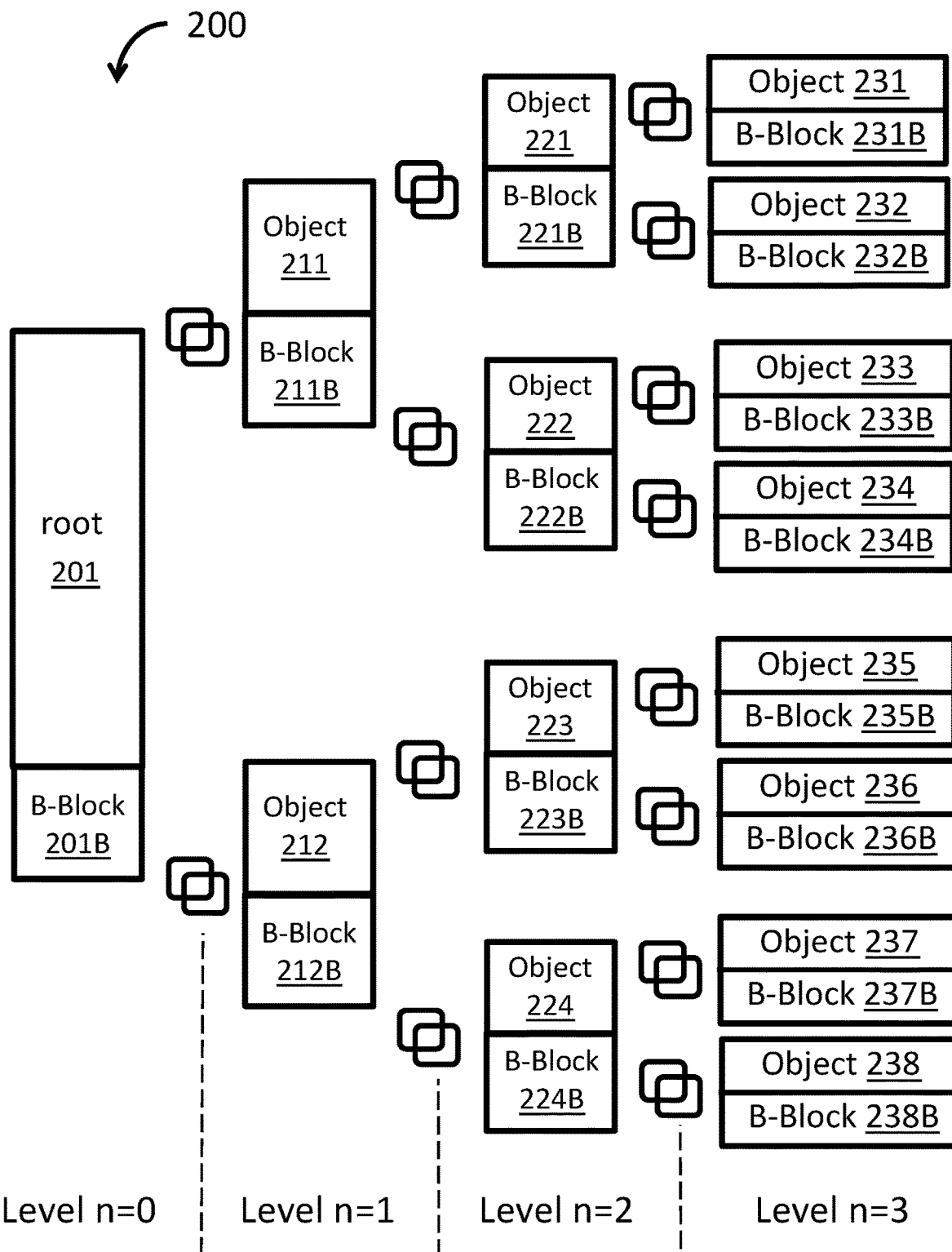
FIG. 2A illustrates levels n=0 to n=3 of a Merkle B-Tree of order O=2.

While the invention has been shown and described with reference to a particular embodiment thereof, it will be understood to those skilled in the art, that various changes in form and details may be made therein without departing from the spirit and scope of the invention. The present invention provides a blockchain technology compatible for big data applications through Merkle B-Tree structures. Merkle B-Trees are a tree data structure in which each node can have any number of branches extending from that node. Merkle B-Trees are described through levels and order. Merkle B-Trees are a tiered data structure originating from a root node that has a series of levels ("n") below the root node. Merkle B-Trees originate from the root node and extend outward to the outermost nodes which are referred to as leaf nodes. The root node has a level of n=0. The nodes that branch directly to the root node have a level of n=1. The nodes that branch directly to the nodes on level n=1 have a level of n=2 and so on. The number of branches extending from a node is referred to as the Order ("O"). A node having one branch has an order of O=1. A node having two branches has an order of O=2, and so on. A Merkle B-Tree may have the same order for every level of the tree. Alternatively, a Merkle B-Tree may have different orders on different levels. However, each node of the Merkle B-Tree will have the same number of branches, based on the order, for a given level. The present invention utilizes Merkle B-Trees to create an efficient blockchain technology for big data through the use of vertical blockchains within the Merkle B-Tree. A vertical blockchain within the Merkle B-Tree extends from the root node to the leaf node, including interlinking hashes between the nodes interconnecting the root node to the end leaf node of interest. A horizontal blockchain within the Merkle B-Tree is one formed between nodes on the same level of the Merkle B-Tree. Vertical blockchains within a Merkle B-Tree provide data integrity assurance through linking data back to the root node with a blockchain. Horizontal blockchains provide data integrity assurance through linking all nodes within a given level of a Merkle B-Tree with a blockchain. If horizontal blockchains are used, they typically blockchain the outermost leaf level of the tree structure only. Within this specification, Blockchain Blocks are referred to as B-Blocks. B-Blocks contain the blockchain hashing information and other data regarding a block of data, which is referred in this specification as an object. Each object is paired with its associated B-block to form a paired-object. Data pointers for each object is generated and stored within its respective B-Block. A Merkle B-Tree structure that utilizes vertical blockchains that span across multiple levels provide a multidimensional blockchain that is capable for providing data integrity assurance for complex big data structures such as multi-dimensional databases. Simple horizontal blockchains that are limited to a single level cannot provide the same level of data integrity assurance for complex big data structures as the levels within the Merkle B-Tree are not interlinked together through a blockchain technology. Vertical blockchains allow for the interrogation of data integrity at various levels of the data structure within a complex big data set. For example, with respect to a multidimensional spreadsheet, a vertical blockchain would interlink a series of sheets each with columns and rows, each of which would be treated as a separate object. A user could therefore seek to verify data integrity of that multidimensional spreadsheet at various levels such as sheet level, column level, or row level through the use of a vertical blockchain. FIG. 1 illustrates a Merkle B-Tree 100 of order O=1, meaning that there is only one branch from each node. Merkle B-Trees having an order of O=1 replicate conventional blockchains that are a single serial chain of individual data blocks and is shown for illustrative purposes. While the Merkle B-Tree of order O=1 shown in FIG. 1 replicates a conventional serial blockchain structure known in the prior art, it is different from these known prior art blockchains in that it is Merkle B-Tree structure that has properties of an order and levels, which are absent from blockchains that interlink a serial chain of data blocks. Root data object 101, in level-0, has B-Block 101B, and each succeeding data object in each succeeding level has its own B-Block. All B-Blocks are designated by a suffix "B," such as 101B, 102B, and 103B in FIG. 1. As explained in the table in FIG. 1, column 10 gives the B-Block ID and column 11 gives the B-Block with blockchain HASH digest appended to object, and a data-pointer to the paired-object. Specifically, for level n=0, the blockchain HASH digest in root B-Block 101B is the hash of the root object 101. Then B-Block 101B is appended to object 101 to create paired-object 101-101B, a data-pointer for the paired-object 101-101B is generated, and the paired-object is stored. For level n=1, the blockchain HASH digest in B-Block 102B is the hash of object 102 and previous B-Block 101B. Then B-Block 102B is appended to object 102 to create paired-object 102-102B, a data-pointer for paired-object 102-102B is generated, and the paired-object is stored. It is this selective hashing of B-Block 101B from level n=0 together with object 102 from level n=1, which blockchains level n=1 and level n=0. Continuing, in serial fashion, the blockchain HASH digest in B-Block 103B is the hash of object 103 and previous B-Block 102B. Then B-Block 103B is appended to object 103 to create paired-object 103-103B, a data-pointer for paired-object 103-103B is generated, and the paired-object is stored. It is this selective hashing of B-Block 102B from level n=1 together with object 103 from level n=2, which blockchains level n=2 and level n=1. The format and contents of B-Blocks, which serve as a wrapper for blockchain hash digests, are discussed in more detail in FIG. 8. This Merkle B-Tree of order O=1 is how blockchain is employed today, and it is very practical for smart contracts where there are few levels from the beginning of the process to the end. The levels "n" in FIG. 1 are not limited to n=0, n=1, and n=2, but only these are shown for brevity. However, use of the "serial" Merkle B-Tree of order O=1 is limiting, when trying to apply it large and complicated data structures, such as digital video and multi-dimensional data-bases.

Figure 2D:
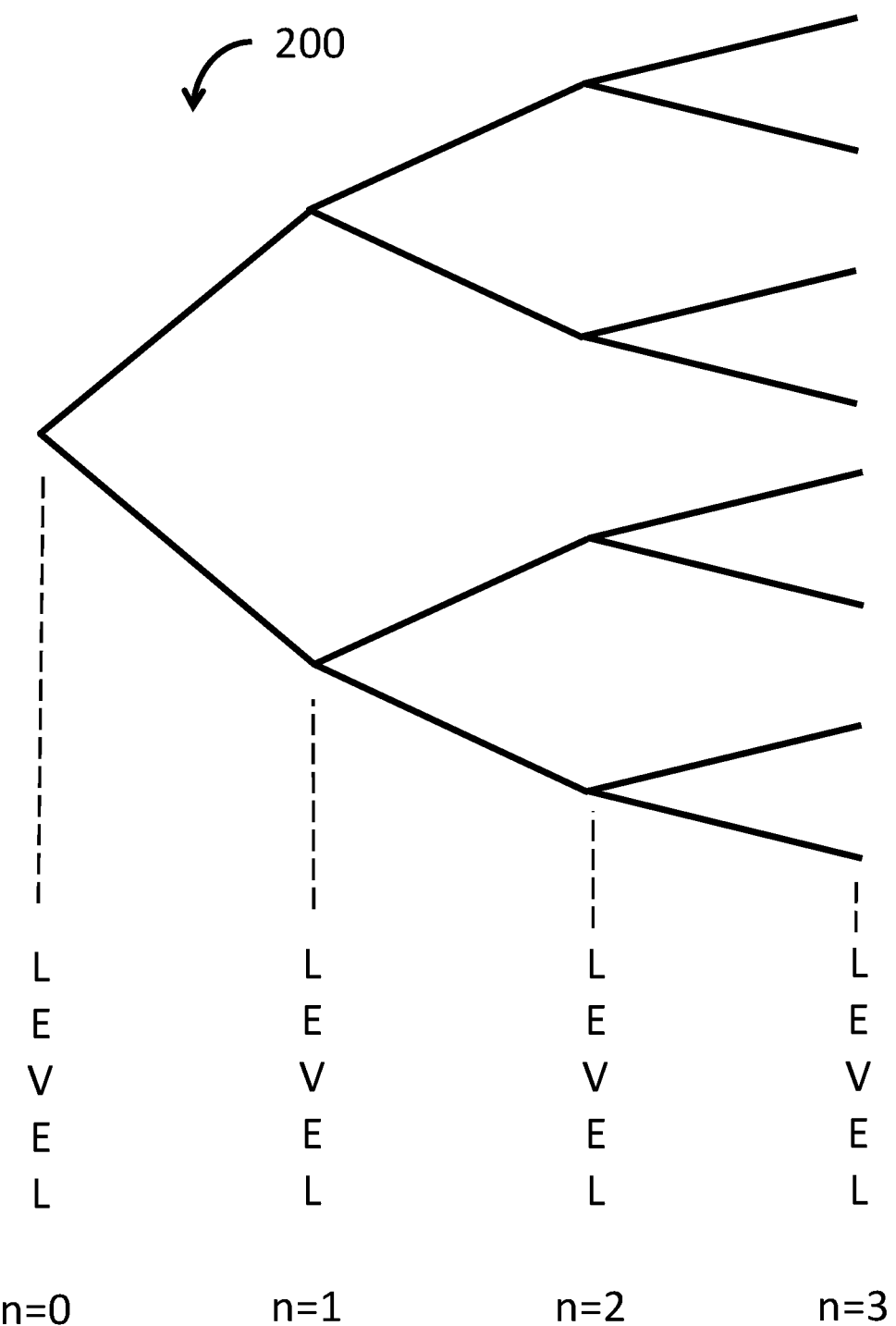
FIG. 2D illustrates a diagram describing the Merkle B-Tree of order O=2.

FIGS. 2A, 2B, 2C, and 2D illustrate a novel Merkle B-Tree 200 of order O=2, meaning that there are two branches from each node. In FIG. 2A, for level n=0, root data object 201 has B-Block 201B, and each succeeding data object has its own B-Block, as designated by a "B" suffix. As explained in the table in FIGS. 2B and 2C, column 20 gives the B-Block ID and column 21 gives the B-Block with blockchain HASH digest appended to object, and a data-pointer to the paired-object. Specifically, for level n=0, the blockchain HASH digest in root B-Block 201B is the hash of the root object 201. Then B-Block 201B is appended to object 201 to create paired-object 201-201B, then a data-pointer for the paired-object 201-201B is generated, and then this paired-object is stored. For level n=1, as shown in FIG. 2B, the blockchain HASH digest in B-Block 211B is the hash of object 211 and previous B-Block 201B. Additionally, the blockchain HASH digest in B-Block 212B is the hash of object 212 and previous B-Block 201B. Then B-Block 211B is appended to object 211 to create paired-object 211-211B, and B-Block 212B is appended to object 212 to create paired-object 212-212B. Following that, then one data-pointer for each paired-object 211-211B and 212-212B is generated, and then these paired-objects are stored. It is this selective hashing of B-Block 201B from level n=0 together with individual objects 211 and 212 in level n=1 which blockchains level n=1 and level n=0. For level n=2, the blockchain HASH digest in B-Block 221B is the hash of object 221 and previous B-Block 211B; the blockchain HASH digest in B-Block 222B is the hash of object 222 and previous B-Block 211B; the blockchain HASH digest in B-Block 223B is the hash of object 223 and previous B-Block 212B; and the blockchain HASH digest in B-Block 224B is the hash of object 224 and previous B-Block 212B. Then B-Block 221B is appended to object 221 to create paired-object 221-221B, B-Block 222B is appended to object 222 to create paired-object 222-222B, B-Block 223B is appended to object 223 to create paired-object 223-223B, and B-Block 224B is appended to object 224 to create paired-object 224-224B. Following that, then one data-pointer for each paired-object 221-221B, 222-222B, 223-223B, and 224-224B is generated, and then these paired-objects are stored. It is this selective hashing of B-Block 211B from level n=1 together with objects 221 and 222, respectively, in level n=2, and selective hashing B-Block 212B from level n=1 together with objects 223 and 224, respectively, in level n=2, which blockchains level n=2 and level n=1. For level n=3, as shown in FIG. 2C, the blockchain HASH digest in B-Block 231B is the hash of object 231 and previous B-Block 221B. Additionally, the blockchain HASH digest in B-Block 232B is the hash of object 232 and previous B-Block 221B. The blockchain HASH digest in B-Block 233B is the hash of object 233 and previous B-Block 222B. Additionally, the blockchain HASH digest in B-Block 234B is the hash of object 234 and previous B-Block 222B. The blockchain HASH digest in B-Block 235B is the hash of object 235 and previous B-Block 223B. Additionally, the blockchain HASH digest in B-Block 236B is the hash of object 236 and previous B-Block 223B. The blockchain HASH digest in B-Block 237B is the hash of object 237 and previous B-Block 224B. Additionally, the blockchain HASH digest in B-Block 238B is the hash of object 238 and previous B-Block 224B. Then B-Block 231B is appended to object 231 to create paired-object 231-231B, B-Block 232B is appended to object 232 to create paired-object 232-232B, B-Block 233B is appended to object 233 to create paired-object 233-233B, B-Block 234B is appended to object 234 to create paired-object 234-234B, B-Block 235B is appended to object 235 to create paired-object 235-235B, B-Block 236B is appended to object 236 to create paired-object 236-236B, B-Block 237B is appended to object 237 to create paired-object 237-237B, and B-Block 238B is appended to object 238 to create paired-object 238-238B. Following that, then one data-pointer for each paired-object 231-231B, 232-232B, 233-233B, 234-234B, 235-235B, 236-236B, 237-237B, and 238-238B is generated, and then these paired-objects are stored. It is this selective hashing of B-Block 221B from level n=2 together with objects 231 and 232, respectively, in level n=3; selective hashing B-Block 222B from level n=2 together with objects 233 and 234, respectively, in level n=3; selective hashing B-Block 223B from level n=2 together with objects 235 and 236, respectively, in level n=3; and selectively hashing B-Block 224B from level n=2 together with objects 237 and 238, respectively, in level n=3; which blockchains level n=2 and level n=3. This Merkle B-Tree of order O=2 is only illustrated through levels n=0, n=1, n=2, and n=3 in FIGS. 2A, 2B, and 2C for brevity; however, in practice more levels could be employed. FIG. 2A illustrates vertical blockchains that extend from objects at level n=3 back to the root 201 at level n=0. FIG. 2A shows that data object 238 may be vertically blockchained to root data object 201 in only four levels (levels n=0 to n=3), rather than fifteen (levels n=0 to n=14) if a "serial" Merkle B-Tree of order O=1, (today's implementation of blockchain) were used. Thus, if data object 238 needed to be verified, it would take only four levels of vertical blockchain calculations rather than fifteen, indicating the efficiency of the Merkle B-Tree of order O=2. FIG. 2D shows the topology of a Merkle B-Tree 200 of order O=2. The use of a vertical blockchain within Merkle B-Tree 200 therefore reduces the computational overhead associated with blockchain technology, which can become intensive if conventional serial blockchain is used. With reference to FIG. 2A, Merkle B-Tree 200 is a vertically blockchained Merkle B-Tree 200.

Vertically blockchained Merkle B-Tree 200 includes a plurality of individual vertical blockchains that all begin with root paired-object 201 and B-Block 201B and extend outward to each leaf paired-object 231-231B, 232-232B, 233-233B, 234-234B, 235-235B, 236-236B, 237-237B, and 238-238B. One could characterize the vertical blockchains as being formed of paired-objects, or alternatively, one could characterize the vertical blockchain has just being formed of the B-Blocks separate from the objects. One vertical blockchain is formed of paired-objects 201-201B, 211-211B, 221-221B, and 231-231B. One could alternatively characterize the vertical blockchain as being formed of B-Blocks 201B, 211B, 221B, and 231B. Another vertical blockchain may be formed of B-Blocks 201B, 211B, 221B, and 232B, optionally along with their respective paired-objects. A further vertical blockchain is formed of B-Block 201B, 211B, 222B, and 233B, optionally along with their respective paired-objects. A further vertical blockchain is formed of B-Blocks 201B, 211B, 222B, and 234B, optionally along with their respective paired-objects. Another vertical blockchain is formed of B-Blocks 201B, 212B, 223B, and 235B, optionally along with their respective paired-objects. A further vertical blockchain is formed of B-Blocks 201B, 212B, 223B, and 236B, optionally along with their respective paired-objects. A further vertical blockchain is formed of B-Block 201B, 212B, 224B, and 237B, optionally along with their respective paired-objects. The final vertical blockchain is formed of B-Blocks 201B, 212B, 224B, and 238B, optionally along with their respective paired-objects. This configuration of vertical blockchains follows the pattern of extending outward beginning from the root to each leaf. A Merkle B-Tree will have as many vertical blockchains as there are leaf nodes in the Merkle B-Tree. Each leaf node has its own vertical blockchain extending down its respective branches back to the root of the Merkle B-Tree. The root of the Merkle B-Tree is the genesis block for all vertical blockchains, each of which ends with the leaf node. Root node 201 at level n=0 is the lowest level of Merkle B-Tree 200. Leaf nodes 231, 232, 233, 234, 235, 236, 237, and 238 reside at level n=3, the highest level of Merkle B-Tree 200.

Figure 3A:
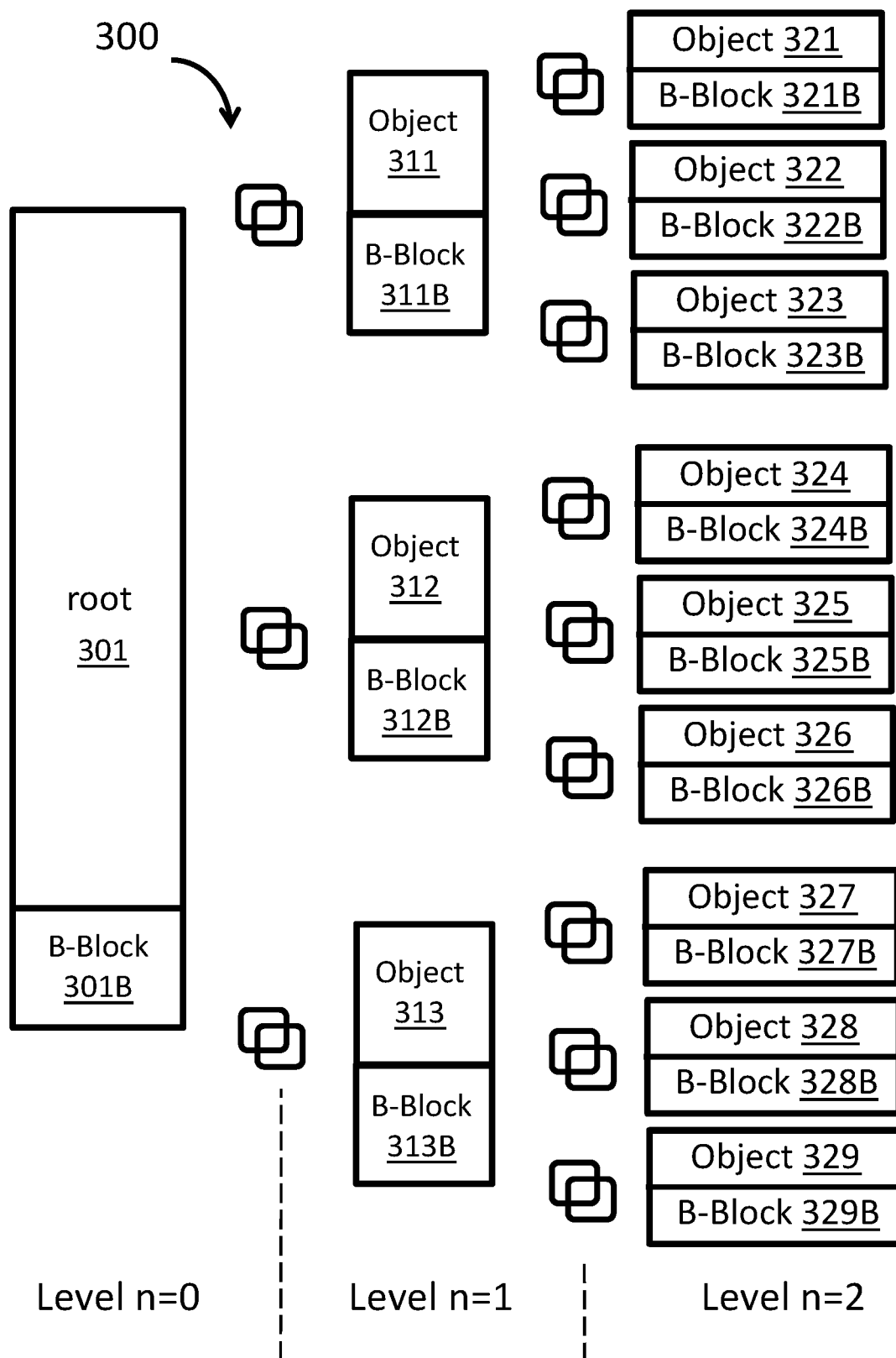
FIG. 3A illustrates levels n=0 to n=3 of a Merkle B-Tree of order O=3.
Figure 3D:
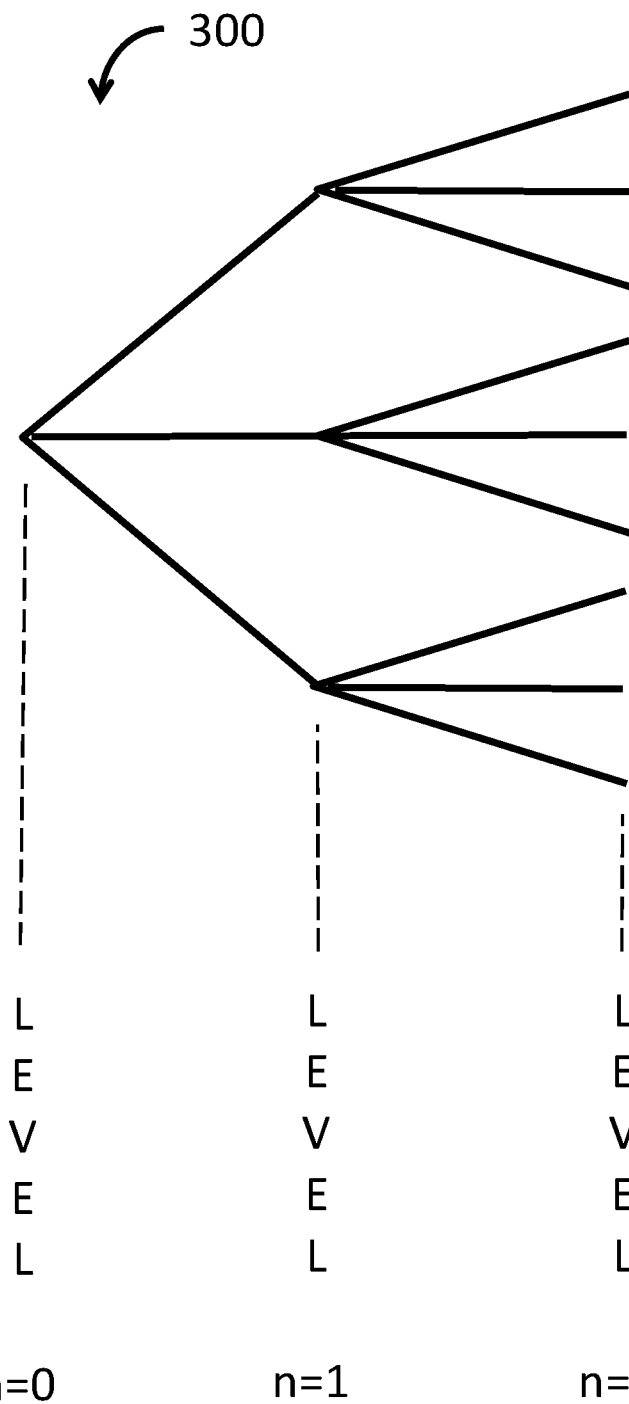
FIG. 3D illustrates a diagram describing the Merkle B-Tree of order O=3.

FIGS. 3A, 3B, 3C, and 3D illustrate a novel Merkle B-Tree 300 of order O=3, meaning that there are three branches from each node. As shown in FIG. 3A, for level n=0, the blockchain HASH digest in root B-Block 301B is the hash of the root object 301, and each succeeding data object has its own B-Block, as designated by a "B" suffix. As explained in the table in FIGS. 3B and 3C, column 30 gives the B-Block ID and column 31 gives the B-Block with blockchain HASH digest appended to object, and a data-pointer to the paired-object. Specifically, for level n=0, the blockchain HASH digest in root B-Block 301B is the hash of the root object 301. Then B-Block 301B is appended to object 301 to create paired-object 301-301B, then a data-pointer for the paired-object 301-301B is generated, and then this paired-object is stored. For level n=1, as shown in FIG. 3B, the blockchain HASH digest in B-Block 311B is the hash of object 311 and previous B-Block 301B. The blockchain HASH digest in B-Block 312B is the hash of object 312 and previous B-Block 301B. Additionally, the blockchain HASH digest in B-Block 313B is the hash of object 313 and previous B-Block 301B. Then B-Block 311B is appended to object 311 to create paired-object 311-311B, B-Block 312B is appended to object 312 to create paired-object 312-312B, and B-Block 313B is appended to object 313 to create paired-object 313-313B. Following that, then one data-pointer for each paired-object 311-311B, 312-312B, and 313-313B is generated, and then these paired-objects are stored. It is this selective hashing of B-Block 301B from level n=0 together with individual objects 311, 312, and 313 in level n=1 which blockchains level n=1 and level n=0. For level n=2, as shown in FIG. 3C, the blockchain HASH digest in B-Block 321B is the hash of object 321 and previous B-Block 311B. The blockchain HASH digest in B-Block 322B is the hash of object 322 and previous B-Block 311B. Additionally, the blockchain HASH digest in B-Block 323B is the hash of object 323 and previous B-Block 311B. The blockchain HASH digest in B-Block 324B is the hash of object 324 and previous B-Block 312B. The blockchain HASH digest in B-Block 325B is the hash of object 325 and previous B-Block 312B. Additionally, the blockchain HASH digest in B-Block 326B is the hash of object 326 and previous B-Block 312B. Additionally, for level n=2, the blockchain HASH digest in B-Block 327B is the hash of object 327 and previous B-Block 313B. The blockchain HASH digest in B-Block 328B is the hash of object 328 and previous B-Block 313B. Additionally, the blockchain HASH digest in B-Block 329B is the hash of object 329 and previous B-Block 313B. Then B-Block 321B is appended to object 321 to create paired-object 321-321B, B-Block 322B is appended to object 322 to create paired-object 322-322B, B-Block 323B is appended to object 323 to create paired-object 323-323B, B-Block 324B is appended to object 324 to create paired-object 324-324B, B-Block 325B is appended to object 325 to create paired-object 325-325B, B-Block 326B is appended to object 326 to create paired-object 326-326B, B-Block 327B is appended to object 327 to create paired-object 327-327B, B-Block 328B is appended to object 328 to create paired-object 328-328B, and B-Block 329B is appended to object 329 to create paired-object 329-329B. Following that, then one data-pointer for each paired-object 321-321B, 322-322B, 323-323B, 324-324B, 325-325B, 326-326B, 327-327B, 328-328B, and 329-329B is generated, and then these paired-objects are stored. It is this selective hashing of B-Block 311B from level n=1 together with objects 321, 322, and 323, respectively, in level n=2; selective hashing of B-Block 312B from level n=1 together with objects 324, 325, and 326, respectively, in level n=2; and selective hashing B-Block 313B from level n=1 together with objects 327, 328, and 329, respectively, in level n=2, which blockchains level n=2 and level n=1. This Merkle B-Tree of order O=3 may be continued, as it is only illustrated to levels n=0, n=1, and n=2 in FIGS. 3A, 3B, and 3C for brevity. FIG. 3A shows that data object 329 may be vertically blockchained to root data object 301 in only three levels (levels n=0 to n=2) rather than thirteen (levels n=0 to n=12) if a "serial" Merkle B-Tree of order O=1 were used. Thus, if data object 329 needed to be verified, it would take only three levels of vertical blockchain calculations rather than thirteen, indicating the efficiency of the Merkle B-Tree of order O=3. FIG. 3D shows the topology of a Merkle B-Tree 300 of order O=3. The branching of the Merkle B-Tree of Order O=2, FIG. 2D, and Merkle B-Tree of Order O=3, FIG. 3D are reminiscent of dendritic branching (https://en.wikipedia.org/wiki/Dendrite) and the branching of fractal trees (https://en.wikipedia.org/wiki/Fractal#/media/File:Simple_Fractals.png).

Figure 4:
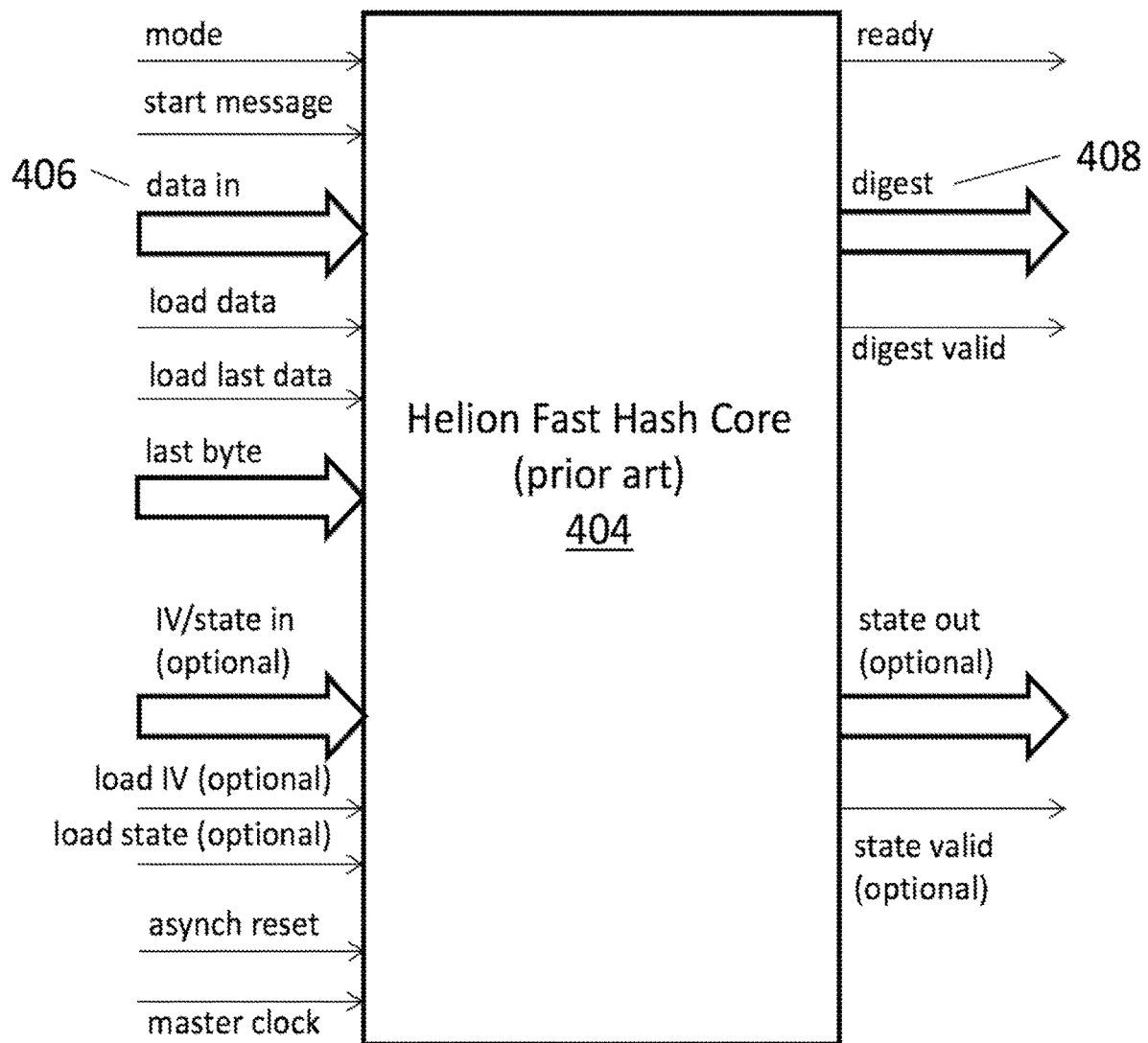
FIG. 4 illustrates a prior-art diagram of the Helion Fast Hash Core Application Specific Integrated Circuit (ASIC)

FIG. 4 illustrates a prior-art diagram of the Helion Fast Hash Core Application Specific Integrated Circuit (ASIC) 404. The Helion Fast Hash Core family implements the NIST approved SHA-1, SHA-224, SHA-256, SHA-384 and SHA-512 secure hash algorithms to FIPS 180-3 and the legacy MD5 hash algorithm to RFC 1321. These are high performance cores that are available in single or multi-mode versions and have been designed specifically for ASIC. Data to be blockchained is fed into this ASIC at 406 and the resulting blockchain hash digest output is 408. Such dedicated Hash Core ASICs have faster performance than software running in a cloud or computer memory under an operating system. ASIC 404 could calculate the blockchain hash digests in FIG. 8 and all other figures. Arrays of hash cores 404 are utilized to parallel process B-Blocks in any given level of a Merkle B-Tree data structure, where an individual hash core 404 computes the hash for a single object. The computational speed required to generate all vertical hashes for Merkle B-Tree can be minimized by having a sufficient number of hash cores 404 to compute all hash digests in parallel for every object for a given level n of the Merkle B-Tree.

Figure 5:
FIG. 5 illustrates a table of cumulative data objects blockchained based on the order of the Merkle B-Tree employed.

FIG. 5 illustrates table 500 that gives the cumulative number of data objects blockchained per level in the respective Merkle B-Tree of orders O from O=1 to O=4. The level "n" within the respective Merkle B-tree is in column 501. The cumulative number of data objects stored for Merkle B-Tree of order O=1 is shown in column 502, the cumulative number of data objects stored for Merkle B-Tree of order O=2 is shown in column 503, the cumulative number of data objects stored for Merkle B-Tree of order O=3 is shown in column 504, and the cumulative number of data objects stored for Merkle B-Tree of order O=4 is shown in column 505. In table 500, level n=0 represents the root data object for all Merkle B-Trees, such as root 101 of FIG. 1, root 201 of FIGS. 2A and 6A, root 301 of FIGS. 3A and 7A, root 901 of FIG. 9C, and root 1001 of FIG. 10B.

The cumulative total of data objects stored in a Merkle B-Tree of order O=1 is equal to the number of level "n" 501, starting with level n=0, plus one, as shown in column 502. As shown in FIG. 1, there are three levels (levels n=0, n=1, and n=2) and only three data objects are stored in total, which is consistent with column 502 of table 500. Thus, the number of objects stored increases linearly with the level "n" for a Merkle B-Tree of order O=1.

The cumulative total of data objects stored in a Merkle B-Tree of order O=2 is equal to the number two to the power of the number of present level "n" 501, plus the sum of the data objects stored in the preceding levels, as shown in column 503. As shown in FIGS. 2A-2C, there are levels n=0 to n=3 and a total of fifteen data objects are stored. Using the caret "A" symbol to denote "raised to the power of", one object is stored in level n=0 ($2^0=1$), two objects ($2^1=2$) are stored in level n=1, four objects ($2^2=4$) are stored in level n=2, and eight objects ($2^3=8$) are stored in level n=3. The number of data objects stored in any given level of a Merkle B-Tree of order O≥1 is given by eqn.[1] when order "O" is constant within that level. Eqn.[1] is consistent with the number of data objects stored in a given level "n" for FIGS. 1, 2A, and 3A.

Data objects stored in level "$n$" of a Merkle $B$-Tree of Order "$O$"=$O^n$   eqn.[1]

The cumulative number of data objects stored is one ($2^0$) for level n=0, as shown in FIG. 2A. The cumulative number of data objects stored are three for level n=1 ($1+2^1=3$). The cumulative number of data objects stored are seven for level n=2 ($3+2^2=7$). Finally, for FIG. 2A, the cumulative number of data objects stored are fifteen for level n=3 ($7+2^3=15$). These numerical calculations of the cumulative number of data objects stored by level for a Merkle B-Tree of order O=2 is consistent with column 503 of table 500. For order 2 and higher, in table 500, the Merkle B-Tree of order "O", where "O" is the same in each level "n", forms a geometric progression, and the cumulative total of data objects stored from level n=0 to level n=N, 0≤n≤N, is given by the following equation, eqn.[2]. It is eqn.[2] that is used to construct columns 503, 504, and 505 in table 500.

Cumulative_Total(levels zero to $N$)=[$O^{(N+1)}-1$]/[$O-1$]   eqn.[2]

The cumulative total of data objects stored in a Merkle B-Tree of order O=3 is equal to three to the power of the number of present level "n" 501, plus the sum of the data objects stored in the preceding levels, as shown in column 504. As shown in FIG. 3A, there are levels n=0 to n=2 and a total of thirteen data objects are stored. One ($3^0$) object is stored in level n=0, three objects ($3^1=3$) are stored in level n=1, and nine objects ($3^2=9$) are stored in level n=2. Thus, the cumulative total of data objects stored are one ($3^0$) for level n=0, four ($1+3^1=4$) for level n=1, and thirteen ($4+3^2=13$) for level n=2, which is consistent with column 504 of table 500.

At level n=15, in table 500, with a Merkle B-Tree of order O=1 in column 502, which is what is used in today's blockchaining, only a total of 15 data objects are blockchained together. However, at level n=15, a total of 65,535 data objects are blockchained together via a Merkle B-Tree of order O=2; over 21.5 million data objects are blockchained together via a Merkle B-Tree of order O=3; and over 1.4 billion data objects are blockchained together via a Merkle B-tree of order O=4. Thus the Merkle B-Tree offers practical blockchaining for big data involving millions and billions of data objects. Further, the number of blockchain blocks required to interlink the root node to the leaf node is dramatically reduced through the use of vertical blockchaining in Merkle B-Trees, where the number of blocks from the root node to the any leaf node, including the last leaf node, is equal to n+1, where n is the number of levels in the Merkle B-Tree.

Table 500 and eqn.[2] offer a means of selecting a particular Merkle B-Tree of Order "O" and the highest level number N needed, 0≤n≤N, as shown in eqn.[3].

Total Data objects to Blockchain≤[$O^{(N+1)}-1$]/[$O-1$]   eqn.[3]

Eqn.[2] is one equation with two unknowns, the Order "O" of the Merkle B-Tree and "N" is the highest level number, 0≤n≤N. This is where Table 500 is helpful to find the closest solution, namely where the size of the Merkle B-Tree is close to but not smaller than the total number of data objects to be blockchained together. For example, in table 500, if the total number data objects to be blockchained together is about 5.5 million, then the design choice could be a Merkle B-Tree of order O=4 using a maximum level of N=11 (which supports up to 5,592,405 data objects). If the total number of data objects to be blockchained together is about 2.3 million, then the design choice could be a Merkle B-Tree of order O=3 using a maximum level of N=13 (which supports up to 2,391,484 data objects). The solutions to eqn.[2] are not necessarily unique, because if the total number of data sets to be blockchained together is about 87,000, then either a Merkle B-Tree of order O=3 with a maximum level of N=10 (which supports up to 88,573 data objects), or a Merkle B-Tree of order O=4 with a maximum level of N=8 (which supports up to 87,381 data objects) could be used. Additionally, each group of data objects needed to be blockchained together may use a different Merkle B-Tree order "O" and a different maximum level "N," whatever is best suited to the total number of data objects. There are therefore multiple criteria in which selection instructions embedded in a computer tangible medium can select an order "O" and number of levels "n" in which to build a Merkle B-Tree structure to fit the number of objects within a particular large data set, such as a movie formed of scenes, snippets, and Groups of Pictures, or a multidimensional spreadsheet formed of sheets, columns, and rows. There are multiple solutions to finding a level "n" and order "O" combination that can produce a Merkle B-Tree with sufficient capacity to handle all objects within a given large data set. For any given order "O", a Merkle B-Tree can handle any large data set by including a sufficient number of levels. However, lower order Merkle B-Trees will require more levels, and hence more B-Blocks, to form a vertical blockchain between a root node and a leaf node. One object of this invention is to produce vertical blockchains that have smaller numbers of blockchain blocks, B-Blocks, needed to interconnect a root node to a leaf node. One solution toward this objective is by selecting a Merkle B-Tree that has closest number of objects to the number of objects within the large data set without going under the number of objects within the large data set. This solution allows for the fewest number of unused objects within a Merkle B-Tree. Another solution is to minimize the number of B-Blocks used to form a vertical blockchain between the root node and the leaf node by increasing the order "O" of the Merkle B-Tree. The creation of smaller length vertical blockchains reduces the computational overhead for data verification of objects within the Merkle B-Tree. However, increasing the order "O" requires the use of larger number of hash cores 404 in order to parallel process all blocks within a given level of the Merkle B-Tree. Selecting a Merkle B-Tree of a lower order "O" will reduce the number of hash cores 404 needed to parallel process all blocks within a given level of the Merkle B-Tree, but will also produce a longer vertical blockchain having more B-Blocks that will necessitate more computational overhead for subsequent data verification than a Merkle B-Tree of a higher order. A system may therefore select in general three options for choosing an order "O" for a given large data set. One is to select an order "O" and level "n" combination that creates the fewest number of unused objects within the Merkle B-Tree when applied to the large data set. Another solution is to pick a larger order "O" than this first solution to reduce the number of B-Blocks needed to form a vertical blockchain between a root node and a leaf node. Another solution is to pick a smaller order "O" than this first solution to reduce the number of hash cores 404 required to parallel process all objects within a given level "n" of the Merkle B-Tree, but this comes at the expense of a longer vertical blockchain connecting the root node to the leaf node. While it is desirable for speed to parallel process all objects within a given level simultaneously, levels may be processed in subsections if there are more objects for a given level than cores 404 available. A Merkle B-Tree of order O=3 and maximum level of N=10 needs $3^{10}$, or 59,049 cores for total parallelism. A Merkle B-Tree of order N=4 and a maximum level of N=8 needs 48, or 65,536 cores for total parallelism. Total parallelism refers to computing the hash digests of all objects within a given level simultaneously in parallel. Thus, as mentioned above, when there are competing solutions such as these, picking the higher order "O" results in better time performance with generating the vertical blockchains in the Merkle B-Tree structure because of more parallel processing and shorter length vertical blockchains interlinking the root node to the leaf nodes. However, more parallelism requires more cores 404 for total parallelism, which is a hardware expense. If expense is a limiting factor, picking a smaller order "O" will reduce the number of cores 404 required for total parallelism on each level of the Merkle B-Tree. However, reducing the order "O" sacrifices time performance as more processing cycles are needed to generate the additional levels "n" required for the lower order Merkle B-Tree.

As shown in FIG. 1, parallel processing is not possible for a Merkle B-Tree of order one. However, as shown in FIGS. 6A, 6B, 6C, 6D, and 6E, as well as FIGS. 7A, 7B, 7C, 7D, and 7E, parallel-processing is indeed practical as a method of speeding the performance of blockchaining big data, such as a digital movie, a large switching network, large spreadsheet manipulations, etc., for Merkle B-Trees of order two or higher.

Figure 6A:
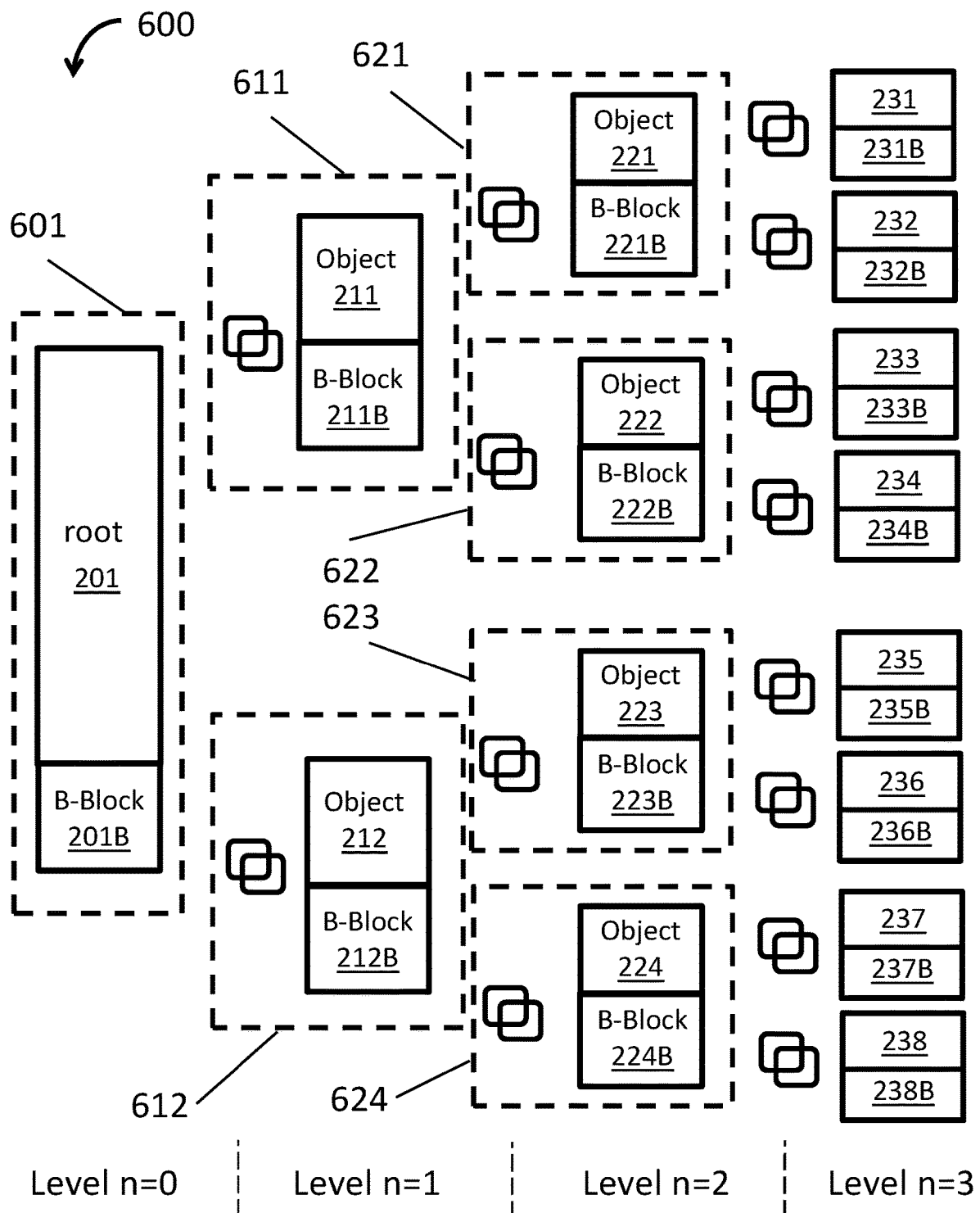
FIG. 6A illustrates a Merkle B-Tree of order O=2 with single-core processing at level n=0 and multiple-core parallel processing at levels n=1 and n=2.

As shown in FIGS. 6A and 6B, for level n=0 of a Merkle B-Tree of Order O=2, single process 601 calculates the blockchain HASH digest in root B-Block 201B, which is the hash of the root object 201, then B-Block 201B is appended to object 201 to create paired-object 201-201B, then a data-pointer for the paired-object 201-201B is generated, and then this paired-object is stored. In process 611 in level n=1, which is parallel to process 612 in level n=1, the blockchain HASH digest in B-Block 211B calculated is the hash of object 211 and previous B-Block 201B, then B-Block 211B is appended to object 211 to create paired-object 211-211B, then data-pointer for paired-object 211-211B is generated, and then this paired-object is stored. Additionally, in process 612 in level n=1 which is parallel to process 611 in level n=1, the blockchain HASH digest in B-Block 212B calculated is the hash of object 212 and previous B-Block 201B, then B-Block 212B is appended to object 212 to create paired-object 212-212B, then one data-pointer for paired-object 212-212B is generated, and then this paired-object is stored. For level n=2, in process 621 which is parallel to processes 622, 623, and 624, the blockchain HASH digest in B-Block 221B calculated is the hash of object 221 and previous B-Block 211B, then B-Block 221B is appended to object 221 to create paired-object 221-221B, then one data-pointer for paired-object 221-221B is generated, then this paired-object is stored. In process 622 which is parallel to processes 621, 623, and 624, the blockchain HASH digest in B-Block 222B calculated is the hash of object 222 and previous B-Block 211B, then B-Block 222B is appended to object 222 to create paired-object 222-222B, then one data-pointer for paired-object 222-222B is generated, then this paired-object is stored. In process 623 which is parallel to processes 621, 622, and 624, the blockchain HASH digest in B-Block 223B calculated is the hash of object 223 and previous B-Block 212B, then B-Block 223B is appended to object 223 to create paired-object 223-223B, one data-pointer for paired-object 223-223B is generated, then this paired-object is stored. And in process 624 which is parallel to processes 621, 622, and 623, and the blockchain HASH digest in B-Block 224B calculated is the hash of object 224 and previous B-Block 212B, then B-Block 224B is appended to object 224 to create paired-object 224-224B, one data-pointer for paired-object 224-224B is generated, then this paired-object is stored.

Figure 6C:
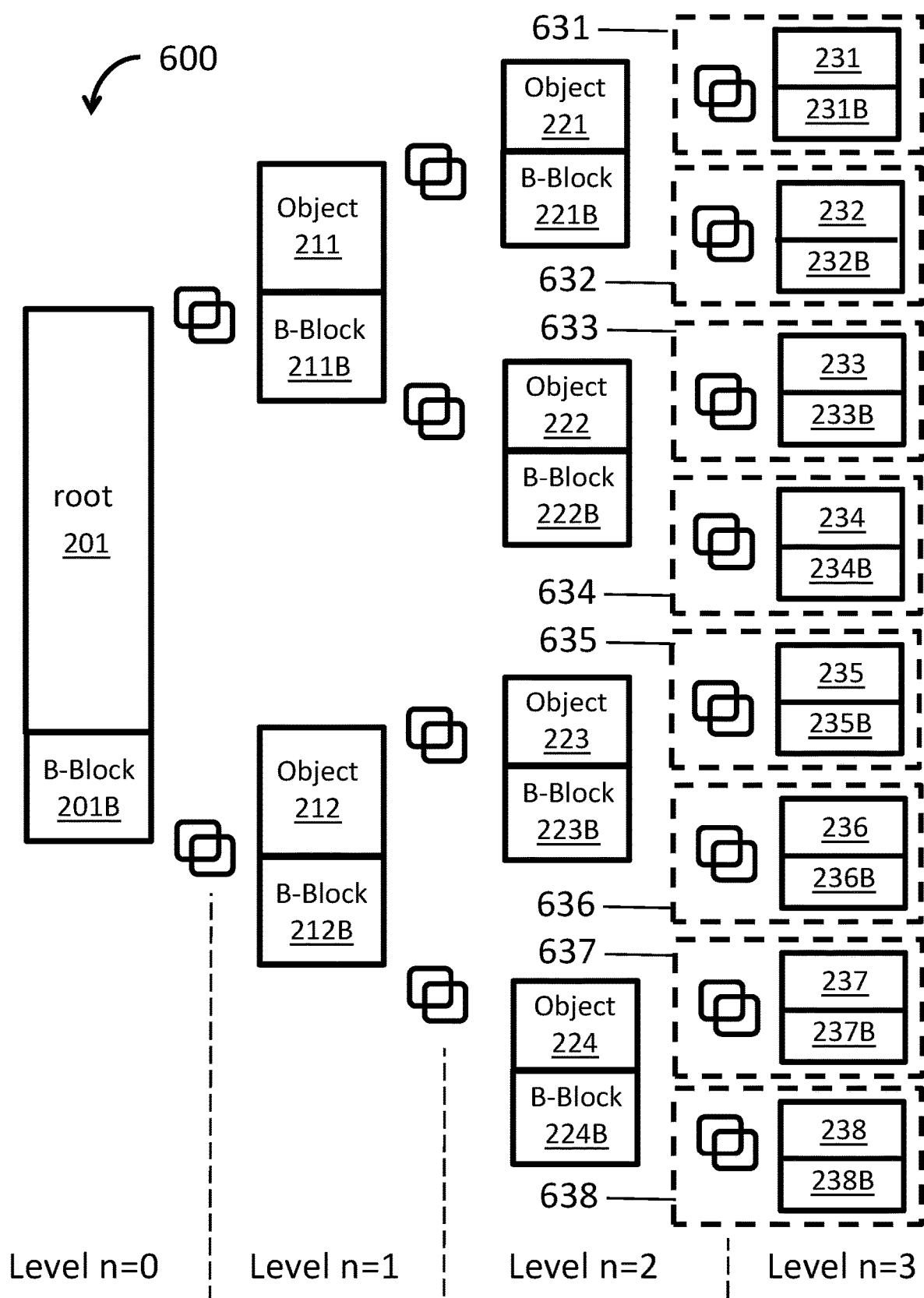
FIG. 6C illustrates a Merkle B-Tree of order O=2 with parallel processing in level n=3.

As shown in FIGS. 6C and 6D, for level n=3, in process 631, which is parallel to processes 632-638, the blockchain HASH digest in B-Block 231B is the hash of object 231 and previous B-Block 221B, then B-Block 231B is appended to object 231 to create paired-object 231-231B, then one data-pointer is generated for paired-object 231-231B, and then this paired-object is stored. In process 632, which is parallel to processes 631 and 633-638, the blockchain HASH digest in B-Block 232B is the hash of object 232 and previous B-Block 221B, then B-Block 232B is appended to object 232 to create paired-object 232-232B, then one data-pointer is generated for paired-object 232-232B, and then this paired-object is stored. In process 633, which is parallel to processes 631-632 and 634-638, the blockchain HASH digest in B-Block 233B is the hash of object 233 and previous B-Block 222B, then B-Block 233B is appended to object 233 to create paired-object 233-233B, then one data-pointer is generated for paired-object 233-233B, and then this paired-object is stored. In process 634, which is parallel to processes 631-633 and 635-638, the blockchain HASH digest in B-Block 234B is the hash of object 234 and previous B-Block 222B, then B-Block 234B is appended to object 234 to create paired-object 234-234B, then one data-pointer is generated for paired-object 234-234B, and then this paired-object is stored. In process 635, which is parallel to processes 631-634 and 636-638, the blockchain HASH digest in B-Block 235B is the hash of object 235 and previous B-Block 223B, then B-Block 235B is appended to object 235 to create paired-object 235-235B, then one data-pointer is generated for paired-object 235-235B, and then this paired-object is stored. In process 636, which is parallel to processes 631-635 and 637-638, the blockchain HASH digest in B-Block 236B is the hash of object 236 and previous B-Block 223B, B-Block 236B is appended to object 236 to create paired-object 236-236B, then one data-pointer is generated for paired-object 236-236B, and then this paired-object is stored. In process 637, which is parallel to processes 631-636 and 638, the blockchain HASH digest in B-Block 237B is the hash of object 237 and previous B-Block 224B, then B-Block 237B is appended to object 237 to create paired-object 237-237B, then one data-pointer is generated for paired-object 237-237B, and then this paired-object is stored. Additionally, in process 638, which is parallel to processes 631-637, the blockchain HASH digest in B-Block 238B is the hash of object 238 and previous B-Block 224B, then B-Block 238B is appended to object 238 to create paired-object 238-238B, then one data-pointer is generated for paired-object 238-238B is generated, and then this paired-object is stored.

The blockchaining hash digests of processes 601, 611-612, 621-624, and 631-638 could be done by an array of parallel processing cores 404, as shown in FIGS. 6E and 13A-D. Processes 611-612 cannot start until process 601 concludes, meaning that core 404A in process 601 can be repurposed to process 611, and a new core 404B handles process 612. Since process 621 and 622 cannot start until process 611 concludes, core 404A in process 611 can be repurposed to process 621, and a new core 404C handles process 622. Since process 623 and 624 cannot start until process 612 concludes, core 404B in process 612 can be repurposed to process 623, and a new core 404D handles process 624. Since process 631 and 632 cannot start until process 621 concludes, core 404A in process 621 can be repurposed to process 631, and a new core 404E handles process 632. Since process 633 and 634 cannot start until process 622 concludes, core 404C in process 622 can be repurposed to process 633, and a new core 404F handles process 634. Since process 635 and 636 cannot start until process 623 concludes, core 404B in process 623 can be repurposed to process 635, and a new core 404G handles process 636. Since process 637 and 638 cannot start until process 624 concludes, core 404D in process 624 can be repurposed to process 637, and a new core 404H handles process 638. Note that in FIGS. 6E and 13A-D, once a new core is introduced, it is used solely in that portion of the Merkle-B-tree that it is introduced to and does not cross over to a different portion of said Merkle-B-tree. More detail pertaining to parallel processing is illustrated in flowchart 1200, FIGS. 12A and 12B, and 13A-D. Overall, the number of independent hash cores "C" needed for parallel processing at level "n," where n>1, and the Merkle Tree has an order O>1, is given by eqn.[4]:

$$\text{Independent hash cores "C" for parallel processing at level "}n\text{"}=O^{\hat{}}(n) \qquad \text{eqn.[4]}$$

Figure 6E:
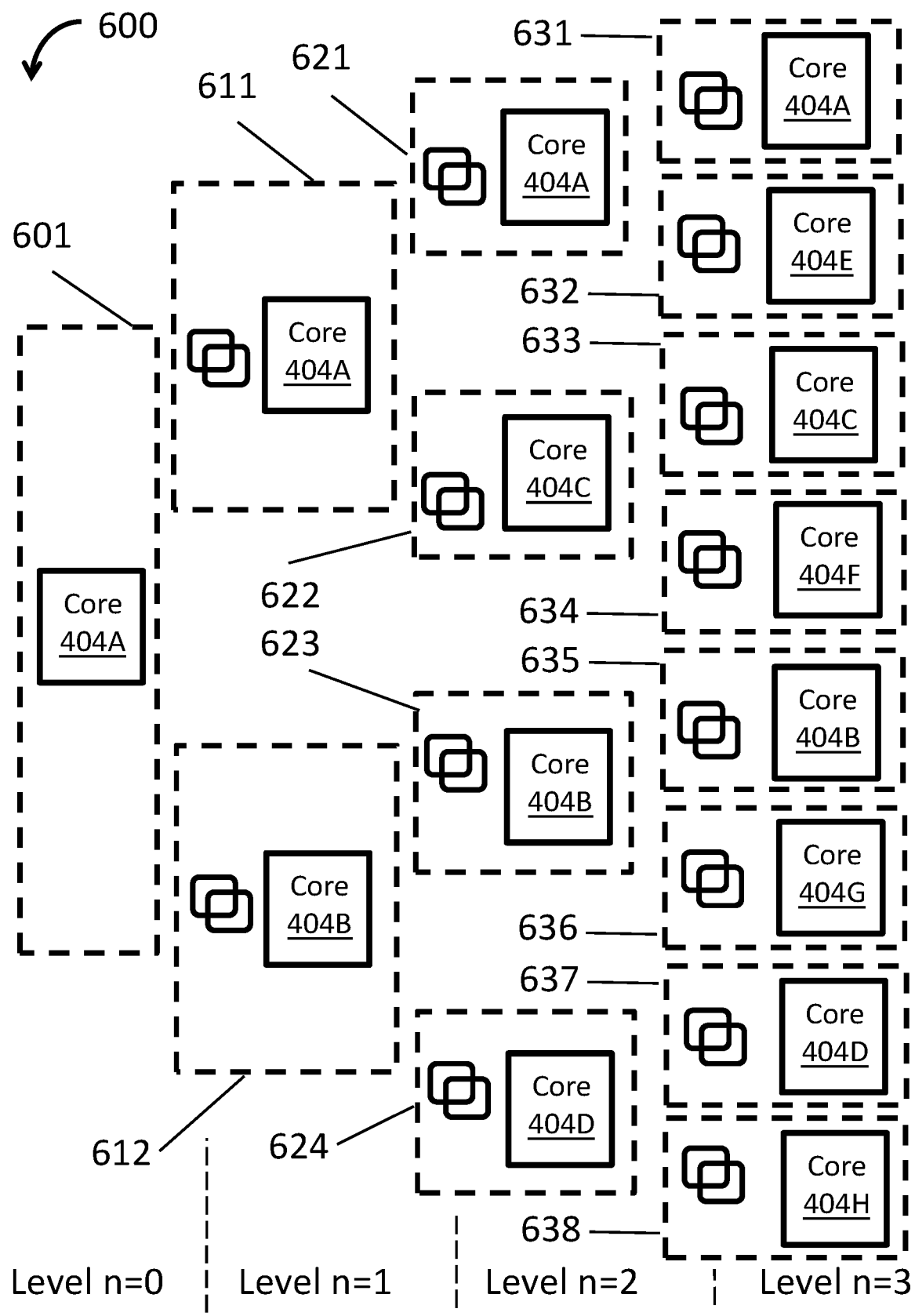
FIG. 6E illustrates the hierarchy of single and multiple cores of a Merkle B-Tree of order O=2.
Figure 7A:
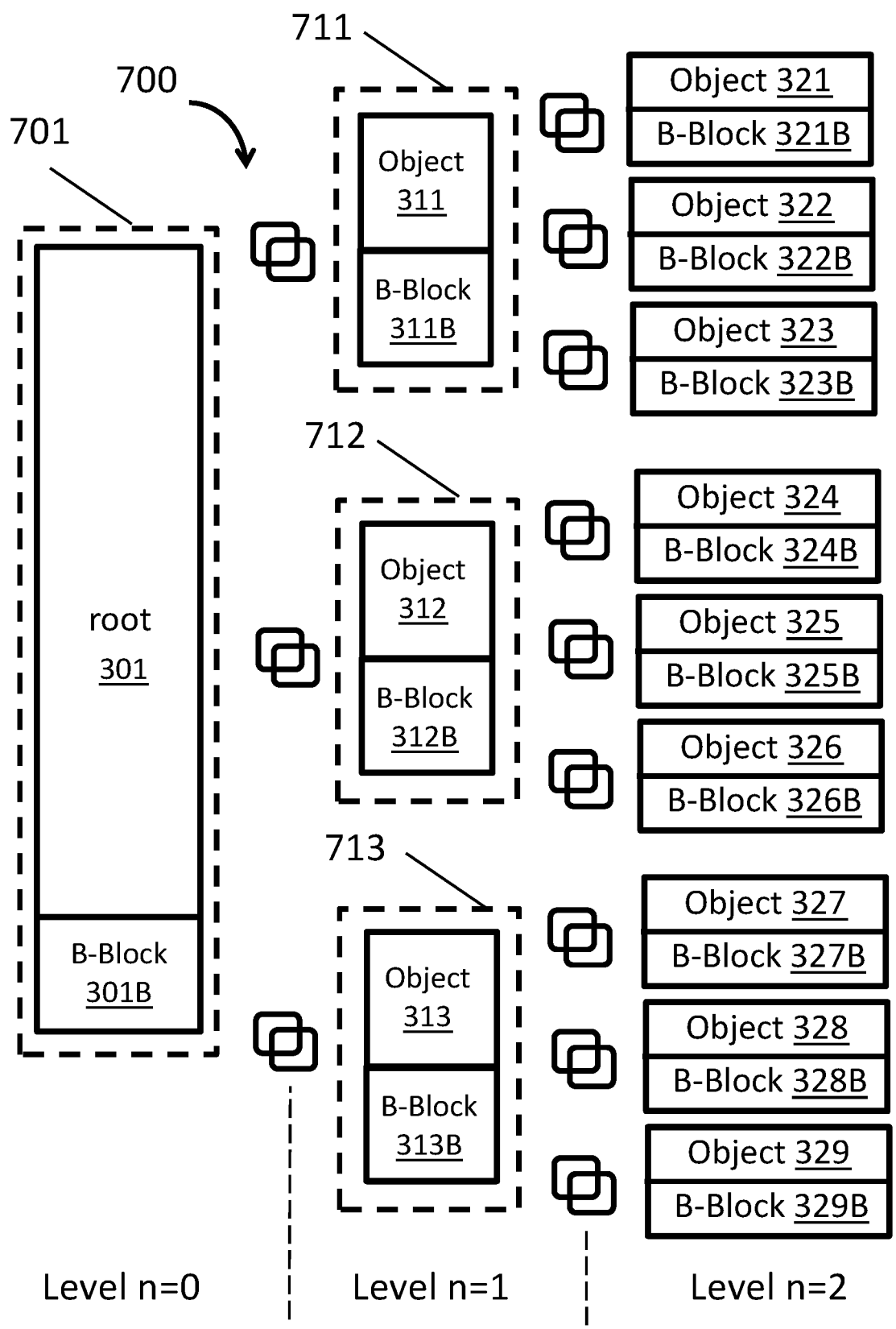
FIG. 7A illustrates a Merkle B-Tree of order O=3 with single-core processing at level n=0 and multiple-core parallel processing at level n=1.
Figure 7C:
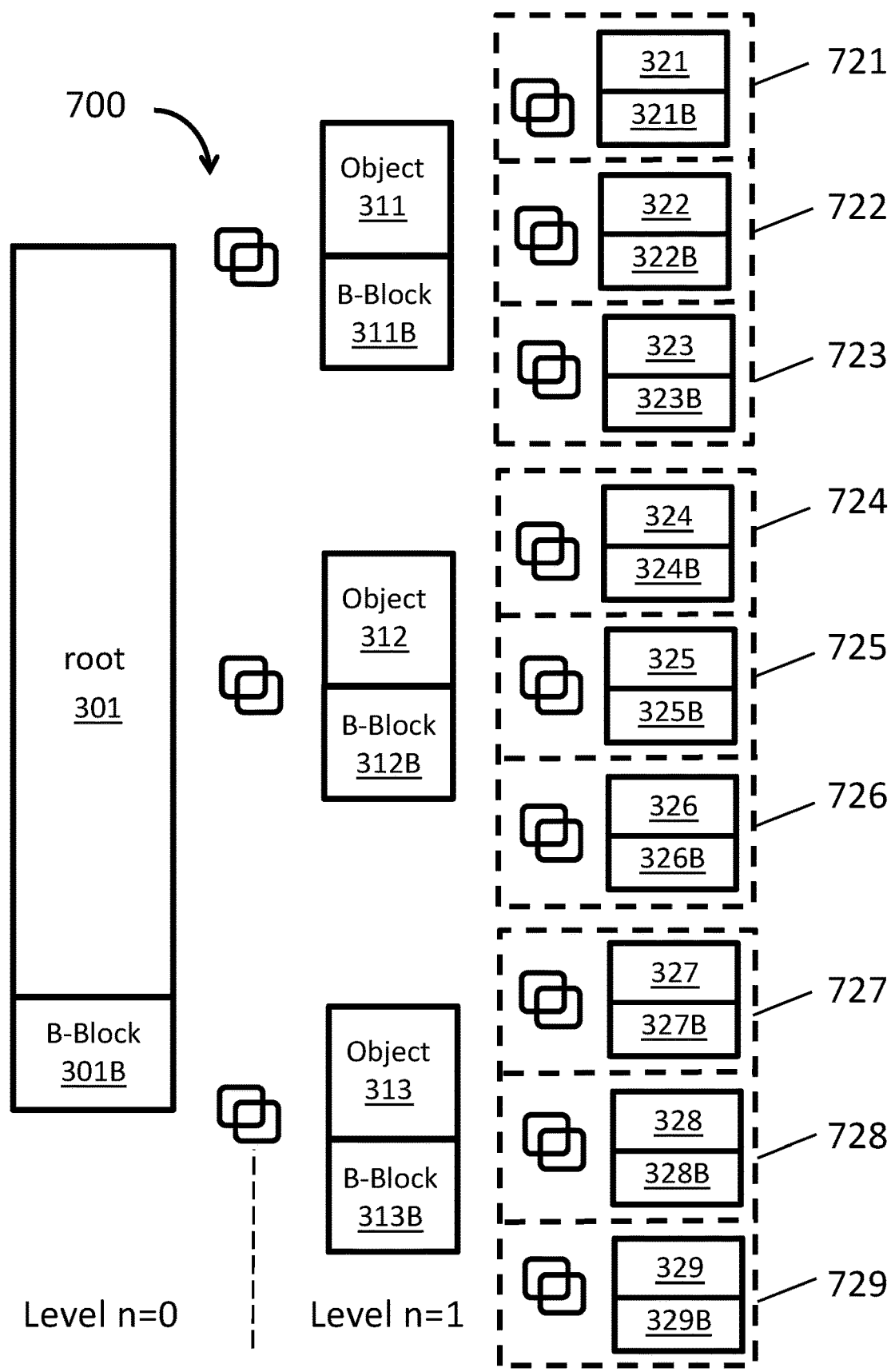
FIG. 7C illustrates a Merkle B-Tree of order O=3 with multiple-core parallel processing at level n=2.
Figure 7E:
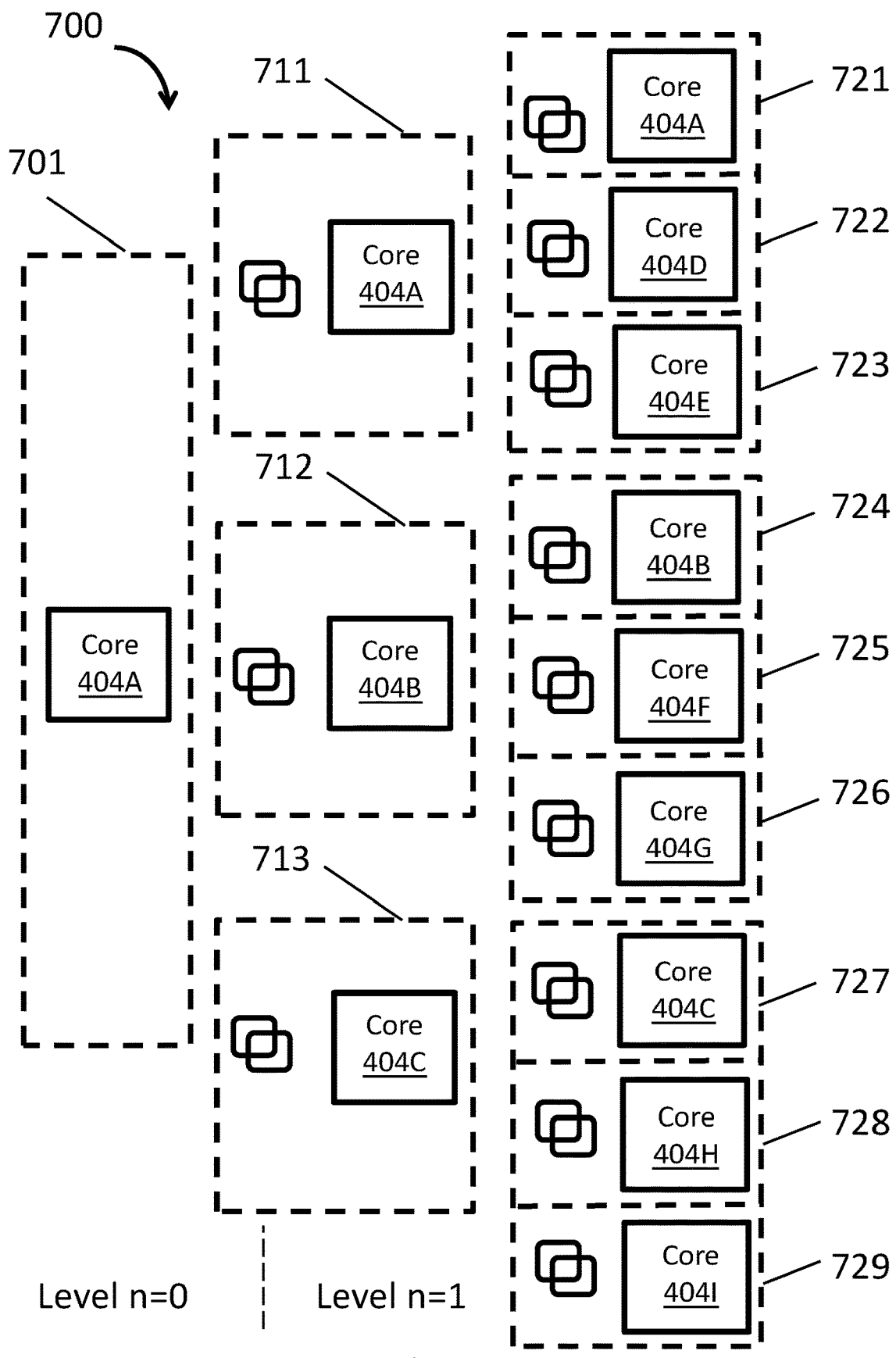
FIG. 7E illustrates the hierarchy of single and multiple cores of a Merkle B-Tree of order O=3.

Eqn. 4 can be compared to the number of cores needed in FIGS. 6E and 7E. In an alternate embodiment, the same core 404 is used for all processes in FIG. 6E in a serial fashion where one process is done at a time, and this is described in flowchart 1100, FIGS. 11A and 11B. In addition, in another alternative embodiment, groups of cores 404 that number less than the total number of objects in a level can parallel process sections of the level in a serial fashion until the entire level if processed.

As shown in FIGS. 7A and 7B, for level n=0 of a Merkle B-Tree of Order O=3, single process 701 calculates the blockchain HASH digest in root B-Block 301B, which is the hash of the root object 301, then B-Block 301B is appended to object 301 to create paired-object 301-301B, then a data-pointer for the paired-object 301-301B is generated, and then this paired-object is stored. In process 711 in level n=1, which is parallel to processes 712 and 713 in level n=1, the blockchain HASH digest in B-Block 311B calculated is the hash of object 311 and previous B-Block 301B, then B-Block 311B is appended to object 311 to create paired-object 311-311B, then data-pointer for paired-object 311-311B is generated, and then this paired-object is stored. In process 712 in level n=1, which is parallel to process 711 and 713 in level n=1, the blockchain HASH digest in B-Block 312B calculated is the hash of object 312 and previous B-Block 301B, then B-Block 312B is appended to object 312 to create paired-object 312-312B, then one data-pointer for paired-object 312-312B is generated, and then this paired-object is stored. Additionally, in process 713 in level n=1, which is parallel to process 711 and 712 in level n=1, the blockchain HASH digest in B-Block 313B calculated is the hash of object 313 and previous B-Block 301B, then B-Block 313B is appended to object 313 to create paired-object 313-313B, then one data-pointer for paired-object 313-313B is generated, and then this paired-object is stored.

As shown in FIGS. 7C and 7D, for level n=2 of a Merkle B-Tree of Order O=3, in process 721 which is parallel to processes 722-729, the blockchain HASH digest in B-Block 321B calculated is the hash of object 321 and previous B-Block 311B, then B-Block 321B is appended to object 321 to create paired-object 321-321B, then one data-pointer for paired-object 321-321B is generated, then this paired-object is stored. In process 722 which is parallel to processes 721 and 723-729, the blockchain HASH digest in B-Block 322B calculated is the hash of object 322 and previous B-Block 311B, then B-Block 322B is appended to object 322 to create paired-object 322-322B, then one data-pointer for paired-object 322-322B is generated, then this paired-object is stored. In process 723 which is parallel to processes 721-722 and 724-729, the blockchain HASH digest in B-Block 323B calculated is the hash of object 323 and previous B-Block 311B, then B-Block 323B is appended to object 323 to create paired-object 323-323B, one data-pointer for paired-object 323-323B is generated, then this paired-object is stored. In process 724 which is parallel to processes 721-723 and 725-729, the blockchain HASH digest in B-Block 324B calculated is the hash of object 324 and previous B-Block 312B, then B-Block 324B is appended to object 324 to create paired-object 324-324B, then one data-pointer for paired-object 324-324B is generated, then this paired-object is stored. In process 725 which is parallel to processes 721-724 and 726-729, the blockchain HASH digest in B-Block 325B calculated is the hash of object 325 and previous B-Block 312B, then B-Block 325B is appended to object 325 to create paired-object 325-325B, then one data-pointer for paired-object 325-325B is generated, then this paired-object is stored. In process 726 which is parallel to processes 721-725 and 727-729, the blockchain HASH digest in B-Block 326B calculated is the hash of object 326 and previous B-Block 312B, then B-Block 326B is appended to object 326 to create paired-object 326-326B, one data-pointer for paired-object 326-326B is generated, then this paired-object is stored. In process 727 which is parallel to processes 721-726 and 728-729, the blockchain HASH digest in B-Block 327B calculated is the hash of object 327 and previous B-Block 313B, then B-Block 327B is appended to object 327 to create paired-object 327-327B, then one data-pointer for paired-object 327-327B is generated, then this paired-object is stored. In process 728 which is parallel to processes 721-727 and 729, the blockchain HASH digest in B-Block 328B calculated is the hash of object 328 and previous B-Block 313B, then B-Block 328B is appended to object 328 to create paired-object 328-328B, then one data-pointer for paired-object 328-328B is generated, then this paired-object is stored. In process 729 which is parallel to processes 721-728, the blockchain HASH digest in B-Block 329B calculated is the hash of object 329 and previous B-Block 313B, then B-Block 329B is appended to object 329 to create paired-object 329-329B, one data-pointer for paired-object 329-329B is generated, then this paired-object is stored.

The blockchaining hash digests of processes 701, 711-713, and 721-729 could be done by an array of parallel processing cores 404, as shown in FIG. 7E. Processes 711-713 cannot start until process 701 concludes, meaning that core 404A in process 701 can be repurposed to process 711, and new cores 404B and 404C handle processes 712 and 713, respectively. Since processes 721-723 cannot start until process 711 concludes, core 404A in process 711 can be repurposed to process 721, and new cores 404D and 404E handle processes 722 and 723, respectively. Since processes 724-726 cannot start until process 712 concludes, core 404B in process 712 can be repurposed to process 724, and new cores 404F and 404G handle processes 725 and 725, respectively. Since processes 727-729 cannot start until process 713 concludes, core 404C in process 713 can be repurposed to process 727, and new cores 404H and 404I handle processes 728-729, respectively. Note that in FIG. 7E, once a new core is introduced, it is used solely in that portion of the Merkle-B-tree that it is introduced to and does not cross over to a different portion of said Merkle-B-tree. More detail pertaining to parallel processing is illustrated in flowchart 1200, FIGS. 12A and 12B, and 13A-D. Each level of the Merkle B-Tree illustrated in FIG. A can be processed in total parallelism with sufficient cores 404. In an alternate embodiment, the same core 404 is used for all processes in FIG. 7E, in a serial fashion where one process is done at a time, and this is described in flowchart 1100, FIGS. 11A and 11B. In addition, in another alternative embodiment, groups of cores 404 that number less than the total number of objects in a level can parallel process sections of the level in a serial fashion until the entire level if processed.

Figure 8A:
FIG. 8A illustrates a table of an exemplary B-Block.
Figure 8B:
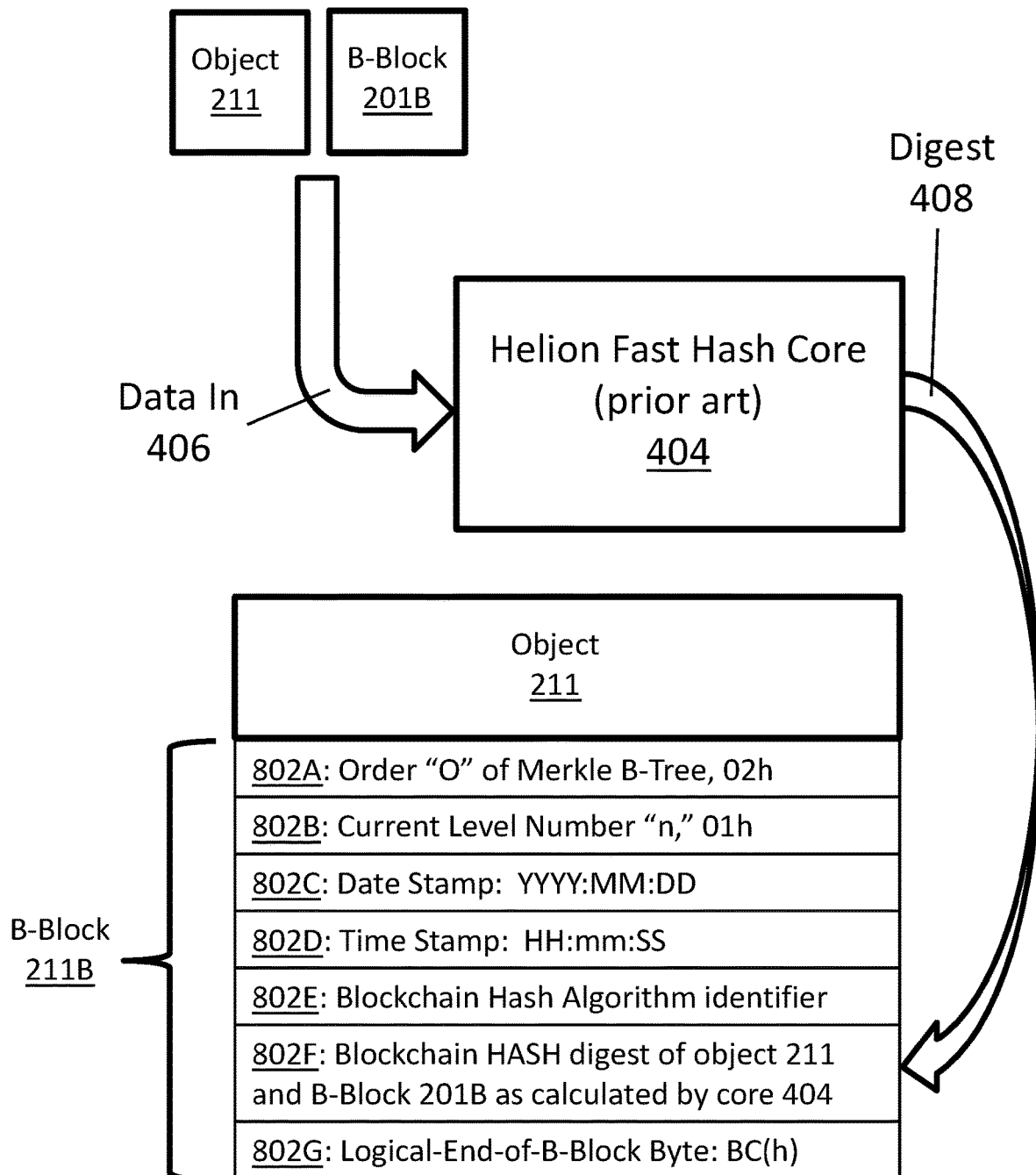
FIG. 8B illustrates an example of how the blockchain hash digest is calculated and stored in a B-Block.

FIGS. 8A and 8B describe exemplary B-Block 800, which serves as a metadata blockchain wrapper for the blockchain hash digest and data object. In column 801 are the bytes used in the B-Block and column 802 gives the description. Byte-0 (801A) gives the order "O" of the Merkle-B tree used: with 01h (hex) denoting an order O=1 Merkle B-Tree (such as in FIG. 1), 02h denoting an order O=2 Merkle B-Tree (such as in FIG. 2), 03h denoting an order O=3 Merkle B-Tree (such as in FIG. 3), 04h denoting an order O=4 Merkle B-Tree, and so on. Byte-1 (802B) gives the current (not the maximum) level number, such as 00h denotes root level n=0, 01h denotes level n=1, 02h denotes level n=2, level 03h denotes level n=3, and so on. Bytes 2-5 (802C) are a date stamp comprising year, month, and day in the form YYYY:MM:DD. Bytes 6-8 are a time stamp (802D), comprising hours, minutes, and seconds in the form HH:mm:SS. In one embodiment, the hours, minutes, and seconds are in Greenwich Mean Time. In an alternate embodiment, two bytes could be added to denote the local time zone of the time stamp. In an alternate embodiment, additional bytes could be used to denote fractions of seconds.

Continuing with the description of B-Block 800, Byte-9 (802E) defines the hash algorithm used. For example, the SHA-224 algorithm identifier is 00h, the SHA-256 algorithm identifier is 01h, the SHA-384 algorithm identifier is 02h, the SHA-512 algorithm identifier is 03h, the SHA-512/224 algorithm identifier is 04h, the SHA-512/256 algorithm identifier is 05h, and the MD5 algorithm identifier is 06h. Beginning with Byte-10 (802F), the actual blockchain hash digest is enclosed. For example, for SHA-224 and SHA-512/224 digests (224 bits or 28-Bytes) use Bytes 10-37 (when Byte-9 equals 00h or 04h), SHA-256 and SHA-512/256 digests (256 bits or 32-Bytes) use Bytes 10-41 (when Byte-9 equals 01h or 05h), SHA-384 digest (384 bits or 48-Bytes) uses Bytes 10-57 (when Byte-8 equals 02h), SHA-512 digest (512 bits or 64-Bytes) uses Bytes 10-73 (when Byte-9 equals 03h), and MD-5 digest (128 bits or 16-Bytes) uses Bytes 10-25 (when Byte-9 equals 06h). These digests may be calculated by hash core 404. A Logical-End-of-B-Block Byte (802G) follows the above information. An exemplary Logical-End-of-B-block Byte is the hexadecimal number "BC" (1011 1100), where "BC" denotes blockchain. This logical-end-of-T-block is in byte 38 for SHA-224 and SHA-512/224 (when Byte-9=00h or 04h), byte 42 for SHA-256 and SHA-512/256 (when Byte-9=01h or 05h), byte 58 for SHA-384 digest (when Byte-9=02h), byte 74 for SHA-512 digest (when Byte-9=03h), and byte 26 for MD-5 digest (when Byte-9=06h).

FIG. 8B shows the creation of one B-Block 211B, from FIG. 2A. Object 211 and B-Block 201B are "data in" 406 to Hash Core 404. The blockchain hash digest 408 calculated by core 404 becomes the 802F entry in B-Block 211B. B-Block 211B is appended to Object 211 to create a paired-object. In B-Block 211B, other structure could include 802A being 02h (hexadecimal) to denote a Merkle B-Tree of order O=2. Additional structure could include 802B being 01h to denote that the current level is n=1. Also, additional structure could include 802G being BCh to denote the logical-end-of-B-Block byte.

B-Block 800 need not have all the detail shown in FIGS. 8A and 8B to be an effective metadata wrapper of the blockchain hash digest. If an application always used the same order of Merkle B-Tree, and the date and time stamps were not needed, and if the same blockchain hash algorithm was always used, then only the current level number "n," the blockchain hash digest, and logical-end-of-B-Block may need to be included in the B-Block. This would reduce the size of the B-Block.

In an alternate embodiment, B-Block 800 contains two blockchain hash digests instead of one, namely the blockchain hash digest of the object at the end of one branch and the blockchain hash digest of the object at the node from which the branch is emanating. For example, for level n=1, as shown in FIG. 2B, the two blockchain HASH digests in B-Block 211B would be the hash of object 211 and hash of the previous object 201, rather than a single blockchain hash digest representing the combination of both object 211 and B-Block 201B.

Figure 8C:
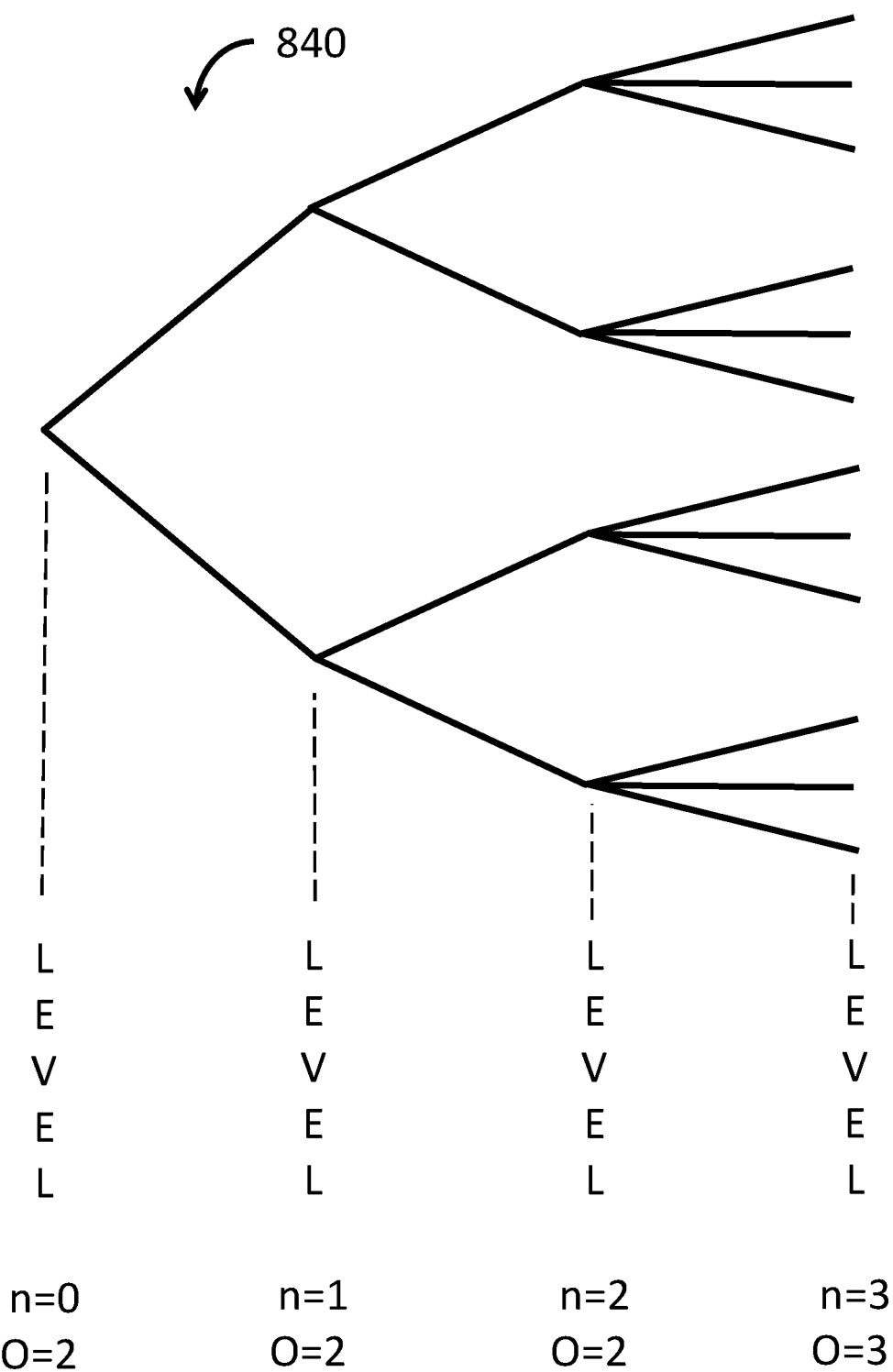
FIG. 8C illustrates a diagram describing the Merkle B-Tree of order O=2 for levels n=1 and n=2, and order O=3 for level n=3.

In yet another embodiment, the Byte-0 (801A) gives the order "O" of the Merkle-B tree used at a given level "n" and since Byte-1 (802B) gives the current (not the maximum) level number "n," then the order "O" need not be constant for all levels. In fact, the Order "O" could increase with increasing level "n," to allow for an increasing number of branches per node as the level "n" increases. FIG. 8C illustrates a diagram describing the Merkle B-Tree of order O=2 for levels n=1 and n=2, and order O=3 for level n=3. It is possible to have Merkle B-Trees that have the same order "O" for every level. However, Merkle B-Trees may have different orders "O" on different levels as illustrated in FIG. 8C. It may be desirable to vary the order "O" on different levels based upon the organizational structure of a large data set. For example, A multidimensional spreadsheet may have a few sheets, but large numbers of columns, and even larger numbers of rows, making a Merkle B-Tree having a lower order "O" for the sheet level desirable, bur larger order "O" for the column and row levels.

Figure 9A:
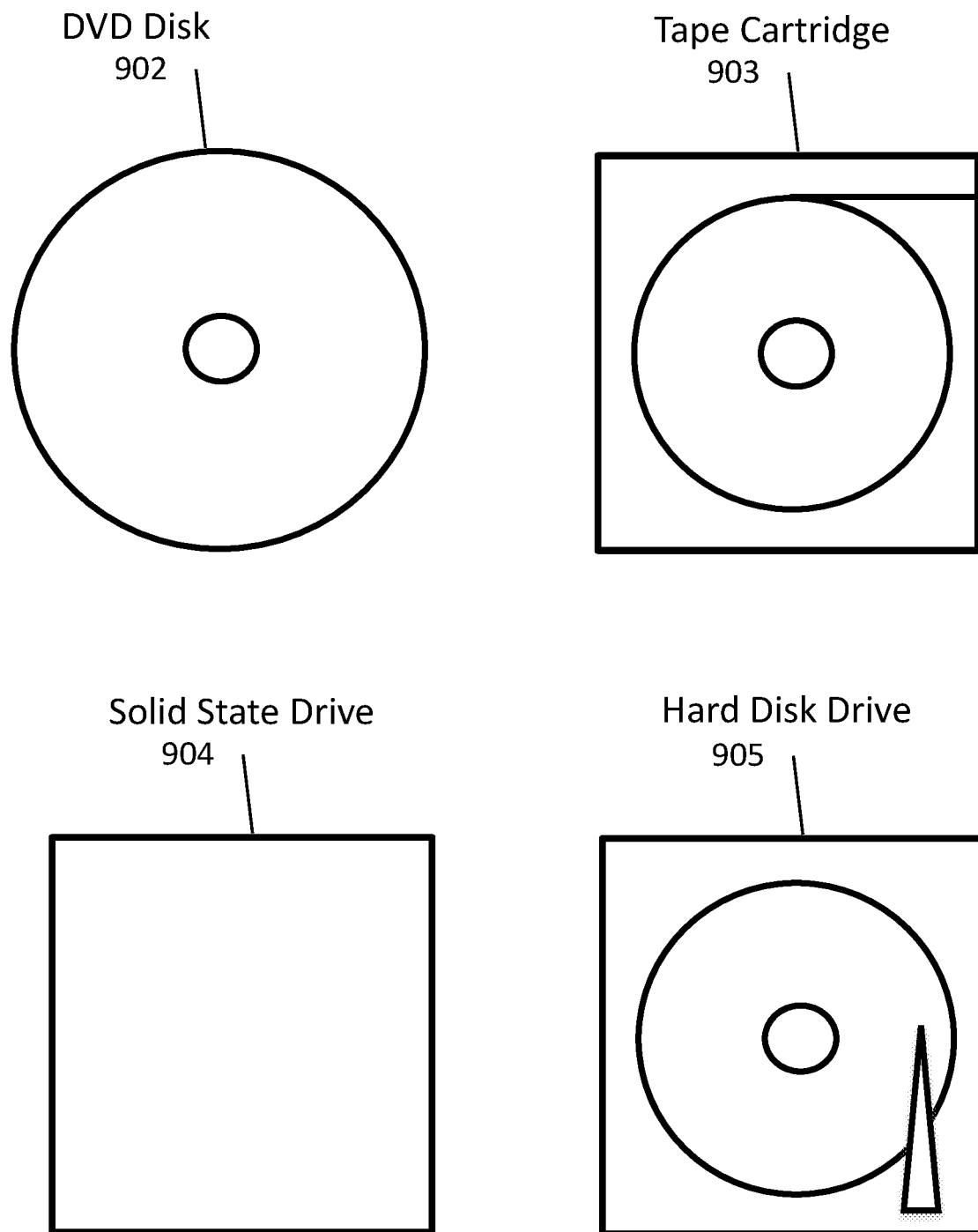
FIG. 9A illustrates DVD disk, tape cartridge, solid state drive, and hard disk drive for storing Merkle B-tree blockchained data.
Figure 9B:
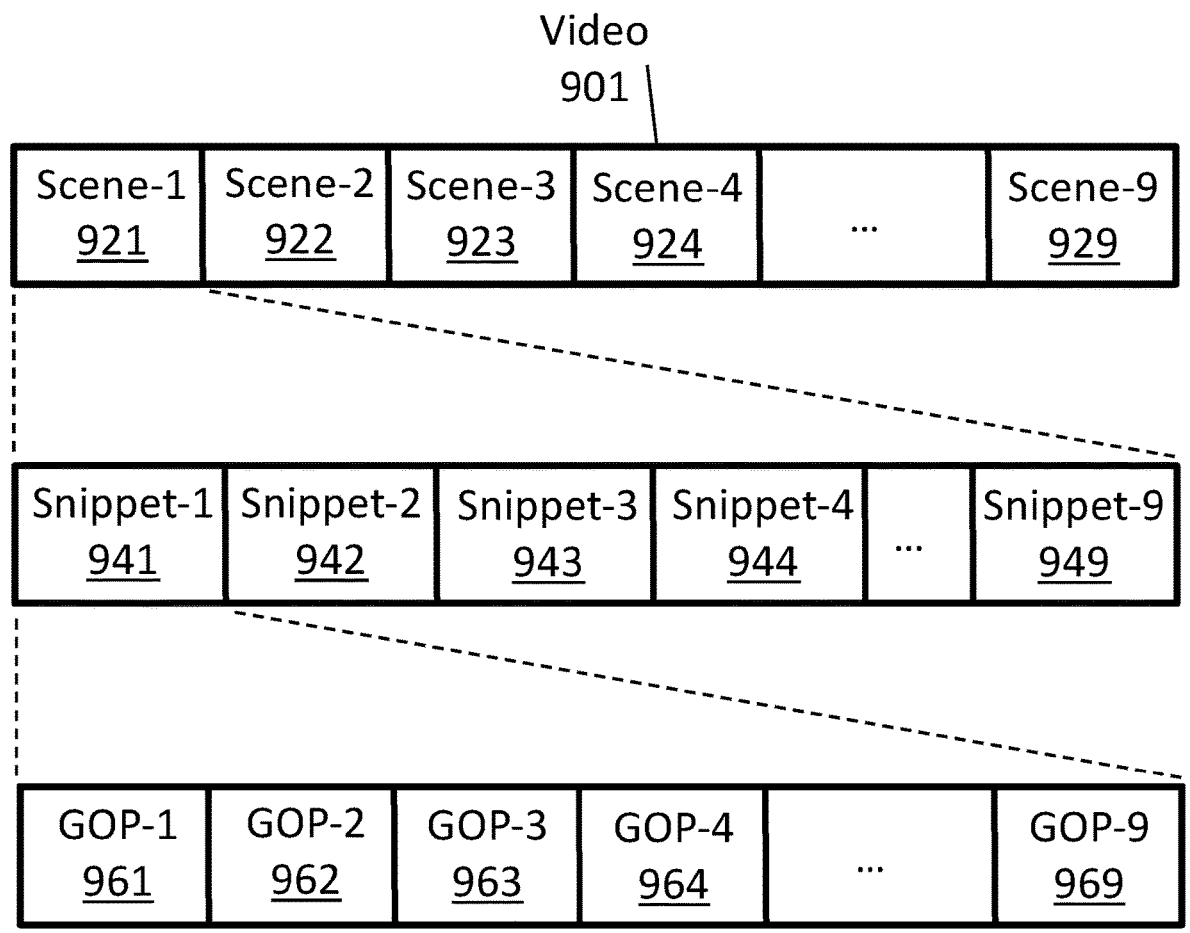
FIG. 9B illustrates a video stream comprising scenes, snippets, and groups-of-pictures (GOPs)

FIGS. 9A, 9B, 9C, 9D, 9E, 9F, 9G, 9H, and 9 illustrate an exemplary example of the blockchaining 900 of the video contents 901 which then could be stored on a permanent computer tangible medium such as DVD disk 902, tape cartridge 903, Solid State Drive (SSD) 904, or Hard Disk Drive (HDD) 905, FIG. 9A, using a Merkle B-Tree of order O=3. Video content was selected as an example because it has a lot of internal structure and as the desired level of detail is increased, the number of associated video objects greatly increases, as shown in FIG. 9B, from the entire video 901, to scenes 921-929, to snippets 941-949 which make up a scene, such as scene 921, to GOPs 961-969 which make up a snippet, such as snippet 941. This example is not restricted to a Merkle B-Tree of order O=3, as that order was chosen to be instructive while still allowing the artwork in FIGS. 9A-9I to be manageable in size.

Figure 9C:
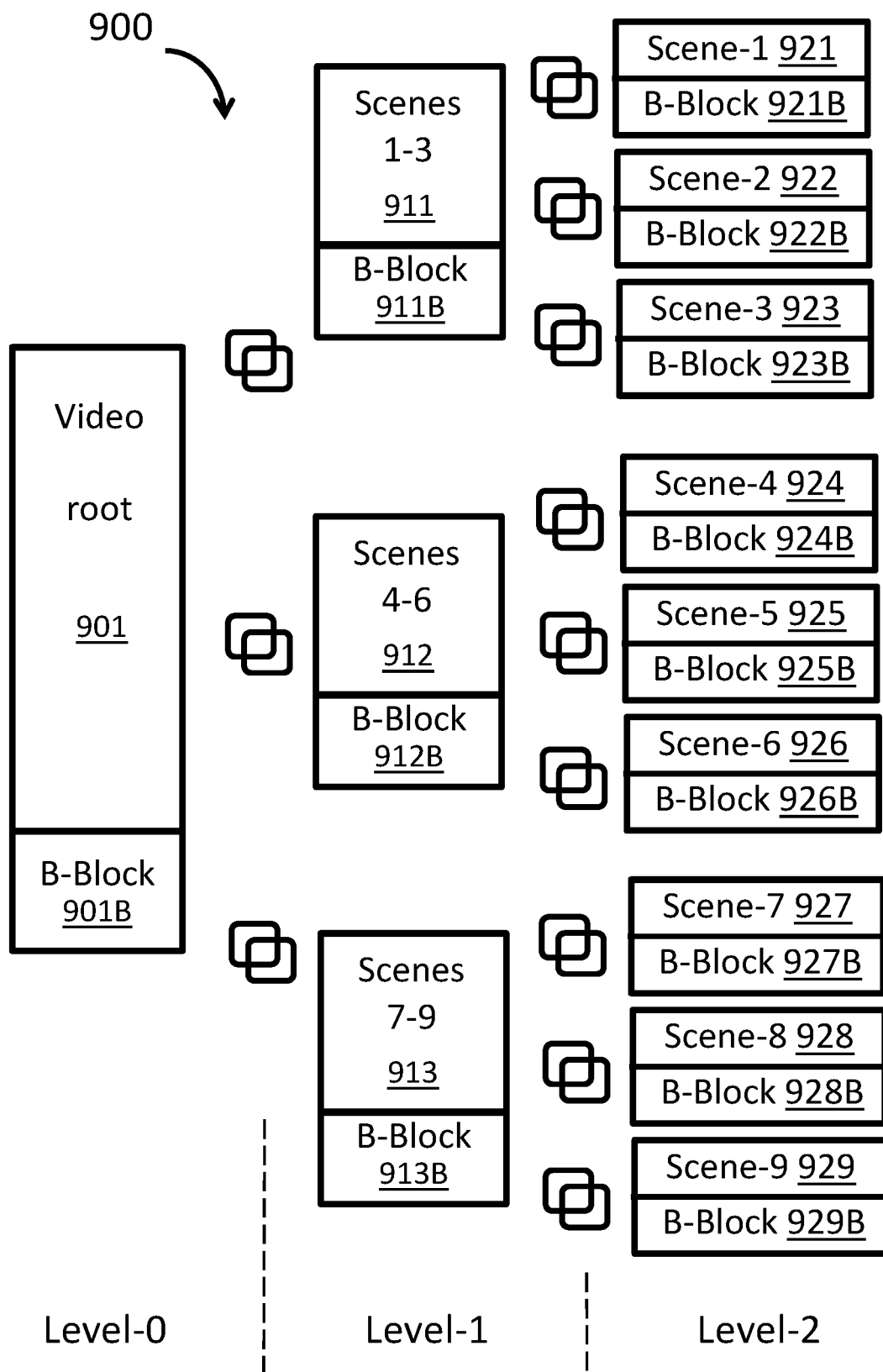
FIG. 9C illustrates levels n=0 (DVD content) through n=2 (individual scene) of an example Merkle B-Tree of order O=3 for DVD video.

Starting with FIG. 9C, the entire video content 901 is the root, in level n=0. The entire video contents may also include audio. As explained in the table in FIGS. 9C and 9D, column 70 gives the B-Block ID and column 71 gives the B-Block with blockchain HASH digest appended to object, and a data-pointer to the paired-object. Specifically, for level n=0, the entire video content 901 is hashed and this blockchain hash digest stored in B-Block 901B, which is a wrapper such as described in FIG. 8. Then B-Block 901B is appended to object 901 to create paired-object 901-901B, then a data-pointer for the paired-object 901-901B is generated, and then this paired-object is stored on one of the storage shown in FIG. 9A. For level n=1, as shown in FIG. 9C, the overall video content is divided up into three groups of scenes, scenes 1-3 (911), scenes 4-6 (912) and scenes 7-9 (913).

The blockchain HASH digest in B-Block 911B is the hash of scenes 1-3 (911) and previous B-Block 901B. The blockchain HASH digest in B-Block 912B is the hash of scenes 4-6 (912) and previous B-Block 901B. Additionally, the blockchain HASH digest in B-Block 913B is the hash of scenes 7-9 (913) and previous B-Block 901B. Then B-Block 911B is appended to object 911 to create paired-object 911-911B, B-Block 912B is appended to object 912 to create paired-object 912-912B, and B-Block 913B is appended to object 913 to create paired-object 913-913B. Following that, then one data-pointer for each paired-object 911-911B, 912-912B, and 913-913B is generated, and then these paired-objects are stored. It is this selective hashing of B-Block 901B from level n=0 together with individual objects 911, 912, and 913 in level n=1 which blockchains levels n=1 and level n=0.

For level n=2, as shown in FIG. 9C, the blockchain HASH digest in B-Block 921B is the hash of scene-1 (921) and previous B-Block 911B. The blockchain HASH digest in B-Block 922B is the hash of scene-2 (922) and previous B-Block 911B. Additionally, the blockchain HASH digest in B-Block 923B is the hash of scene-3 (923) and previous B-Block 911B. The blockchain HASH digest in B-Block 924B is the hash of scene-4 (924) and previous B-Block 912B. The blockchain HASH digest in B-Block 925B is the hash of scene-5 (925) and previous B-Block 912B. Additionally, the blockchain HASH digest in B-Block 926B is the hash of scene-6 (926) and previous B-Block 912B. Additionally, for level n=2, the blockchain HASH digest in B-Block 927B is the hash of scene-7 (927) and previous B-Block 913B. The blockchain HASH digest in B-Block 928B is the hash of scene-8 (928) and previous B-Block 913B. Additionally, the blockchain HASH digest in B-Block 929B is the hash of scene-9 (929) and previous B-Block 913B. Then B-Block 921B is appended to object 921 to create paired-object 921-921B, B-Block 922B is appended to object 922 to create paired-object 922-922B, B-Block 923B is appended to object 923 to create paired-object 923-923B, B-Block 924B is appended to object 924 to create paired-object 924-924B, B-Block 925B is appended to object 925 to create paired-object 925-925B, B-Block 926B is appended to object 926 to create paired-object 926-926B, B-Block 927B is appended to object 927 to create paired-object 927-927B, B-Block 928B is appended to object 928 to create paired-object 928-928B, and B-Block 929B is appended to object 929 to create paired-object 929-929B. Following that, then one data-pointer for each paired-object 921-921B, 922-922B, 923-923B, 924-924B, 925-925B, 926-926B, 927-927B, 928-928B, and 929-929B is generated, and then these paired-objects are stored. It is this selective hashing of B-Block 911B from level n=1 together with objects 921, 922, and 923, respectively, in level n=2; selective hashing of B-Block 912B from level n=1 together with objects 924, 925, and 926, respectively, in level n=2; and selective hashing B-Block 913B from level n=1 together with objects 927, 928, and 929, respectively, in level n=2, which blockchains levels n=2 and level n=1.

Figure 9E:
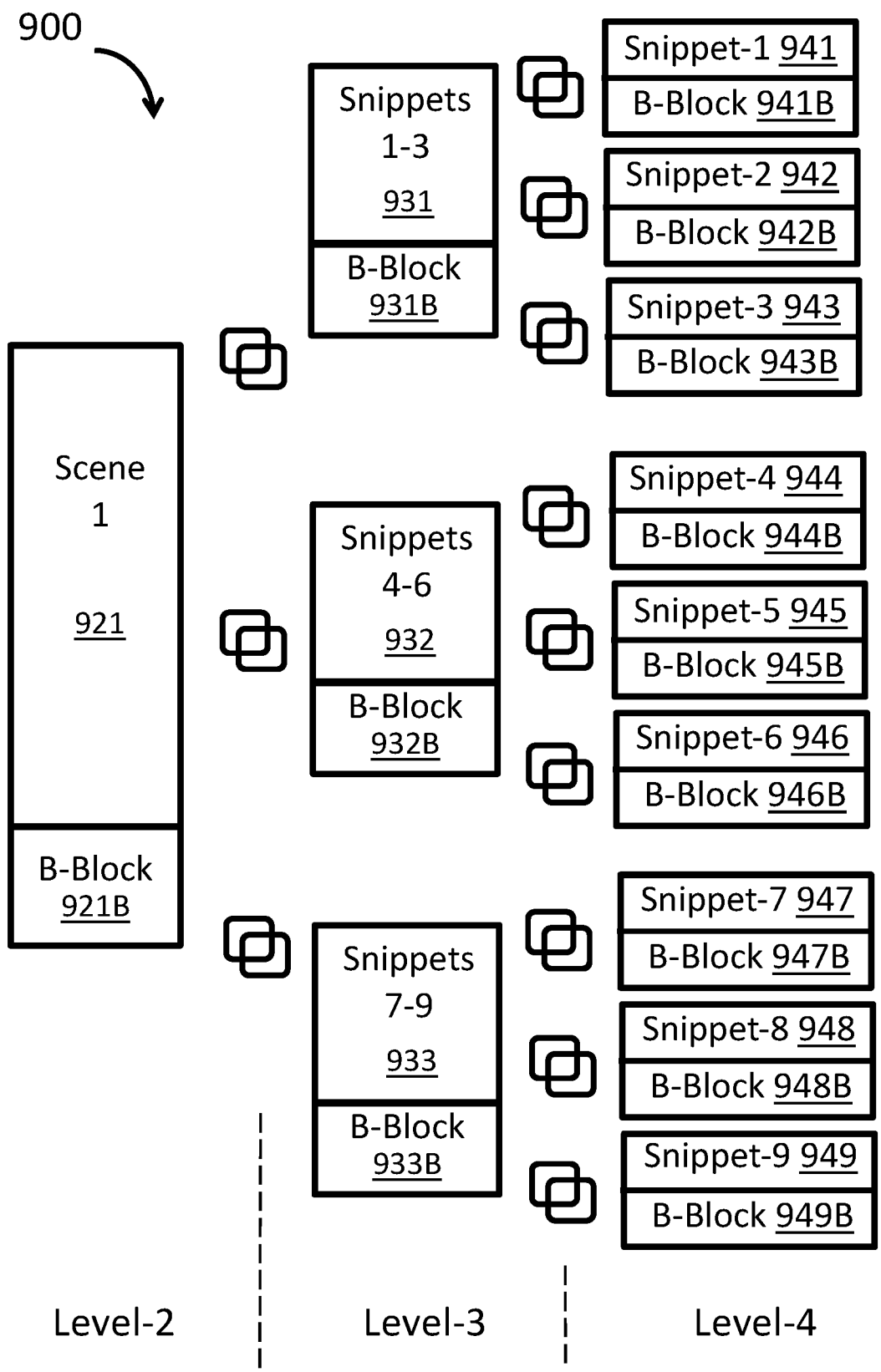
FIG. 9E illustrates levels n=2 (individual scene) through n=4 (individual snippet) of an example Merkle B-Tree of order O=3 for DVD video.

As explained in the table in FIGS. 9E and 9F, column 70 gives the B-Block ID and column 71 gives the B-Block with blockchain HASH digest appended to object, and a data-pointer to the paired-object. Specifically, for level n=2 in FIGS. 9E and 9F, we follow scene-1 921 for brevity, as there are too many scenes to all be included in one figure involving levels n=3 and n=4. For level n=3, as shown in FIG. 9E, scene-1 921 is divided up into three groups of snippets, snippets 1-3 (931), snippets 4-6 (932) and snippets 7-9 (933). The blockchain HASH digest in B-Block 931B is the hash of snippets 1-3 (931) and previous B-Block 921B. The blockchain HASH digest in B-Block 932B is the hash of snippets 4-6 (932) and previous B-Block 921B. Additionally, the blockchain HASH digest in B-Block 933B is the hash of snippets 7-9 (933) and previous B-Block 921B. Then B-Block 931B is appended to object 931 to create paired-object 931-931B, B-Block 932B is appended to object 932 to create paired-object 932-932B, and B-Block 933B is appended to object 933 to create paired-object 933-933B. Following that, then one data-pointer for each paired-object 931-931B, 932-932B, and 933-933B is generated, and then these paired-objects are stored. It is this selective hashing of B-Block 921B from level n=2 together with individual objects 931, 932, and 933 in level n=3 which blockchains level n=3 and level n=2. It is these snippets that are integrated to form a scene, such as scene 921. For example, snippet-1 may be actor A (on-screen) talking to actor B (off-screen), snippet-2 is actor B replying (on-screen) to actor A (now off-screen), and snippet-3 is actor C (on-screen) talking to both actors A and B (now both on-screen).

For level n=4, as shown in FIGS. 9E and 9F, the blockchain HASH digest in B-Block 941B is the hash of snippet-1 941 and previous B-Block 931B. The blockchain HASH digest in B-Block 942B is the hash of snippet-2 942 and previous B-Block 931B. Additionally, the blockchain HASH digest in B-Block 943B is the hash of snippet-3 943 and previous B-Block 931B. The blockchain HASH digest in B-Block 944B is the hash of snippet-4 944 and previous B-Block 932B. The blockchain HASH digest in B-Block 945B is the hash of snippet-5 945 and previous B-Block 932B. Additionally, the blockchain HASH digest in B-Block 946B is the hash of snippet-6 946 and previous B-Block 932B. Additionally, for level n=4, the blockchain HASH digest in B-Block 947B is the hash of snippet-7 947 and previous B-Block 933B. The blockchain HASH digest in B-Block 948B is the hash of snippet-8 948 and previous B-Block 933B. Additionally, the blockchain HASH digest in B-Block 949B is the hash of snippet-9 949 and previous B-Block 933B. Then B-Block 941B is appended to object 941 to create paired-object 941-941B, B-Block 942B is appended to object 942 to create paired-object 942-942B, B-Block 943B is appended to object 943 to create paired-object 943-943B, B-Block 944B is appended to object 944 to create paired-object 944-944B, B-Block 945B is appended to object 945 to create paired-object 945-945B, B-Block 946B is appended to object 946 to create paired-object 946-946B, B-Block 947B is appended to object 947 to create paired-object 947-947B, B-Block 948B is appended to object 948 to create paired-object 948-948B, and B-Block 949B is appended to object 949 to create paired-object 949-949B. Following that, then one data-pointer for each paired-object 941-941B, 942-942B, 943-943B, 944-944B, 945-945B, 946-946B, 947-947B, 948-948B, and 949-949B is generated, and then these paired-objects are stored. It is this selective hashing of B-Block 931B from level n=3 together with objects 941, 942, and 943, respectively, in level n=4; selective hashing of B-Block 932B from level n=3 together with objects 944, 945, and 946, respectively, in level n=4; and selective hashing B-Block 933B from level n=3 together with objects 947, 948, and 949, respectively, in level n=4, which blockchains levels n=4 and level n=3.

Figure 9G:
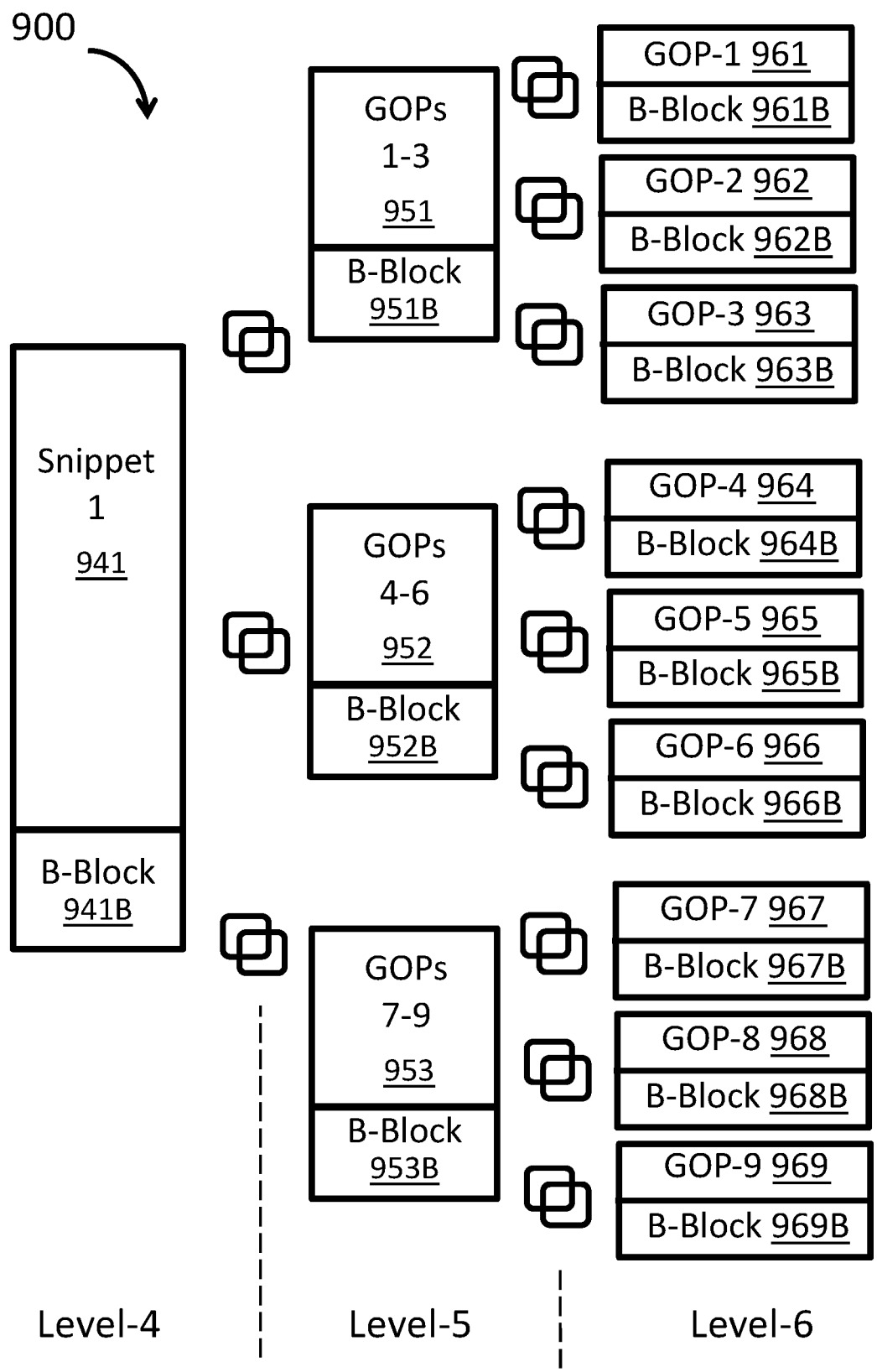
FIG. 9G illustrates levels n=4 (individual snippet) through n=6 (individual GOP) of an example Merkle B-Tree of order O=3 for DVD video.

As explained in the table in FIGS. 9G and 9H, column 70 gives the B-Block ID and column 71 gives the B-Block with blockchain HASH digest appended to object, and a data-pointer to the paired-object. Specifically, for level n=4 in FIGS. 9G and 9H, we follow snippet-1 941 for brevity, as there are too many snippets to all be included in one figure involving levels n=5 and n=6. For level n=4, as shown in FIG. 9G, snippet-1 941 is divided up into three groups of pictures, GOPs 1-3 (951), GOPs 4-6 (952) and GOPs 7-9 (953). The blockchain HASH digest in B-Block 951B is the hash of GOPs 1-3 (951) and previous B-Block 941B. The blockchain HASH digest in B-Block 952B is the hash of GOPs 4-6 (952) and previous B-Block 941B. Additionally, the blockchain HASH digest in B-Block 953B is the hash of GOPs 7-9 (953) and previous B-Block 941B. Then B-Block 951B is appended to object 951 to create paired-object 951-951B, B-Block 952B is appended to object 952 to create paired-object 952-952B, and B-Block 953B is appended to object 953 to create paired-object 953-953B. Following that, then one data-pointer for each paired-object 951-951B, 952-952B, and 953-953B is generated, and then these paired-objects are stored. It is this selective hashing of B-Block 941B from level n=4 together with individual objects 951, 952, and 953 in level n=5 which blockchains level n=5 and level n=4. It is these GOPs that are integrated to form a snippet, such as snippet 941.

For level n=6, as shown in FIGS. 9G and 9H, the blockchain HASH digest in B-Block 961B is the hash of GOP-1 961 and previous B-Block 951B. The blockchain HASH digest in B-Block 962B is the hash of GOP-2 962 and previous B-Block 951B. Additionally, the blockchain HASH digest in B-Block 963B is the hash of GOP-3 963 and previous B-Block 951B. The blockchain HASH digest in B-Block 964B is the hash of GOP-4 964 and previous B-Block 952B. The blockchain HASH digest in B-Block 965B is the hash of GOP-5 965 and previous B-Block 952B. Additionally, the blockchain HASH digest in B-Block 966B is the hash of GOP-6 966 and previous B-Block 952B. Additionally, for level n=6, the blockchain HASH digest in B-Block 967B is the hash of GOP-7 967 and previous B-Block 953B. The blockchain HASH digest in B-Block 968B is the hash of GOP-8 968 and previous B-Block 953B. Additionally, the blockchain HASH digest in B-Block 969B is the hash of GOP-9 969 and previous B-Block 953B. Then B-Block 961B is appended to object 961 to create paired-object 961-961B, B-Block 962B is appended to object 962 to create paired-object 962-962B, B-Block 963B is appended to object 963 to create paired-object 963-963B, B-Block 964B is appended to object 964 to create paired-object 964-964B, B-Block 965B is appended to object 965 to create paired-object 965-965B, B-Block 966B is appended to object 966 to create paired-object 966-966B, B-Block 967B is appended to object 967 to create paired-object 967-967B, B-Block 968B is appended to object 968 to create paired-object 968-968B, and B-Block 969B is appended to object 969 to create paired-object 969-969B. Following that, then one data-pointer for each paired-object 961-961B, 962-962B, 963-963B, 964-964B, 965-965B, 966-966B, 967-967B, 968-968B, and 969-969B is generated, and then these paired-objects are stored. It is this selective hashing of B-Block 951B from level n=5 together with objects 961, 962, and 963, respectively, in level n=6; selective hashing of B-Block 952B from level n=5 together with objects 964, 965, and 966, respectively, in level n=6; and selective hashing B-Block 953B from level n=5 together with objects 967, 968, and 969, respectively, in level n=6, which blockchains levels n=6 and level n=5.

Figure 9I:
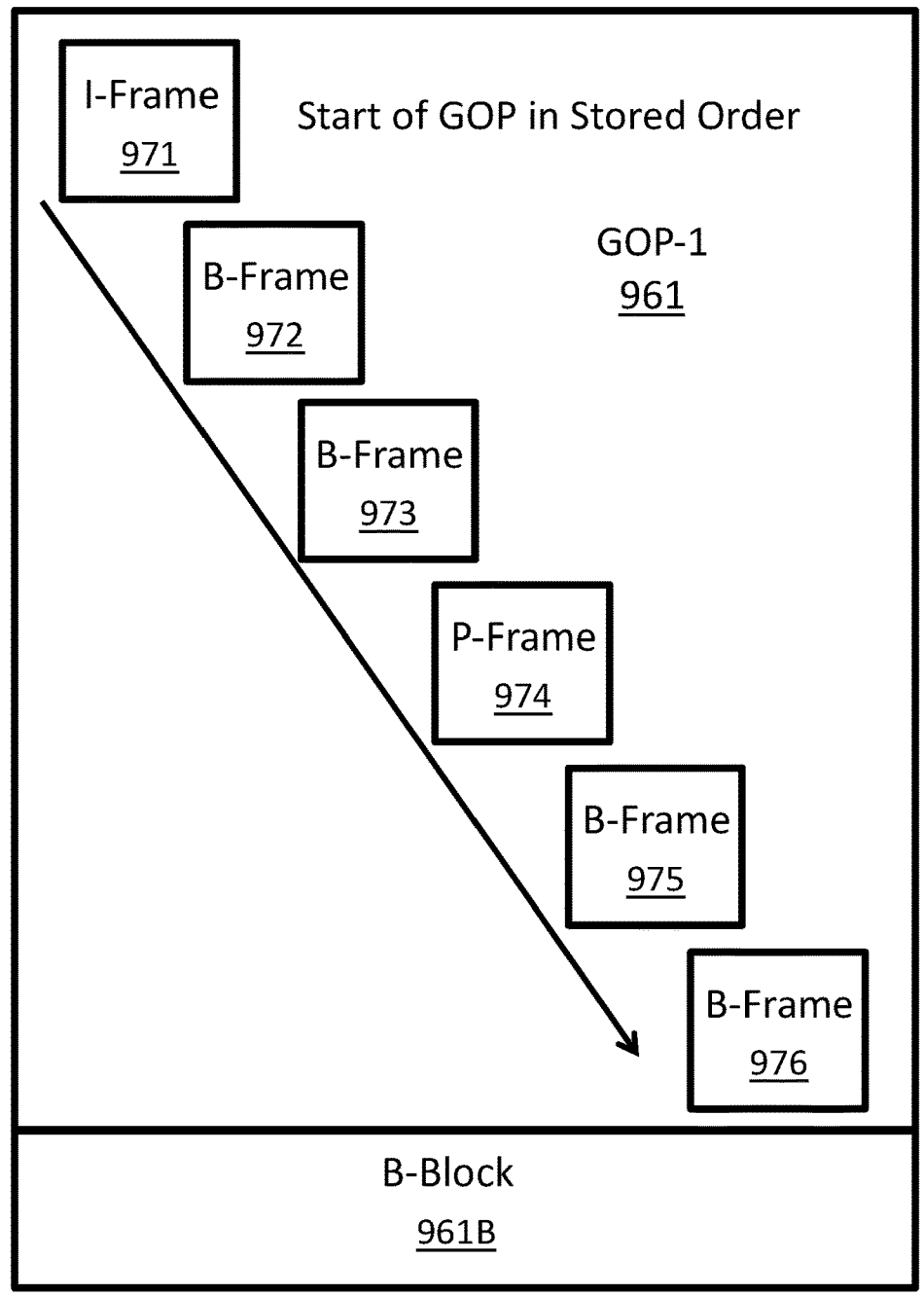
FIG. 9I illustrates a GOP (GOP-1, of snippet-1, of scene-1, of the DVD video) and its associated B-Block in level n=6 of an example Merkle B-Tree of order O=3 for DVD video.

FIGS. 9H and 9I discuss GOP-1 961 and appended B-block 961B, because the growing complexity limits what can be illustrated in a single figure. FIG. 9I illustrates a diagram of a video stream formed of a Group Of Pictures (GOP) 961 with I, B, and P Frames shown in stored order. GOP 961 includes I-Frame 971; B-Frames 972, 973, 975, and 976; and includes P-Frame 974. I-Frame 971 (intra coded frame) is a frame that is coded independently of all other frames. Each GOP 961 begins (in stored order) with an I-Frame. P-Frame 974 (predictive coded frame) contains motion-compensated difference information relative to previously decoded frames. In older designs such as MPEG-1, H.262/MPEG-2, and H.263, each P-Frame can only reference one frame, and that frame must precede the P-Frame in display order as well as in decoding order and must be an I-Frame or a P-Frame. These constraints do not apply in the newer standards H.264/MPEG-4 AVC and HEVC. B-Frames 972, 973, 975, and 976 (bi-predictive coded frame) contains motion-compensated difference information relative to previously decoded frames. In older designs such as MPEG-1 and H.262/MPEG-2, each B-Frame can only reference two frames, the one that precedes the B-Frame in display order and the one that follows, and all referenced frames must be I-Frames or P-Frames. These constraints do not apply in newer standards H.264/MPEG-4 AVC and HEVC. HEVC stands for High Efficiency Video Coding, which is also known as H.265 and MPEG-H Part 2. HVEC is a video compression standard, one of several potential successors to the widely used AVC (H.264 or MPEG-4 Part 10). In comparison to AVC, HEVC offers about double the data compression ratio at the same level of video quality, or substantially improved video quality at the same bit rate. It supports resolutions up to 8192×4320, including 8K UHD (Ultra High Definition). AVC stands for Advanced Video Coding. It is a block-oriented motion-compensation-based video compression standard. The I-Frame, P-Frame, and B-Frame structure of Group of Pictures 961 is often referred by two numbers, for example, ANCHOR=3, IMAGE=6. The first number tells the distance between two anchor frames (I or P). The second one tells the distance between two full images (I-frames), thereby designating the size of the GOP. In FIG. 9I, for example, ANCHOR=3, IMAGE=6, and the structure of GOP 961 depicted is IBBPBB which has IMAGE=6 frames total in the GOP sequence. There is an I or P anchor frame every ANCHOR=3 frames in the repeating sequence IBBPBB IBBPBB IBBPBB.

In all, FIGS. 9B-9I represent 9 scenes (FIG. 9C), 81 snippets (9 snippets per scene, FIG. 9E), and 729 GOPs (9 GOPs per snippet, FIG. 9G), but with only seven levels (n=0 to n=6) of blockchaining. Thus, when it comes to aggregating individual GOPs into snippets, and then snippets into scenes, and then scenes into an entire DVD disk, seven levels of blockchaining is much easier to implement and manipulate than if today's serial Merkle Tree (Merkle B-Tree of Order O=1, FIG. 1) were used. The example described in FIGS. 9A-9I could find application to the mastering of digital video, or for the archiving of digital video such as from the historic Apollo moon missions.

The use of a Merkle B-Trees of Order O=3 in FIGS. 9C-9I is not limiting, and an Order O=2 or Order O>3 may be used. Additionally, the B-Blocks used in FIGS. 9C-9I, with an internal structure as described in FIG. 8, allow for the selective declaration of the blockchain hashing algorithm used and this hashing algorithm could vary from level to level in FIGS. 9C-9I. This would allow for a more comprehensive blockchain algorithm, such as SHA-512, for video 901, groups of scenes 911-913, and individual scenes 921-929. For groups of snippets 931-933 and individual snippets 941-949, a blockchain algorithm with a smaller hash digest, such as SHA-256, could be used, as the data objects are getting smaller in size and thus the desire would be to have less hash digest overhead. Finally, for groups of GOPs 951-953 and individual GOPs 961-969, the blockchain algorithm with a small hash digest, such as MD-5, could be used, to minimize blockchain overhead associated with GOPs.

In another embodiment, storage-saving branch-pruning within the Merkle B-Tree can be employed when the hash digest in two B-Blocks from the same node are identical. When the hash digests for two objects are identical, it means that the objects themselves are identical. For example, if the hash digests in B-Blocks 961B and 962B are identical, then the data link for paired object 961-961B can also be used for identical paired object 962-962B, and this identical and thus redundant paired object 962-962B is simply not stored. Two separate links point to the same paired object 961-961B are used, namely the actual link to paired object 961-961B and the link associated with paired object 962-962B which is identical to paired object 961-961B. This branch-pruning action saves on the amount of storage required.

Figure 10A:
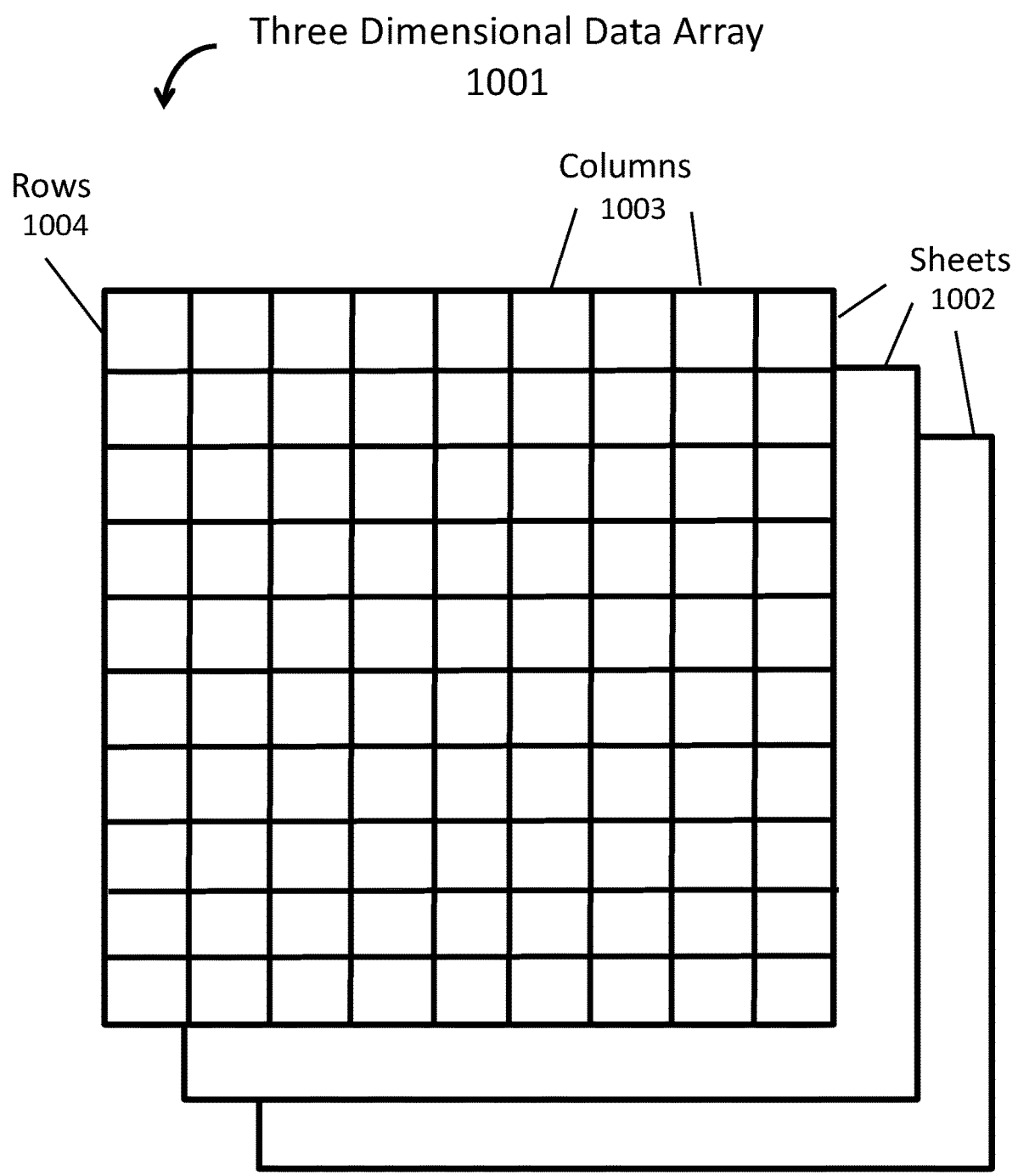
FIG. 10A illustrates a three-dimensional data array containing multiple sheets, and each sheet containing columns and rows.

FIGS. 10A, 10B, 10C, 10D, 10E, 10F, 10G, and 10H illustrate an exemplary example of the blockchaining 1000 of a three-dimensional data array 1001 which then could be stored on a permanent computer tangible medium such as a DVD disk 902, tape cartridge 903, Solid State Drive (SSD) 904, or Hard Disk Drive (HDD) 905, FIG. 9A, using a Merkle B-Tree of order O=3. A three-dimensional data array was selected as an example because it has a lot of internal structure and as the desired level of detail is increased, the number of associated data array objects greatly increases, as shown in FIG. 10A, from the entire three-dimensional database 1001, to sheets 1002, to columns 1003, and to rows 1004. This example is not restricted to a Merkle B-Tree of order O=3, as that order was chosen to be instructive while still allowing the artwork in FIGS. 10A-10H to be manageable in size.

Figure 10B:
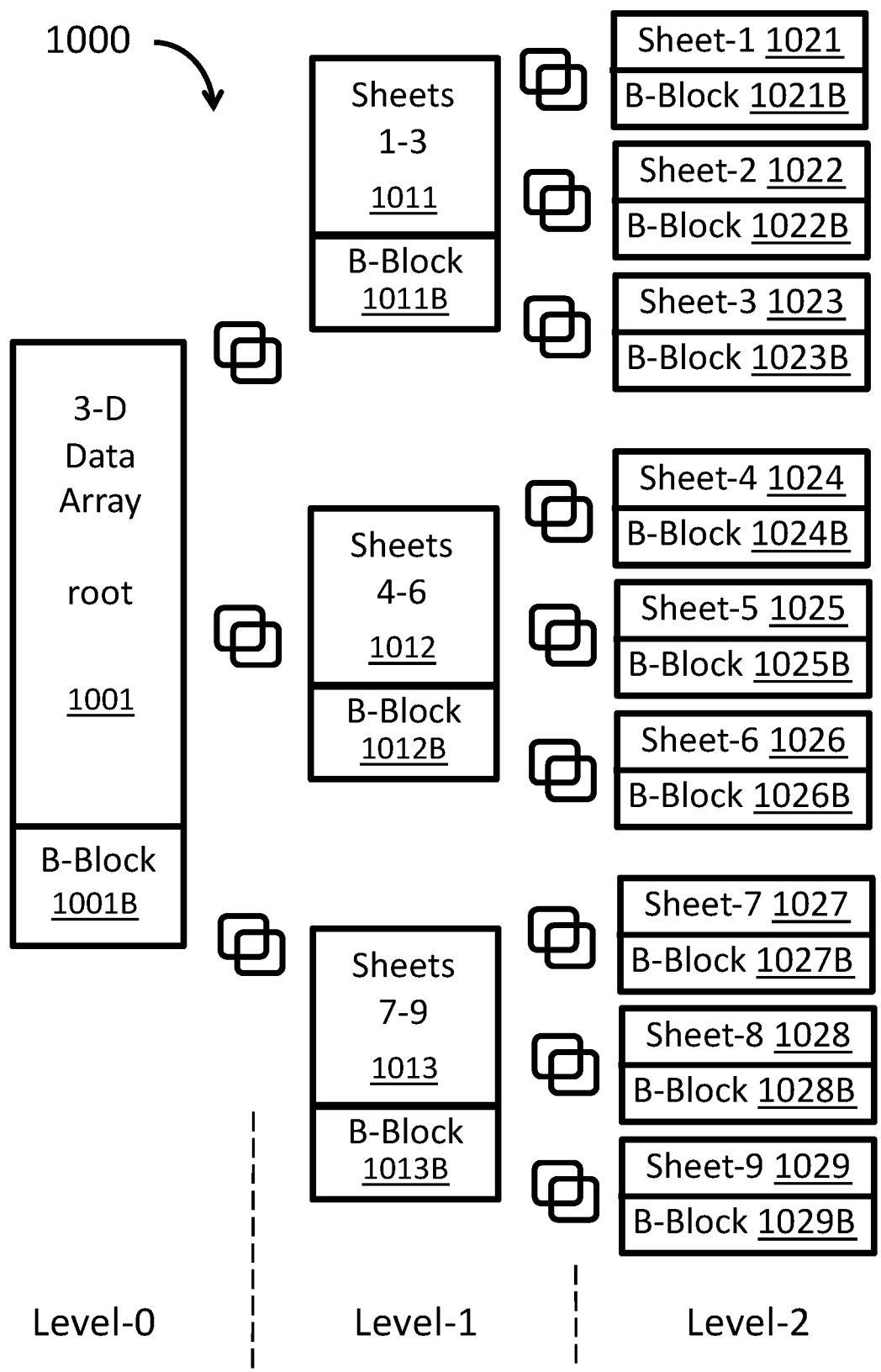
FIG. 10B illustrates levels n=0 (three-dimensional data array) through n=2 (individual sheets) of an example Merkle B-Tree of order O=3 for multi-dimensional data arrays.

Starting with FIG. 10B, the three-dimensional data array 1001 is the root, in level n=0. As explained in the table in FIGS. 10B and 10C, column 80 gives the B-Block ID and column 81 gives the B-Block with blockchain HASH digest appended to object, and a data-pointer to the paired-object. Specifically, for level n=0, the entire three-dimensional data array 1001 is hashed and this blockchain hash digest stored in B-Block 1001B, which is a wrapper such as described in FIG. 8. Then B-Block 1001B is appended to object 1001 to create paired-object 1001-1001B, then a data-pointer for the paired-object 1001-1001B is generated, and then this paired-object is stored on one of the storage shown in FIG. 9A. For level n=1, as shown in FIG. 10B, the overall three dimensional data array is divided up into three groups of sheets, sheets 1-3 (1011), sheets 4-6 (1012) and sheets 7-9 (1013). The blockchain HASH digest in B-Block 1011B is the hash of sheets 1-3 (1011) and previous B-Block 1001B. The blockchain HASH digest in B-Block 1012B is the hash of sheets 4-6 (1012) and previous B-Block 1001B. Additionally, the blockchain HASH digest in B-Block 1013B is the hash of sheets 7-9 (1013) and previous B-Block 1001B. Then B-Block 1011B is appended to object 1011 to create paired-object 1011-1011B, B-Block 1012B is appended to object 1012 to create paired-object 1012-1012B, and B-Block 1013B is appended to object 1013 to create paired-object 1013-1013B. Following that, then one data-pointer for each paired-object 1011-1011B, 1012-1012B, and 1013-1013B is generated, and then these paired-objects are stored. It is this selective hashing of B-Block 1001B from level n=0 together with individual objects 1011, 1012, and 1013 in level n=1 which blockchains levels n=1 and level n=0.

For level n=2, as shown in FIG. 10B, the blockchain HASH digest in B-Block 1021B is the hash of sheet-1 1021 and previous B-Block 1011B. The blockchain HASH digest in B-Block 1022B is the hash of sheet-2 1022 and previous B-Block 1011B. Additionally, the blockchain HASH digest in B-Block 1023B is the hash of sheet-3 1023 and previous B-Block 1011B. The blockchain HASH digest in B-Block 1024B is the hash of sheet-4 1024 and previous B-Block 1012B. The blockchain HASH digest in B-Block 1025B is the hash of sheet-5 1025 and previous B-Block 1012B. Additionally, the blockchain HASH digest in B-Block 1026B is the hash of sheet-6 1026 and previous B-Block 1012B. Additionally, for level n=2, the blockchain HASH digest in B-Block 1027B is the hash of sheet-7 1027 and previous B-Block 1013B. The blockchain HASH digest in B-Block 1028B is the hash of sheet-8 1028 and previous B-Block 1013B. Additionally, the blockchain HASH digest in B-Block 1029B is the hash of sheet-9 1029 and previous B-Block 1013B. Then B-Block 1021B is appended to object 1021 to create paired-object 1021-1021B, B-Block 1022B is appended to object 1022 to create paired-object 1022-1022B, B-Block 1023B is appended to object 1023 to create paired-object 1023-1023B, B-Block 1024B is appended to object 1024 to create paired-object 1024-1024B, B-Block 1025B is appended to object 1025 to create paired-object 1025-1025B, B-Block 1026B is appended to object 1026 to create paired-object 1026-1026B, B-Block 1027B is appended to object 1027 to create paired-object 1027-1027B, B-Block 1028B is appended to object 1028 to create paired-object 1028-1028B, and B-Block 1029B is appended to object 1029 to create paired-object 1029-1029B. Following that, then one data-pointer for each paired-object 1021-1021B, 1022-1022B, 1023-1023B, 1024-1024B, 1025-1025B, 1026-1026B, 1027-1027B, 1028-1028B, and 1029-1029B is generated, and then these paired-objects are stored. It is this selective hashing of B-Block 1011B from level n=1 together with objects 1021, 1022, and 1023, respectively, in level n=2; selective hashing of B-Block 1012B from level n=1 together with objects 1024, 1025, and 1026, respectively, in level n=2; and selective hashing B-Block 1013B from level n=1 together with objects 1027, 1028, and 1029, respectively, in level n=2, which blockchains levels n=2 and level n=1.

Figure 10D:
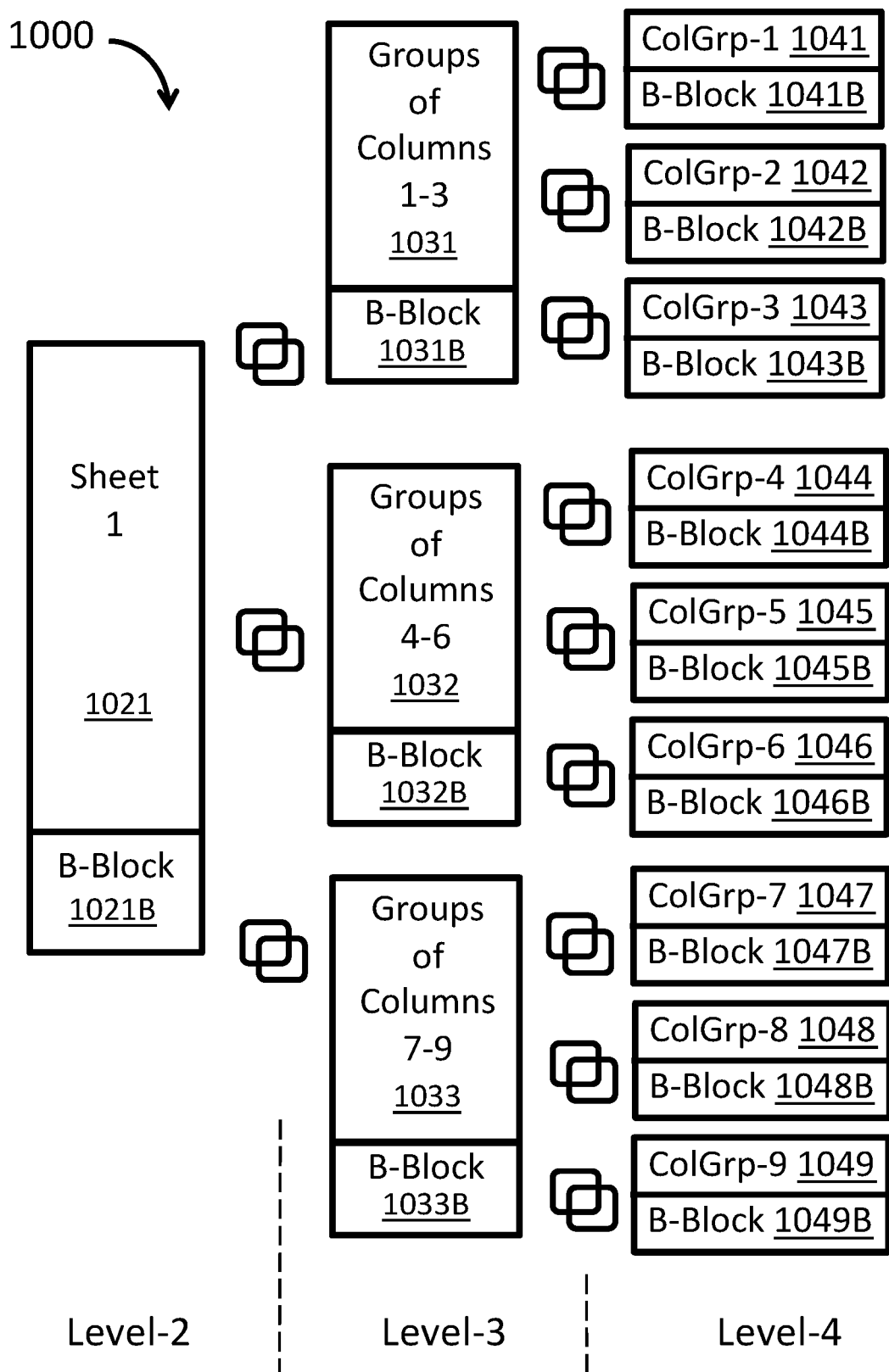
FIG. 10D illustrates levels n=2 (sheet-1) through n=4 (individual groups of columns) of an example Merkle B-Tree of order O=3 for multi-dimensional data arrays.

As explained in the table in FIGS. 10D and 10E, column 80 gives the B-Block ID and column 81 gives the B-Block with blockchain HASH digest appended to object, and a data-pointer to the paired-object. Specifically, for level n=2 in FIGS. 10D and 10E, we follow sheet-1 1021 for brevity, as there are too many sheets to all be included in one figure involving levels n=3 and n=4. For level n=3, as shown in FIG. 10, sheet-1 1021 is divided up into three groups of columns, groups of columns 1-3 (1031), groups of columns 4-6 (1032) and groups of columns 7-9 (1033). The blockchain HASH digest in B-Block 1031B is the hash of groups of columns 1-3 (1031) and previous B-Block 1021B. The blockchain HASH digest in B-Block 1032B is the hash of groups of columns 4-6 (1032) and previous B-Block 1021B. Additionally, the blockchain HASH digest in B-Block 1033B is the hash of groups of columns 7-9 (1033) and previous B-Block 1021B. Then B-Block 1031B is appended to object 1031 to create paired-object 1031-1031B, B-Block 1032B is appended to object 1032 to create paired-object 1032-1032B, and B-Block 1033B is appended to object 1033 to create paired-object 1033-1033B. Following that, then one data-pointer for each paired-object 1031-1031B, 1032-1032B, and 1033-1033B is generated, and then these paired-objects are stored. It is this selective hashing of B-Block 1021B from level n=2 together with individual objects 1031, 1032, and 1033 in level n=3 which blockchains level n=3 and level n=2. It is these groups of columns that are integrated to form a sheet, such as sheet 1021.

For level n=4, as shown in FIGS. 10D and 10E, the blockchain HASH digest in B-Block 1041B is the hash of column group-1 1041 and previous B-Block 1031B. The blockchain HASH digest in B-Block 1042B is the hash of column group-2 1042 and previous B-Block 1031B. Additionally, the blockchain HASH digest in B-Block 1043B is the hash of column group-3 1043 and previous B-Block 1031B. The blockchain HASH digest in B-Block 1044B is the hash of column group-4 1044 and previous B-Block 1032B. The blockchain HASH digest in B-Block 1045B is the hash of column group-5 1045 and previous B-Block 1032B. Additionally, the blockchain HASH digest in B-Block 1046B is the hash of column group-6 1046 and previous B-Block 1032B. Additionally, for level n=4, the blockchain HASH digest in B-Block 1047B is the hash of column group-7 1047 and previous B-Block 1033B. The blockchain HASH digest in B-Block 1048B is the hash of column group-8 1048 and previous B-Block 1033B. Additionally, the blockchain HASH digest in B-Block 1049B is the hash of column group-9 1049 and previous B-Block 1033B. Then B-Block 1041B is appended to object 1041 to create paired-object 1041-1041B, B-Block 1042B is appended to object 1042 to create paired-object 1042-1042B, B-Block 1043B is appended to object 1043 to create paired-object 1043-1043B, B-Block 1044B is appended to object 1044 to create paired-object 1044-1044B, B-Block 1045B is appended to object 1045 to create paired-object 1045-1045B, B-Block 1046B is appended to object 1046 to create paired-object 1046-1046B, B-Block 1047B is appended to object 1047 to create paired-object 1047-1047B, B-Block 1048B is appended to object 1048 to create paired-object 1048-1048B, and B-Block 1049B is appended to object 1049 to create paired-object 1049-1049B. Following that, then one data-pointer for each paired-object 1041-1041B, 1042-1042B, 1043-1043B, 1044-1044B, 1045-1045B, 1046-1046B, 1047-1047B, 1048-1048B, and 1049-1049B is generated, and then these paired-objects are stored. It is this selective hashing of B-Block 1031B from level n=3 together with objects 1041, 1042, and 1043, respectively, in level n=4; selective hashing of B-Block 1032B from level n=3 together with objects 1044, 1045, and 1046, respectively, in level n=4; and selective hashing B-Block 1033B from level n=3 together with objects 1047, 1048, and 1049, respectively, in level n=4, which blockchains levels n=4 and level n=3.

Figure 10F:
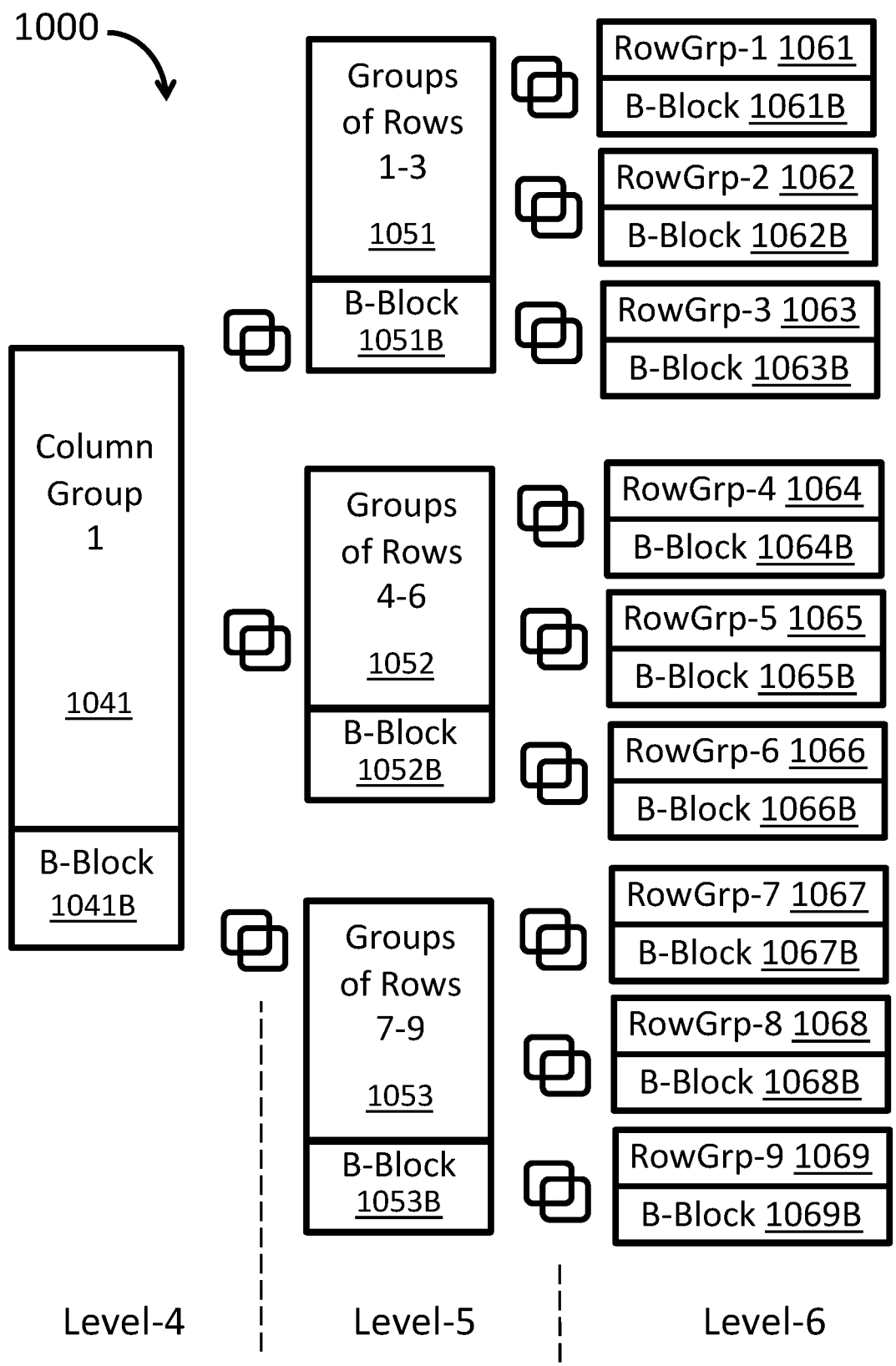
FIG. 10F illustrates levels n=4 (column-group 1) through n=6 (individual groups of rows) of an example Merkle B-Tree of order O=3 for multi-dimensional data arrays.

As explained in the table in FIGS. 10F and 10G, column 80 gives the B-Block ID and column 81 gives the B-Block with blockchain HASH digest appended to object, and a data-pointer to the paired-object. Specifically, for level n=4 in FIGS. 10F and 10G, we follow column group-1 1041 for brevity, as there are too many groups of columns to all be included in one figure involving levels n=5 and n=6. For level n=4, as shown in FIG. 9G, column group-1 1041 is divided up into three groups of rows, groups of rows 1-3 (1051), groups of rows 4-6 (1052) and groups of rows 7-9 (1053). The blockchain HASH digest in B-Block 1051B is the hash of groups of rows 1-3 (1051) and previous B-Block 1041B. The blockchain HASH digest in B-Block 1052B is the hash of groups of rows 4-6 (1052) and previous B-Block 1041B. Additionally, the blockchain HASH digest in B-Block 1053B is the hash of groups of rows 7-9 (1053) and previous B-Block 1041B. Then B-Block 1051B is appended to object 1051 to create paired-object 1051-1051B, B-Block 1052B is appended to object 1052 to create paired-object 1052-1052B, and B-Block 1053B is appended to object 1053 to create paired-object 1053-1053B. Following that, then one data-pointer for each paired-object 1051-1051B, 1052-1052B, and 1053-1053B is generated, and then these paired-objects are stored. It is this selective hashing of B-Block 1041B from level n=4 together with individual objects 1051, 1052, and 1053 in level n=5 which blockchains level n=5 and level n=4. It is these groups of rows that are integrated to form a group of columns, such as column group-1 1041.

For level n=6, as shown in FIGS. 10F and 10G, the blockchain HASH digest in B-Block 1061B is the hash of row group-1061 and previous B-Block 1051B. The blockchain HASH digest in B-Block 1062B is the hash of row group-2 1062 and previous B-Block 1051B. Additionally, the blockchain HASH digest in B-Block 1063B is the hash of row group-3 1063 and previous B-Block 1051B. The blockchain HASH digest in B-Block 1064B is the hash of row group-4 1064 and previous B-Block 1052B. The blockchain HASH digest in B-Block 1065B is the hash of row group-5 1065 and previous B-Block 1052B. Additionally, the blockchain HASH digest in B-Block 1066B is the hash of row group-6 1066 and previous B-Block 1052B. Additionally, for level n=6, the blockchain HASH digest in B-Block 1067B is the hash of row group-7 1067 and previous B-Block 1053B. The blockchain HASH digest in B-Block 1068B is the hash of row group-8 1068 and previous B-Block 1053B. Additionally, the blockchain HASH digest in B-Block 1069B is the hash of row group-9 1069 and previous B-Block 1053B. Then B-Block 1061B is appended to object 1061 to create paired-object 1061-1061B, B-Block 1062B is appended to object 1062 to create paired-object 1062-1062B, B-Block 1063B is appended to object 1063 to create paired-object 1063-1063B, B-Block 1064B is appended to object 1064 to create paired-object 1064-1064B, B-Block 1065B is appended to object 1065 to create paired-object 1065-1065B, B-Block 1066B is appended to object 1066 to create paired-object 1066-1066B, B-Block 1067B is appended to object 1067 to create paired-object 1067-1067B, B-Block 1068B is appended to object 1068 to create paired-object 1068-1068B, and B-Block 1069B is appended to object 1069 to create paired-object 1069-1069B. Following that, then one data-pointer for each paired-object 1061-1061B, 1062-1062B, 1063-1063B, 1064-1064B, 1065-1065B, 1066-1066B, 1067-1067B, 1068-1068B, and 1069-1069B is generated, and then these paired-objects are stored. It is this selective hashing of B-Block 1051B from level n=5 together with objects 1061, 1062, and 1063, respectively, in level n=6; selective hashing of B-Block 1052B from level n=5 together with objects 1064, 1065, and 1066, respectively, in level n=6; and selective hashing B-Block 1053B from level n=5 together with objects 1067, 1068, and 1069, respectively, in level n=6, which blockchains levels n=6 and level n=5.

Figure 10H:
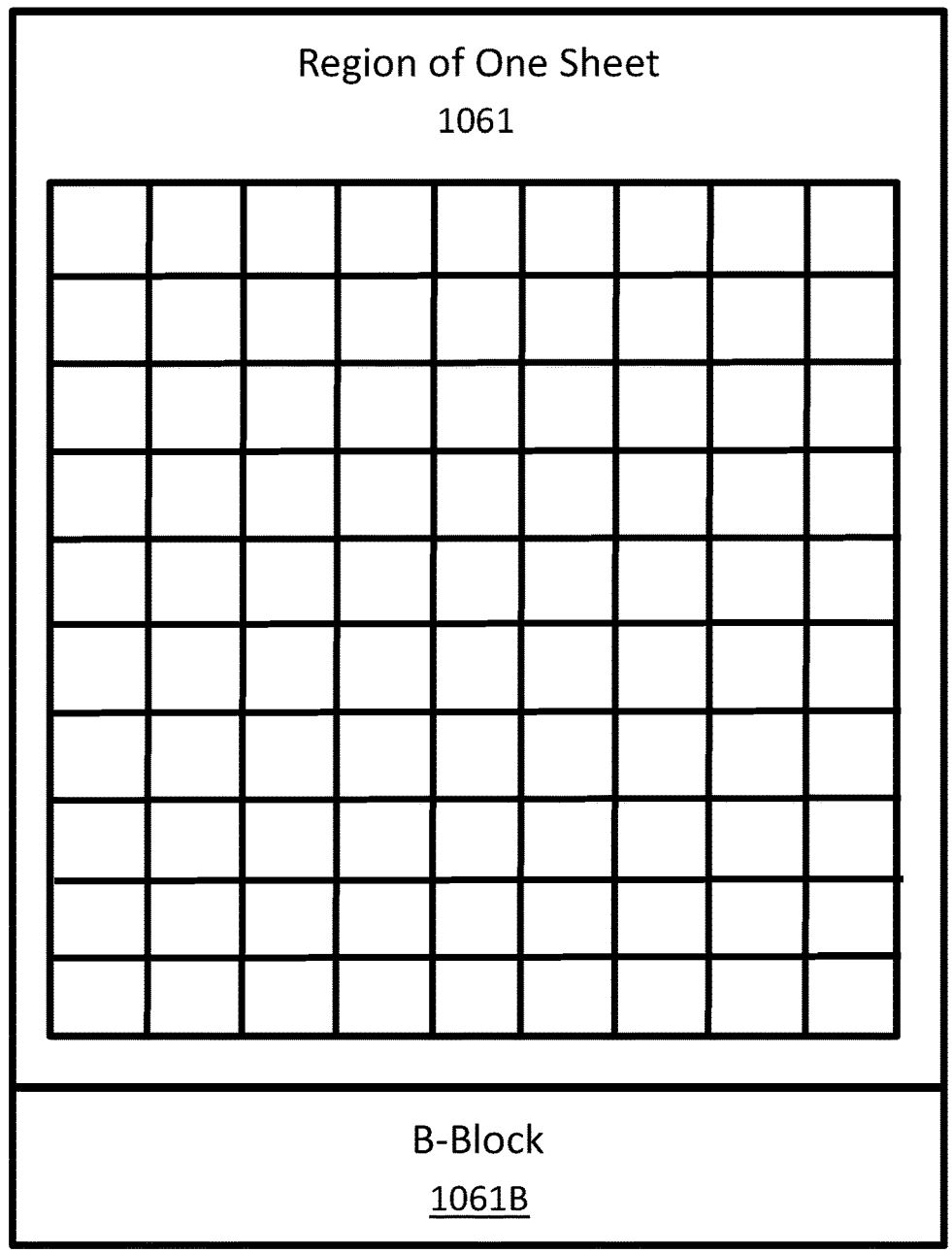
FIG. 10H illustrates level n=6 (row group-1 and column group-1, of sheet-1, and the associated B-Block) of an example Merkle B-Tree of order O=3 for multi-dimensional data arrays.

FIGS. 10G and 10H discuss row group-1 1061, which itself is a subset of column group-1 and thus a subset of sheet-1, and appended B-block 1061B, because the growing complexity limits what can be illustrated in a single figure. FIG. 10H illustrates a diagram of a region of a three-dimensional data array formed of a sheet with columns and rows, which may be accessed in only seven levels (level n=0 to level n=6) with a Merkle B-Tree of Order O=3 as opposed to today's serial approach to blockchaining with a Merkle B-Tree of Order O=1.

In addition to the example of a video stream comprising scenes, snippets, and groups-of-pictures (GOPs), as well as the example of a three-dimensional data array containing multiple sheets, and each sheet containing columns and rows, there is a third example of a structure that could benefit from the Merkle B-Tree. This third structure is that of a hard disk drive, solid state drive, or thumb drive, where the "root" level n=0 is the data storage device itself. Level n=1 could be logical partitions such as the C:>drive and the D:>drive. Level n=2 could be major directories in each logical partition. Level n=3 could be subdirectories in each major directory, and so on. These examples may be applied to other forms of large data sets that lend themselves to organization under a Merkle B-Tree.

Figure 11A:
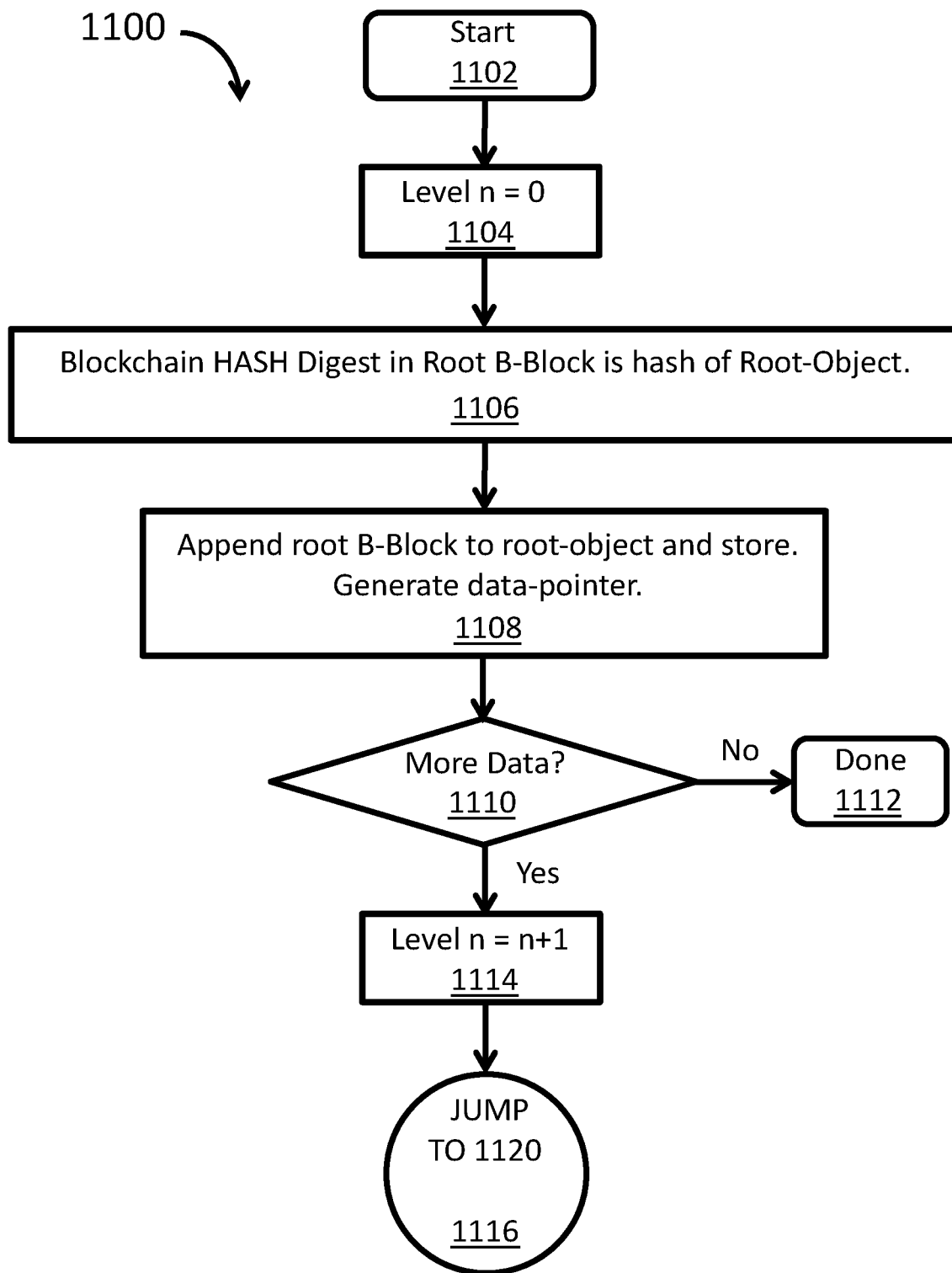
FIG. 11A begins a flowchart 1100 illustrating a single-core process for blockchaining for Merkle B-Trees.
Figure 11B:
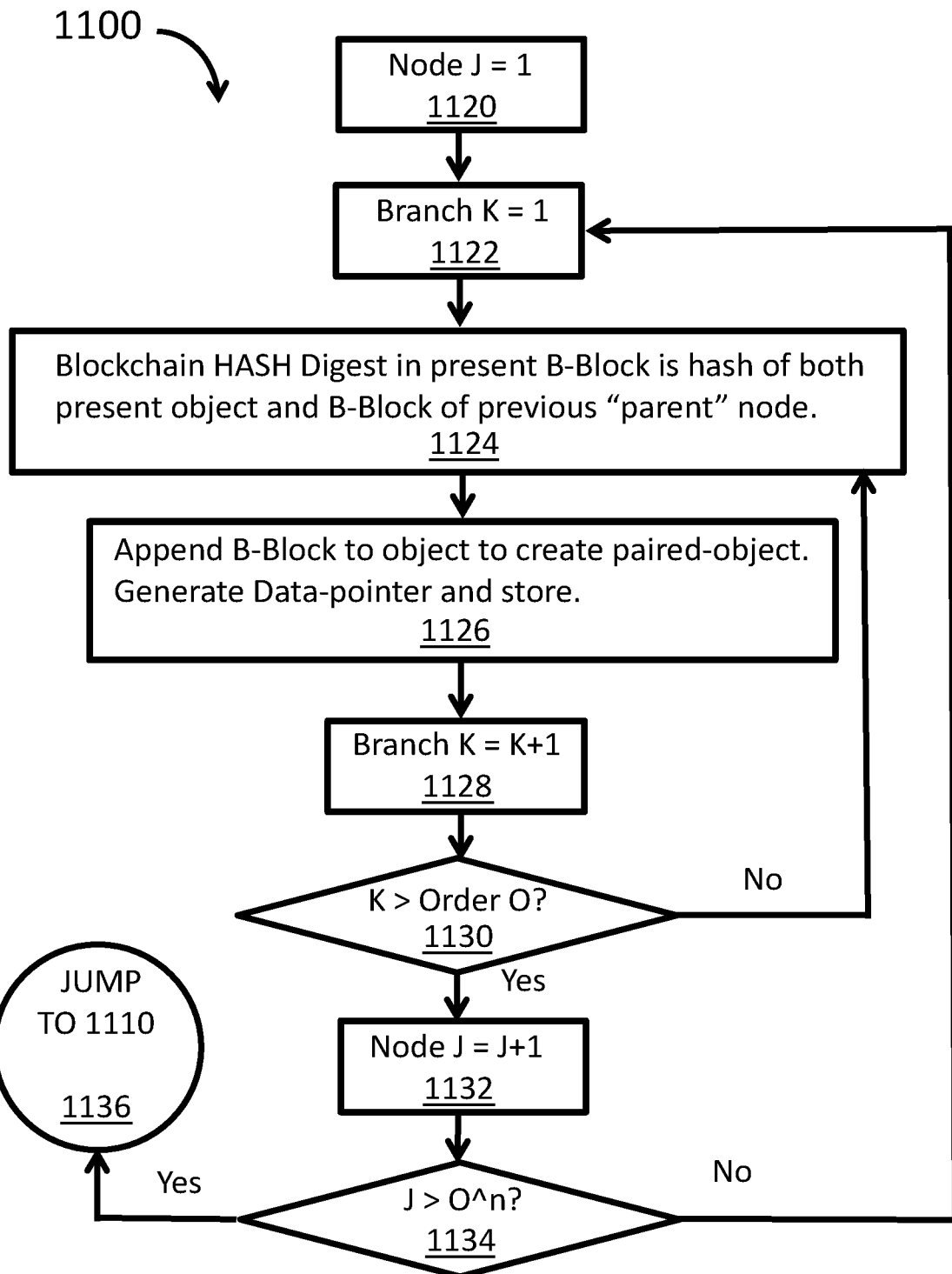
FIG. 11B continues a flowchart 1100 illustrating a single-core process for blockchaining for Merkle B-Trees.

FIGS. 11A and 11B is a flowchart for implementing Merkle B-Trees with a single core, such as core 404. In FIG. 11A, process 1100 starts at step 1102 and proceeds to step 1104 where root level n=0 is declared. The process flows to step 1106 where the blockchain hash digest in the root B-Block is always the hash of the root-object itself. Then, in step 1108, the root B-Block is appended to the root object, to create a paired object, and stored, and a data pointer is generated. In decision step 1110, the question is asked whether there is more data. If the answer is no, the process completes in step 1112. If the answer is yes, in step 1114, the level is incremented by one, via n=n+1, then in step 1116, the process jumps to step 1120 in FIG. 11B.

In step 1120 of FIG. 11B, the node counter is set to J=1. Then in step 1122, the branch counter is set to K=1. In step 1124, the blockchain hash digest in the present B-block (node J, branch K) is the hash of both the present object and the B-Block of the previous "parent" node. In step 1126, the present B-Block is appended to the present object, to create a paired object, and stored, and a data pointer is generated. Then, in step 1128, the branch counter is incremented by one, K=K+1. Decision step 1130 asks if the branch counter K exceeds the Order "O" of the Merkle B-Tree. If no, the process goes to step 1124 to process the next branch of that node. If yes, then in step 1132, the node counter is incremented by one, J=J+1. Decision step 1134 asks whether the node counter exceeds the number of nodes at that level n, namely J>O^n. If the answer is no in step 1134, the process goes back to step 1122 to reset the branch counter to one, K=1, to begin processing all of the "O" branches for this node. However, if the answer is yes in step 1134, then the process jumps to step 1110 of FIG. 11A to question whether there is more data to blockchain.

Figure 12A:
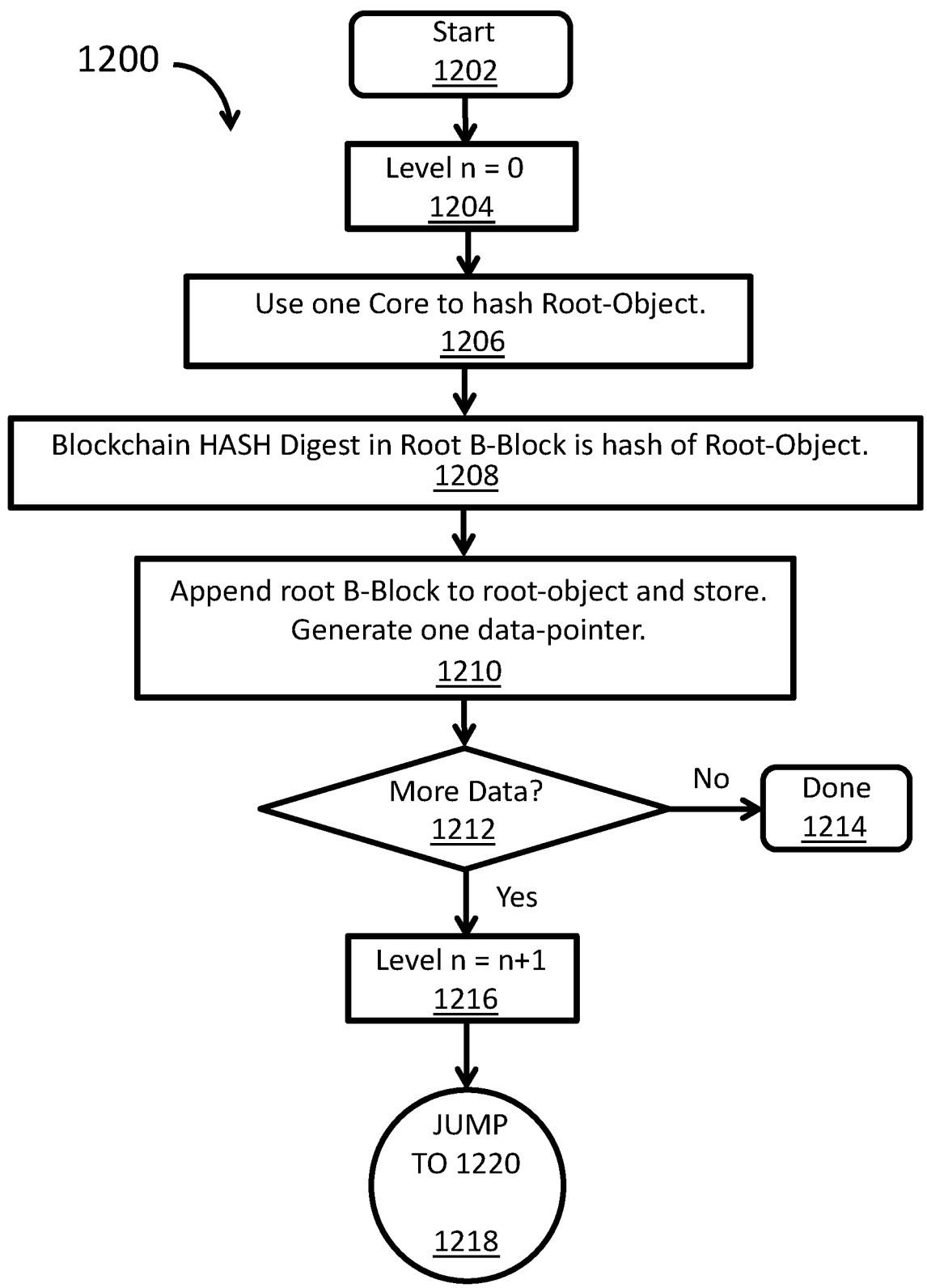
FIG. 12A begins a flowchart 1200 illustrating multi-core parallel-processing for blockchaining for Merkle B-Trees.
Figure 12B:
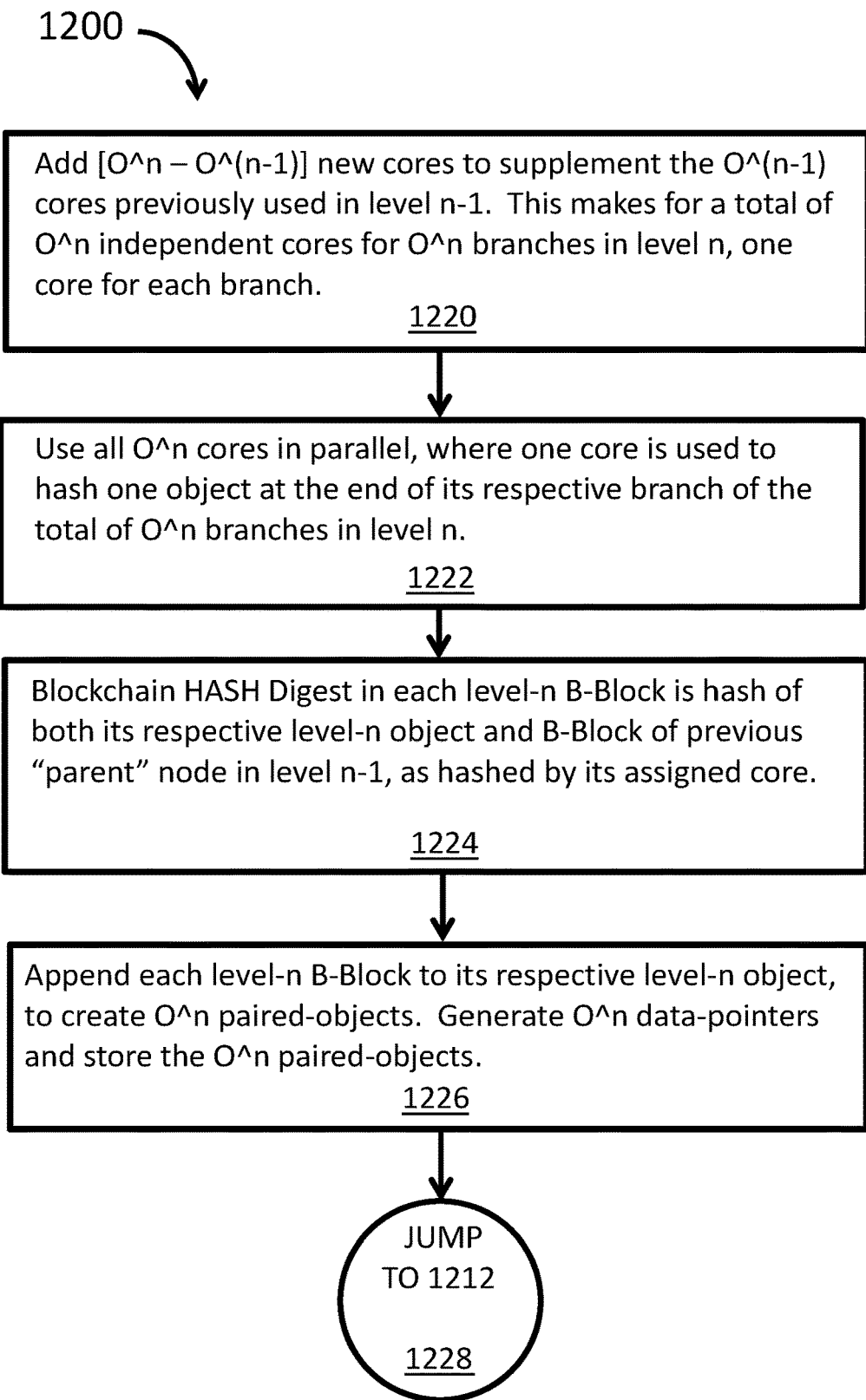
FIG. 12B continues a flowchart 1200 illustrating multi-core parallel-processing for blockchaining for Merkle B-Trees.

FIGS. 12A and 12B is a flowchart for implementing parallel processing to create Merkle B-Trees, such as depicted in FIGS. 6E and 7E, via multiple cores, such as cores 404. In FIG. 12A, process 1200 starts at step 1202 and proceeds to step 1204 where root level n=0 is declared. The process flows to step 1206 where one core hashes the root object. Then in step 1208, the blockchain hash digest in the root B-Block is always the hash of the root-object itself. Then, in step 1210, the root B-Block is appended to the root object, to create a paired object, and stored, and one data pointer is generated. In decision step 1212, the question is asked whether there is more data. If the answer is no, the process completes in step 1214. If the answer is yes, in step 1216, the level is incremented by one, via n=n+1, then in step 1218, the process jumps to step 1220 in FIG. 12B.

In step 1220, FIG. 12B, add [O^n–O^(n–1)] new cores to supplement the O^(n–1) cores previously used in level n–1. This makes for a total of O^n independent cores for O^n branches in level n, one core for each branch. In step 1222, use all O^n cores in parallel, where one core is used to hash one object at the end of its respective branch of the total of O^n branches in level n. In step 1124, the blockchain HASH Digest in each level-n B-Block is the hash of both its respective level-n object and B-Block of previous "parent" node in level n–1, as hashed by its assigned core. In step 1226, append each level-n B-Block to its respective level-n object, to create O^n paired-objects. Generate O^n data-pointers and store the O^n paired-objects. Then, in step 1228, jump to step 1212 to check if there is more data to blockchain. This invention is not limited to Merkle B-trees of order O=2, O=3, and O=4 or levels of N=15 or lower. Merkle B-trees of orders "O" higher than four and levels "n" in excess of fifteen may be used without loss of generalization.

Figure 13A:
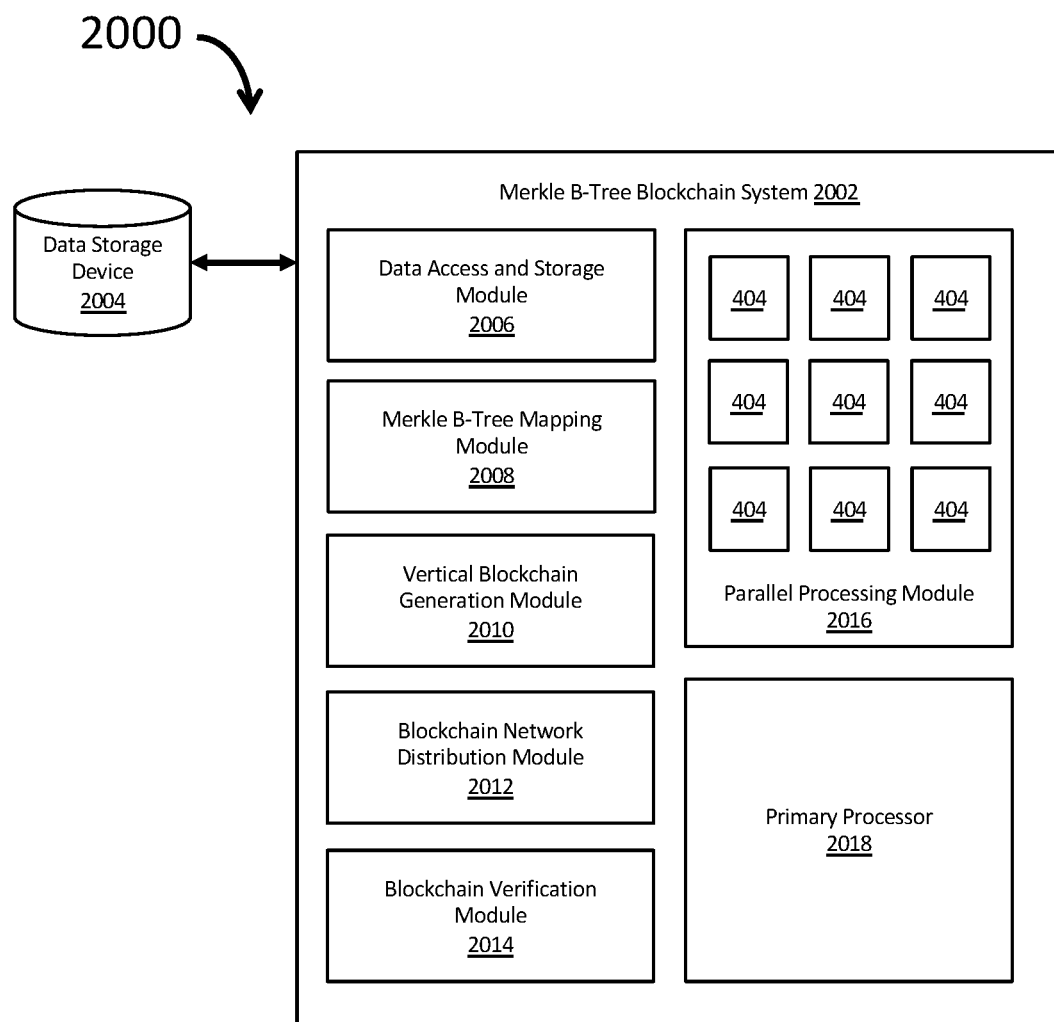
FIG. 13A illustrates a block diagram of a Merkle B-Tree Blockchain system.
Figure 13B:
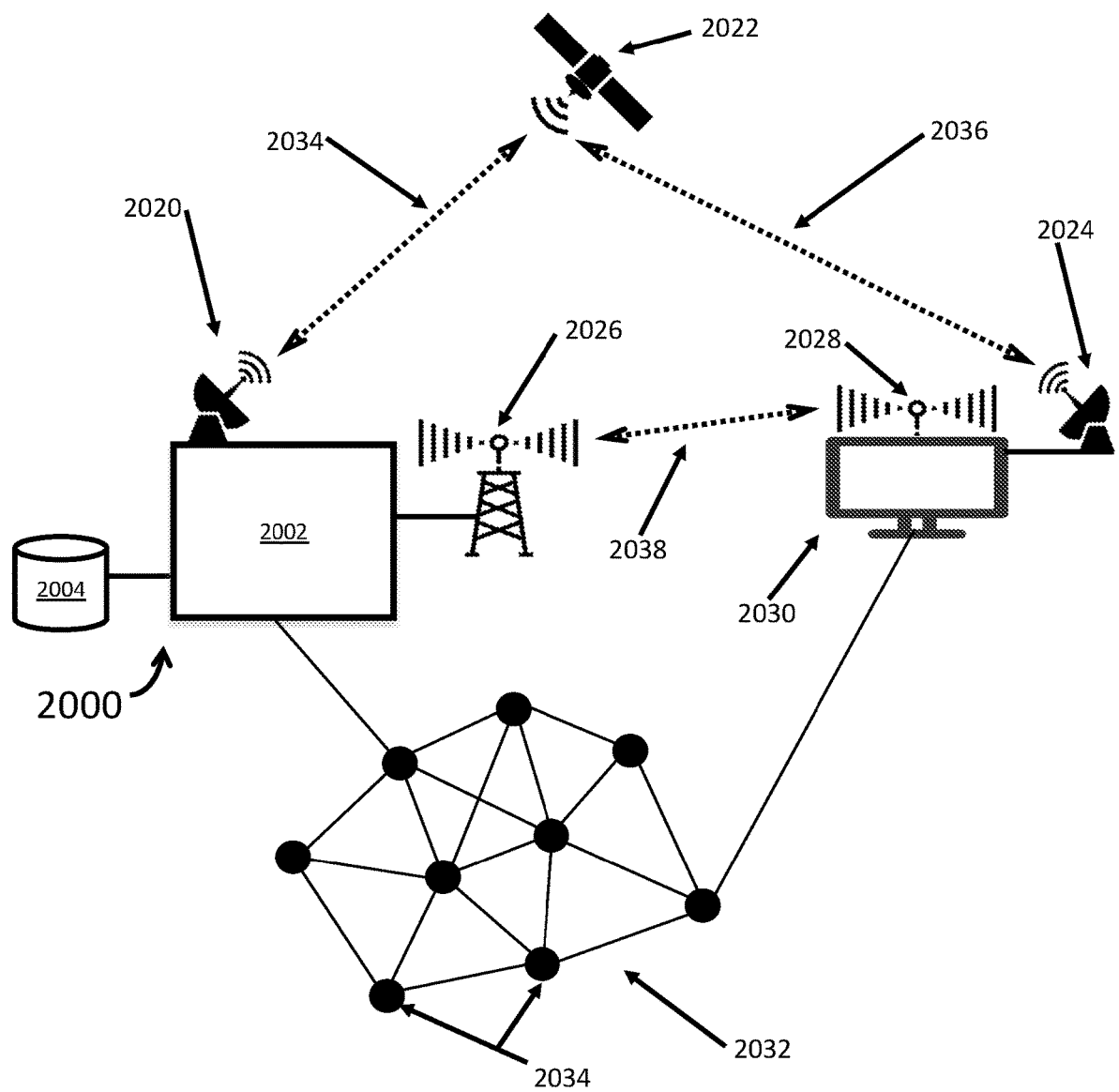
FIG. 13B illustrates a block diagram of a Merkle B-Tree Blockchain system integrated with a distributed network, satellite communication network, and a radio transmission network.
Figure 13C:
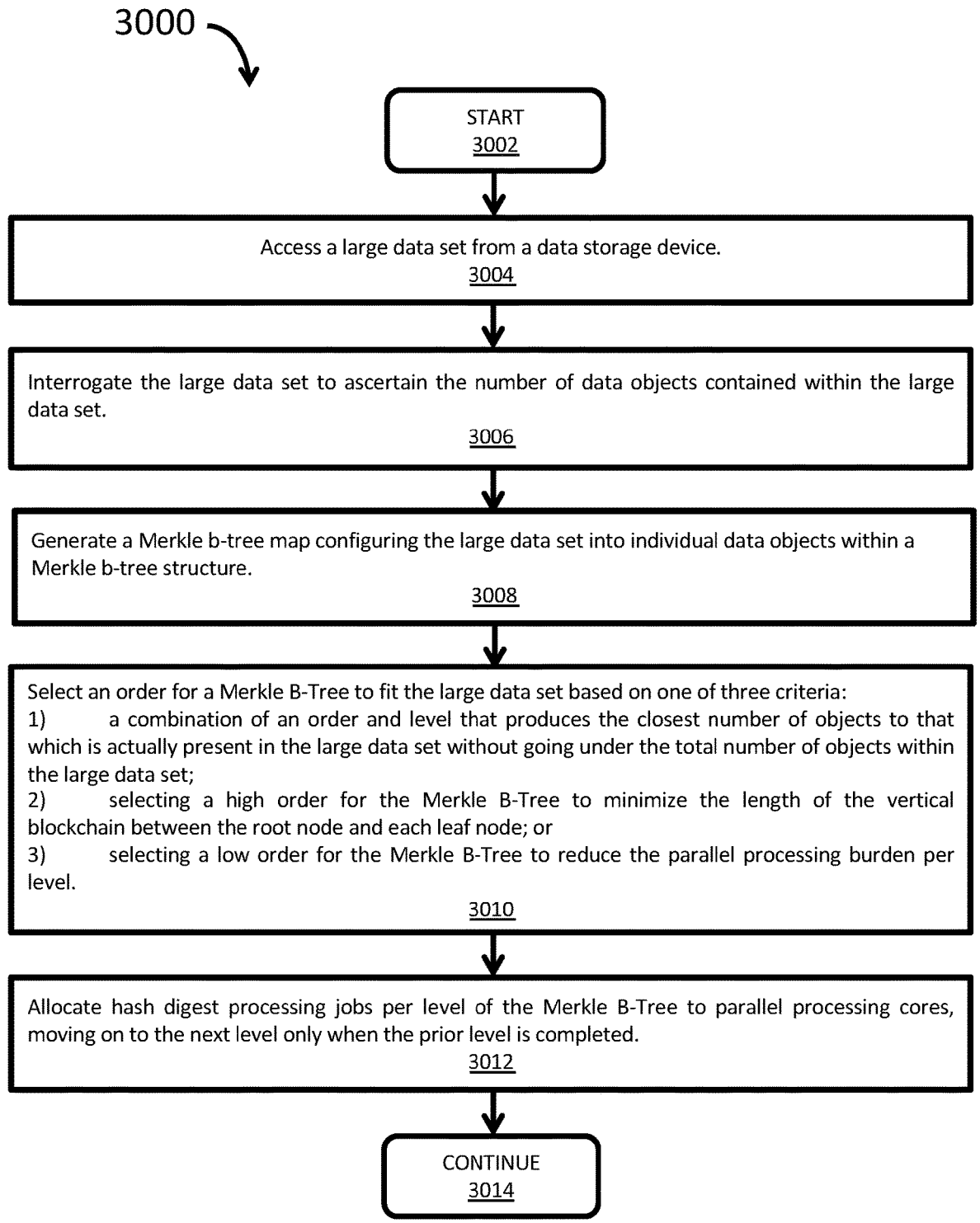
FIGS. 13 C and D illustrates a flow chart depicting a process for accessing a large data set from a data store and generating a group of vertical blockchains in a Merkle B-Tree structure.
Figure 13D:
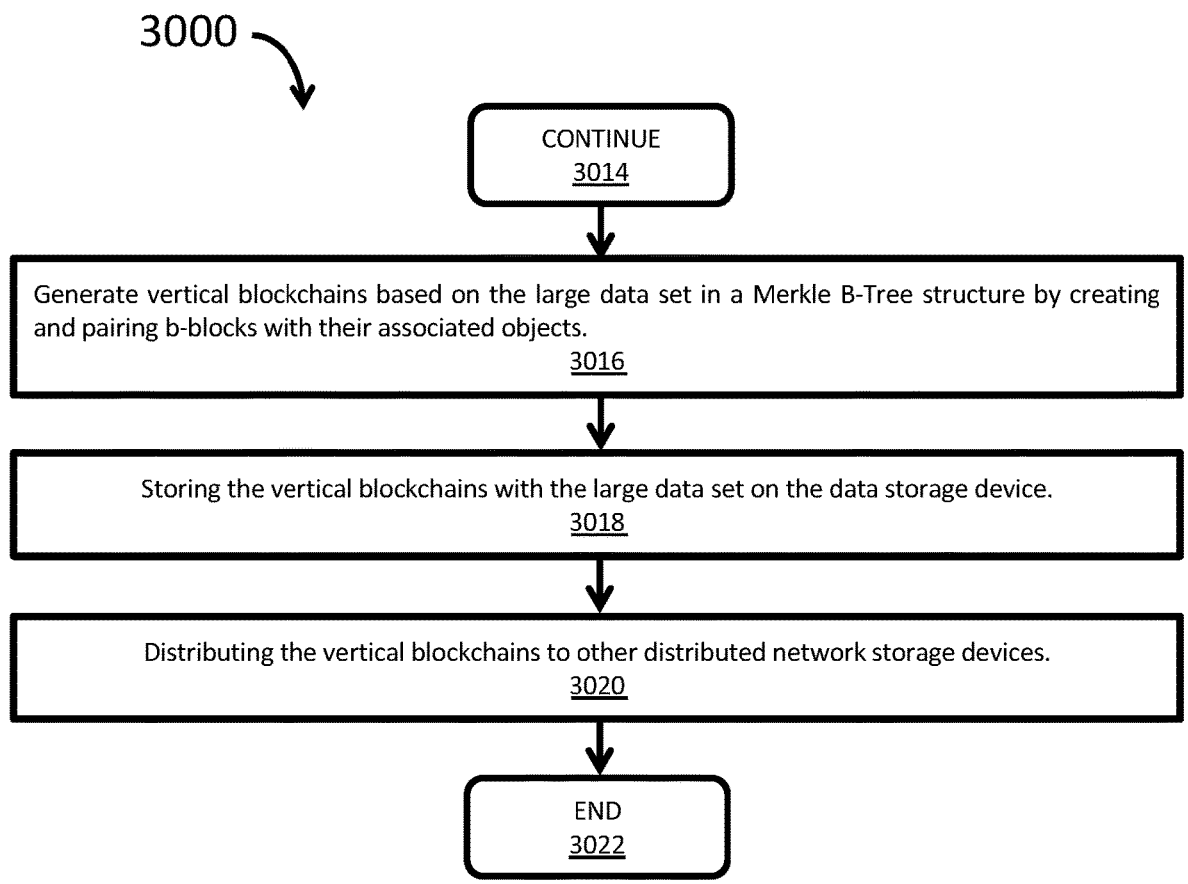

FIG. 13A illustrates a block diagram 2000 of a Merkle B-Tree Blockchain system 2002. Merkle B-Tree Blockchain system 2002 is bidirectionally coupled to data storage device 2004. Data storage device 2004 may be a permanent computer tangible medium such as DVD disk 902, tape cartridge 903, Solid State Drive (SSD) 904, or Hard Disk Drive (HDD) 905. Data storage device 2004 stores large data sets such as video, multidimensional spreadsheets, or other forms of large data sets. System 2002 includes a data access and storage module that accesses large data sets from data storage device 2004 and uploads them into system 2002 for processing. System 2002 takes large data sets from data storage device 2004 and converts them into Merkle B-Tree structures with vertical blockchains as described in FIGS. 1-12. Merkle B-Tree mapping module 2008 analyzes the large data set and determines what configuration of order "O" and levels "n" would best fit that structure of the large data set by creating a Merkle B-Tree map. Module 2008 will analyze the number of data objects within the large data set and refer to table 500 in FIG. 5 to determine possible arrangements of order "O" and level "n" that would prove compatible with the large data set. Module 2008 may determine that different levels of the Merkle B-Tree will have different orders "O". For example, with respect to a large data set that is a video, Module 2008 may map the entire video file as the root node at level n=0, groups of scenes at level n=1, individual scenes at level n=2, groups of snippets at level n-=3, individual snippets at level n=4, multiple Groups Of Pictures at level n=5, and individual Groups Of Pictures at level n=6 as depicted in FIGS. 9A-G. With respect to a large data set that is a multidimensional spreadsheet, module 2008 may map the 3-D data array as the root node at level n=0, groups of sheets at level n=1, individual sheets at level n=2, groups of columns at level n=3, individual columns at level n=4, groups of rows at level n=5, and individual rows at level n=6. These are examples of Merkle B-Tree Maps. A Merkle B-Tree Map is an assignation of rows and nodes to individual data objects at various hierarchical levels within a large data set. Vertical blockchain generation module 2010 in combination with parallel processing module 2016 execute the processes to generate B-Blocks and vertical blockchains as discussed with respect to FIGS. 6A-E and 7A-E and FIGS. 11A-B and 12A-B, and FIGS. 13C and D. Parallel processing module 2016 may be formed of a single core 404 to execute the process described in FIGS. 11A-B. Alternatively, parallel processing module may have numerous cores 404 to execute the parallel processing of data objects and the formation of B-Blocks as described in FIGS. 12A-B. For example, parallel processing module 2016 may have 48 cores 404, which is 65,536 cores for total parallel processing of a Merkle B-Tree having an order of O=4 and n=8. Alternatively, parallel processing module 2016 may have $3^{10}$ cores 404, which is 59,038 cores for total parallel processing of a Merkle B-Tree of order O=3 and a level of n=10. These core 404 configurations are merely examples, and parallel processing module 2016 may have any number of cores 404 for processing B-Blocks. Vertical blockchain generation module 2010 takes the hash digests formed by cores 404 and creates B-Blocks as described throughout this specification including FIGS. 2B-C, 3B-C, and 8A-B. Blockchain network distribution module 2010 allows for system 2002 to communicate with internal networks and external networks such as a distributed network 2032, a satellite communications network 2022, or a wireless radio communications network 2026 as shown in FIG. 13B. FIG. 13B illustrates a block diagram of a Merkle B-Tree Blockchain system integrated with a distributed network 2032, satellite communication network 2022, and a wireless radio transmission network 2026 for the digital transmission of vertically blockchained Merkle-B trees. Module 2010 allows for system 2002 to transmit the vertically blockchained Merkle B-Tree to other nodes on networks 2022 or 2032 for redundant storage. Blockchain verification module 2014 may access any vertical blockchain form a vertically blockchained Merkle B-Tree located on any storage node such as device 2004, or network node on internet 2032. Blockchain verification module will rehash the objects within each paired-object and compare them to the hash digest stored in the B-Block to determine if they match. If they match, the data object and B-Block are verified. If the hash digest in the B-Block and the rehashed data object do not match, then the data object fails data verification. Primary processor 2018 executes all processes of system 2002 as described in FIGS. 1-13. System 2002 is shown coupled to a data store 2004 bidirectionally. System 2002 is also in bidirectional communication with distributed network 2032 that is formed of individual nodes 2034. System 2002 may also bidirectionally communicate with a remote network node 2030 through a satellite 2022. Satellite 2022 may be its own storage node with onboard memory. Satellite 2022 is in bidirectional communication with antenna 2020 that is coupled to system 2002. Satellite 2022 communicates with system 2002 with signals 2034. A satellite antenna 2024 is coupled to network terminal 2030 and bidirectionally communicates with satellite 2022 through signals 2036. System 2002 is also coupled to wireless antenna 2026 that may send and receive signals 2038 with antenna 2028 coupled to terminal 2030.

FIGS. 13 C and D illustrates a flow chart 3000 depicting a process for accessing a large data set from a data store and generating a group of vertical blockchains in a Merkle B-Tree structure. The process begins with START 3002. In step 3004, system 2002 accesses a large data set from data storage device 2004 using data access and storage module 2006. In step 3006, system 2002 uses the Merkle B-Tree mapping module 2008 to interrogate the large data set to ascertain the number of data objects contained within the large data set. Then in step 3008, the Merkle B-Tree mapping module 2008 generates a Merkle B-Tree map configuring the large data set into individual objects within a Merkle B-Tree structure by selecting an order "O" and level "n" for the Merkle B-Tree and assigning specific nodes within the Merkle B-Tree to each object within the large data set, including classes of objects to levels "n" of the Merkle B-Tree. In step 3010, Merkle B-Tree module 2008 selects an order for a Merkle B-Tree to fit the large data set based on one of three criteria: 1) a combination of an order and level that produces the closest number of objects to that which is actually present in the large data set without going under the total number of objects within the large data set; 2) selecting a high order for the Merkle B-Tree to minimize the length of the vertical blockchain between the root node and each leaf node; or 3) selecting a low order for the Merkle B-Tree to reduce the parallel processing burden per level. In step 3012, vertical blockchain generation module 2010 allocates hash digest processing jobs per level of the Merkle B-Tree to one or more cores 404 within parallel processing module 2016 per FIGS. 6, 7, 11, and 12. The process continues with step 3014. In step 3016, system 2002 uses vertical blockchain generation module 2010 to generate vertical blockchains having B-Blocks using the hash digests created by cores 404 based on the Merkle B-Tree map, thereby forming a vertically blockchained Merkle B-Tree for the selected large data set accessed from data storage device 2004. In step 3018, system 2002 uses data access and storage module 2006 to store the vertically blockchained Merkle B-Tree on the data storage device 2004. Then in step 3020, system 2002 uses blockchain network distribution module 2012 to distribute the vertically blockchained Merkle-B Tree to other storage nodes on a distributed network for redundant storage. The process ENDS with step 3022.

While the invention has been shown and described with reference to a particular embodiment thereof, it will be understood to those skilled in the art, that various changes in form and details may be made therein without departing from the spirit and scope of the invention.

The invention claimed is:

1. A non-transitory computer tangible medium containing instructions for securing a large data set with a blockchained Merkle Tree, comprising:
    storing each data object of a large data set within a separate node of a Merkle Tree including within a root node, leaf nodes, and nodes interconnecting the root node to the leaf nodes; and
    blockchaining the nodes of the Merkle Tree together into blockchains, wherein each of the blockchains begin with a first blockchain block that includes the root node as data and end with a final blockchain block that includes one of the leaf nodes as data.

2. The blockchained Merkle Tree of claim 1, wherein each blockchain block within the blockchains includes a data object from one unique node of the Merkle Tree as data and a hash digest based at least in part on that data object.

3. The blockchained Merkle Tree of claim 1, wherein the final blockchain block includes a hash digest from a prior linked blockchain block that includes as data a node of the Merkle Tree from which the leaf node branched.

4. The blockchained Merkle Tree of claim 1, wherein within each blockchain, successive blockchain blocks after the first blockchain block include a unique node of the Merkle Tree as data and a hash based in part on a node of the Merkle Tree from which the unique node branched from.

5. The blockchained Merkle Tree of claim 1, wherein each blockchain has as many blockchain blocks as there are levels within the Merkle Tree, wherein each blockchain block within a Merkle Tree is based on a different level of the Merkle Tree.

6. The blockchained Merkle Tree of claim 1, wherein each blockchain block includes a data pointer pointing to the storage location of the data object contained within it.

7. The blockchained Merkle Tree of claim 1, wherein there are as many blockchains as there are leaf nodes in the Merkle Tree, wherein new blockchain blocks are added to the blockchained Merkle Tree without recalculating the first blockchain block.

8. The blockchained Merkle Tree of claim 1, wherein the hash digest in the first blockchain block that contains the root node as data is independent of any data in nodes that branch from the root node.

9. The blockchained Merkle Tree of claim 1, wherein the order "O" remains constant for each level of the Merkle B-Tree, or wherein the order "O" varies for at least one level of the Merkle B-Tree from the remaining levels.

10. The blockchained Merkle Tree of claim 1, further comprising:
    interrogating the large data set to determine the number of objects contained within it; and
    selecting a Merkle Tree having an order "O" and levels "n" that has an equal or greater total number of root, leaf, and interconnecting nodes than there are objects within the large data set, or selecting a Merkle Tree having an optimal combination of order "O" and level "n" that produces the closest total number of root, leaf, and interconnecting nodes to the number of objects that which is actually present in the large data set without going under a total number of objects within the large data set, or selecting a Merkle Tree having a higher order "O" than the optimal order for the Merkle Tree to reduce the blockchain length between the root node and each leaf node.

11. A non-transitory computer tangible medium containing instructions for securing a large data set with a blockchained Merkle Tree, comprising:
    mapping a large data set onto a Merkle Tree for storage and storing portions of the large data set within the Merkle Tree's root node, leaf nodes, and nodes interconnecting the root node to the leaf nodes; and
    blockchaining the root node, leaf nodes and interconnecting nodes together into blockchains with interlinking hashes.

12. The blockchained Merkle Tree of claim 11, wherein each blockchain begins with a first blockchain block that includes the root node as data.

13. The blockchained Merkle Tree of claim 12, wherein each blockchain ends with a final blockchain block that includes a different one of the leaf nodes as data.

14. The blockchained Merkle Tree of claim 13, wherein the final blockchain block includes a hash digest from a prior linked blockchain block that includes as data a node of the Merkle Tree from which the leaf node branched.

15. The blockchained Merkle Tree of claim 12, wherein new blockchain blocks are added to the blockchained Merkle Tree without recalculating the first blockchain block.

16. A non-transitory computer tangible medium containing instructions for securing a large data set with a blockchained Merkle Tree, comprising:
    storing portions of a large data set within the Merkle Tree's root node, leaf nodes, and nodes interconnecting the root node to the leaf nodes;
    creating a first blockchain block storing the root node as data; and
    creating additional blockchain blocks to store nodes that branch from the root node as data, wherein the additional blockchain blocks include a hash based in part on the root node.

17. The blockchained Merkle Tree of claim 16, further comprising creating final blockchain blocks to store the leaf nodes as data, wherein the leaf nodes branch from the nodes that branch from the root node, wherein the final blockchain blocks include a hash from the additional blockchain blocks.

18. The blockchained Merkle Tree of claim 17, wherein each blockchain block contains a separate node as data, wherein there are multiple levels of nodes within the Merkle Tree between the root node and the leaf nodes.

19. The blockchained Merkle Tree of claim 18, wherein each blockchain block includes a hash based at least in part on the data of the separate node stored within it.

20. The blockchained Merkle Tree of claim 19, wherein new blockchain blocks are added to the blockchained Merkle Tree without recalculating the first blockchain block.

* * * * *